US008402512B2

(12) United States Patent
Tam et al.

(10) Patent No.: US 8,402,512 B2
(45) Date of Patent: *Mar. 19, 2013

(54) SYSTEM AND METHOD FOR CREATING A SECURE TRUSTED SOCIAL NETWORK

(75) Inventors: Chung Ming Tam, Ottawa (CA); Paramjit S. Gill, Ottawa (CA); Barjinderpal S. Gill, Los Gatos, CA (US)

(73) Assignee: Topeer Corporation, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,361

(22) Filed: Feb. 24, 2012

(65) Prior Publication Data

US 2012/0158577 A1   Jun. 21, 2012

Related U.S. Application Data

(63) Continuation of application No. 12/965,358, filed on Dec. 10, 2010, now abandoned, which is a continuation of application No. 11/381,282, filed on May 2, 2006, now abandoned, which is a continuation-in-part of application No. 11/267,668, filed on Nov. 4, 2005, now Pat. No. 7,797,732.

(30) Foreign Application Priority Data

Nov. 4, 2004   (CA) .................................... 2487327

(51) Int. Cl.
*G06F 7/04* (2006.01)
*G06F 17/40* (2006.01)
*H04L 29/06* (2006.01)
*G06F 15/16* (2006.01)

(52) U.S. Cl. .................. 726/3; 726/4; 726/28; 705/319; 709/205

(58) Field of Classification Search .................. 726/3, 4, 726/28; 705/35, 38, 39, 319; 709/205
See application file for complete search history.

(56) References Cited

U.S. PATENT DOCUMENTS

| | | | |
|---|---|---|---|
| 5,941,947 A | 8/1999 | Brown et al. | |
| 6,175,831 B1 | 1/2001 | Weinreich et al. | |
| 6,249,873 B1 | 6/2001 | Richard et al. | |
| 6,360,222 B1 | 3/2002 | Quinn | |
| 6,366,907 B1 | 4/2002 | Fanning et al. | |
| 7,069,308 B2 | 6/2006 | Abrams | |
| 7,089,208 B1 | 8/2006 | Levchin et al. | |
| 7,246,164 B2 | 7/2007 | Lehmann et al. | |
| 7,716,140 B1 | 5/2010 | Nielsen et al. | |
| 7,797,732 B2 | 9/2010 | Tam et al. | |

(Continued)

FOREIGN PATENT DOCUMENTS

| | | |
|---|---|---|
| WO | 0163423 A1 | 8/2001 |
| WO | 02091206 A1 | 11/2002 |

(Continued)

OTHER PUBLICATIONS

BBC News. "Q&A: Online lending exchange", Mar. 2005, <http://news.bbc.co.uk/go/pr/fr/-/2/hi/business/4325761.stm>.*

(Continued)

*Primary Examiner* — Michael Simitoski
(74) *Attorney, Agent, or Firm* — Mendelsohn, Drucker & Associates, P.C.

(57) ABSTRACT

A system for a plurality of users to share resources with access, control and configuration based on pre-defined relationships of trust between the users of the system. A computer-based authority provides the services of authentication, identification and verification of each user within network. Processes are described that leads to the formation of an electronic community, which facilitates electronic communication and transactions in a defined manner.

14 Claims, 61 Drawing Sheets

U.S. PATENT DOCUMENTS

| | | |
|---|---|---|
| 7,845,000 B2 | 11/2010 | Viger et al. |
| 8,205,245 B2 | 6/2012 | Tam et al. |
| 2002/0059379 A1 | 5/2002 | Harvey et al. |
| 2002/0194256 A1 | 12/2002 | Needham et al. |
| 2003/0055898 A1 | 3/2003 | Yaeger et al. |
| 2003/0115251 A1 | 6/2003 | Fredrickson et al. |
| 2004/0006531 A1 | 1/2004 | Kwan |
| 2004/0148275 A1 | 7/2004 | Achlioptas |
| 2004/0184478 A1 | 9/2004 | Donescu et al. |
| 2004/0215793 A1 | 10/2004 | Ryan et al. |
| 2005/0021750 A1 | 1/2005 | Abrams |
| 2005/0091316 A1 | 4/2005 | Ponce et al. |
| 2005/0198031 A1 | 9/2005 | Pezaris et al. |
| 2005/0209999 A1 | 9/2005 | Jou |
| 2005/0246420 A1 | 11/2005 | Little, II |
| 2005/0267766 A1 | 12/2005 | Galbreath et al. |
| 2006/0004789 A1 | 1/2006 | Lunt et al. |
| 2006/0021009 A1 | 1/2006 | Lunt |
| 2006/0064739 A1 | 3/2006 | Guthrie et al. |
| 2006/0080613 A1 | 4/2006 | Savant |
| 2006/0117378 A1 | 6/2006 | Tam |
| 2006/0224502 A1* | 10/2006 | McGowan .......... 705/38 |
| 2006/0259957 A1 | 11/2006 | Tam et al. |
| 2007/0027791 A1* | 2/2007 | Young et al. .......... 705/37 |
| 2007/0061248 A1* | 3/2007 | Shavit et al. .......... 705/37 |
| 2008/0255928 A1 | 10/2008 | Tomeny |

FOREIGN PATENT DOCUMENTS

| | | |
|---|---|---|
| WO | 2006047879 A1 | 5/2006 |

OTHER PUBLICATIONS

Fugger, Ryan. "Money as IOUs in Social Trust Networks & A Proposal for a Decentralized Currency Network Protocol" (Version 2), Apr. 2004.*

Feng, Jinjuan et al., "Empathy and Online Interpersonal Trust: A Fragile Relationship," Draft Research Paper, http://www.ifsm.umbc.edu/~preece/Papers/trust_paper_BIT2.pdf. Also published as "Empathy and Online Interpersonal Trust: A Fragile Relationship," Behav. Inform. Technol., 2004, vol. 23, No. 2.

Web Page, "Napster," www.Napster.com, Archived at http://web.archive.org, Nov. 4, 2005.

Web Page, "eDonkey," www.eDonkey2000.com, Archived at http://web.archive.org, Nov. 4, 2005.

Web Page, "Kazaa," www.kazaa.com, Archived at http://web.archive.org, Nov. 5, 2005.

Tyson, Jeff, "How the Old Napster Worked," Web Page: HowStuffWorks(R), Archived at http://web.archive.org, Nov. 2, 2005.

International Preliminary Report on Patentability for PCT/CA05/01689, Mar. 12, 2007.

Written Opinion for PCT/CA05/01689, Mar. 9, 2006.

International Search Report for PCT/CA05/01689, Mar. 9, 2006.

Lien, Jian et al. "Understanding KaZaA," May 2004, retrieved from <http://cis.poly.edu/~ross/papers/>.

Popescu, Bogdan C. et al. "Safe and Private Data Sharing with Turtle: Friends Team-Up and Beat the System," Apr. 2004, retrieved from <http://www.cs.vu.nl/globe/publications.html>.

Goecks, Jeremy and Elizabeth D. Mynatt. "Leveraging Social Networks for Information Sharing", Nov. 2004. http://www.ifsm.umbc.edu/.about.preece/Papers/trust.sub.—paper.sub.—BIT- 2.pdf. Also published as "Empathy and Online Interpersonal Trust: A Fragile Relationship," Behav. Inform. Technol., 2004, vol. 23, No. 2.

"1st Workshop on Friend of a Friend, Social Networking and the Semantic Web", Sep. 2004, Galway, Ireland, Sponsored by SWAD-Europea and DERI, http://www.w3.org/2001/sw/Europe/events/foaf-galway/.

Dan Brickley and Libby Miller, About Foaf, foafproject, http://www.foaf-project.org/about, 2000.

Reagle, Joseph M. Jr., "FOAF—Spheres of Privacy", 2003, Web article, http://reagle.org/joseph/2003/09/foaf-spheres.html.

Sixdegrees.com, FAQ, http://web.archive.org/web/19980521125824/sixdegrees.com/about/faq.cfm, 1998.

Bedell, Doug, "Meeting Your New Best Friends Six Degrees Widens your Contacts in Exchange for Sampling Web Sites", Oct. 27, 1998, The Dallas Morning News, http:///www.dougbedell.com/sixdegrees1.html.

Zilberg, Shoshana, "Sixdegrees Product Launch Promises to Revolutionize Traditional On-Line Bulletin Boards", Business Wire, Oct. 14, 1997, http://www.allbusiness.com/technology/software-services-application-inter-net-social/7054085-1.html.

Business Wire, PhotoLoft.com Brings Picture Sharing to sixdegrees, Business Wire, Aug. 4, 1999, http://findarticles.com/p/articles/mi.sub.—m0EIN/is.sub.—/ai.sub.—5534- 6526.

Freierman, Shelly, Screen Grab; 6 Degrees of Networking, NYTIMES.com, Jun. 4, 1998, http://query.nytimes.com/gst/fullpage.html?res=9C03E5D8123BF937A- 35755C0A96E958260.

Jardin, Xeni, Friendster patents social nets: SixDegrees cofounder responds, BoingBoing, Jul. 11, 2006, http://www.boingboing.net/2006/07/11/friendster-patents-s.html.

Festa, Paul, Investors snub Friendster in patent grab, Nov. 11, 2003, http://news.cnet.com/Investors-snub-Friendster-in-patent-grab/2100-1032.s- ub.—3-5106136.html.

\* cited by examiner

| Terms and representative symbols | Description / Definition |
|---|---|
| Client | A software program supplied from a legitimate source that allows a computing device to connect to the trusted servers and the rest of the network. This software can run on any computing device that has storage and one or more communication port |
| Client A | Represents a specific instance "A" of a client. |
| <br>Communication Service | Represents any means of contacting the trusted server which includes, for example, telephony, e-mail, instant messaging (IM), fax, mail, Web (HTTP) |
| Defined process<br>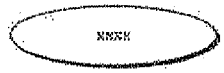 | Represents the processes as described in the present patent or in flow-chart. The numbers, XXXX, represents the corresponding process steps. For example, Steps 0020-0070, describes the communication between user and trusted server during the Setup process. |

Figure 59A

| Terms and representative symbols | Description / Definition |
|---|---|
| Logon / Logoff | Identification and authentication process for accessing the network. |
| Location Server | A computing device that has storage, computing capability and a communication port used for determining the location (for example, Internet Protocol (IP) address) of a client. It is part of the Trusted Servers. |
| Network | A collection of computing devices connected by a common communication protocol (for example, the TCP/IP protocol) |
| Platform (User  Platform) | Any computing device that has storage, computing capability and a communication port. |
| Propagation | Process describes how the user of Client A signs up one user with whom they have a pre-existing relationship characterized by trust (e.g. friends, family, co-workers). Process can be repeated indefinitely to build up a list of trusted peers. |
| Searching | Finding information over the network |
| Setup | Describes the process of acquiring the client from the trusted servers and installing the client software on the user platform. |
|  Trusted Servers | One or more computing devices with one or more computing services and communication ports. The main function of the trusted servers is to provide the identification and authentication of clients on the network. |
| User / Member / Trusted Peer | The human element in the ownership and operation of a client. |
| Information flow  | Direction of information flow between processes / platforms |

Figure 59B

| Terms and representative symbols | Description / Definition |
|---|---|
| Connectors  | Used in flow charts to denote to connect flows from different locations. |
|  | Process description for a client |
|  | Process description for the trusted user |
|  | Process description for another client |
|  | Process description for location server |

SYSTEM AND METHOD FOR CREATING A SECURE TRUSTED SOCIAL NETWORK

BACKGROUND

The history of computing and computer network architecture can be viewed as a spectrum falling between a more centralized approach in a Client-Server environment and the decentralized approach of a Peer-to-Peer environment. Each architecture has been used to build electronic communities and create various forms of computer services.

A simple example of a Client-Server environment is a website. A website is a service provided by a web server. Third party computing devices access the website by connecting to the web server through a network connection (via the Internet, through a Local Area Network or the like). One problem associated with Client-Server environments is that the server and the bandwidth required to service the number of request must also be able to scale with the growth of the number of third party devices seeking to access the server.

Alternatively, Peer-to-Peer environments are networks in which each computing device connected to the network can have equivalent capabilities and responsibilities. Peer-to-Peer environments are generally simpler to create and maintain than Client-Server environments and, at present, do not offer the same performance under heavy loads. Examples of Peer-to-Peer networks are file sharing networks such as Napster, E-donkey or Kazaa. Each of these examples allow for direct connections between individual computing devices in the network to exchange files. The problems associated with Peer-to-Peer networks involve, among others a lack of security, control and authenticity of the requested files. There are no limits on access to these networks and therefore users have no way to ascertain the quality or source of the received file. This lack of security hampers the utility of Peer-to-Peer environments because users are unwilling to allow strangers access to their systems.

Mixed Client-Server and Peer-to-Peer system can be developed. For example, U.S. Pat. No. 6,366,907 to Fanning et al. discloses a centralized database to locate resources within a peer-to-peer network. However, Fanning et al. do not address the problems of security or control.

There is therefore a need for an environment that provides for a network that provides a solution to the problems of scalability of Client-Server environments as well as a solution to the security or control problems associated with Peer-to-Peer environments. The present invention addresses such a need as it uses a Client-Server environment to identify, authenticate and control access to a Peer-to-Peer network. In addition, this invention applies the ideas of pre-existing social relationships characterized by trust to the access control of the Peer-to-Peer network to create a flexible and secure network.

The importance of social relationships and social networks were publicly recognized by Milgram in "The Small World Problem", Psychology Today, May 1967. pp 60-67. His theory, known as the "Six degrees of separation" or "The Small World Problem", suggests that anyone on the planet can be connected to any other person on the planet through a chain of acquaintances that has no more than five intermediaries. Based on this idea, in U.S. Pat. No. 6,175,831, Weinreich, et al. describe a process to build a database of linkages, and, in U.S. Pat. No. 6,360,222, Quinn describes a process to modify directory structures. However, neither Weinreich nor Quinn address the creation of a flexible network based on the concept of social relationships in a Peer-to-Peer computing environment and do not address the issue of identification and authentication when accessing network services.

U.S. Pat. No. 5,941,947 to Brown et al. describes a system and method for controlling access to data entities in a computer network using the concept of control access rights list (ACL) to assign network privileges to users and groups of users. The disadvantage of this design is that it does not allow users to communicate with one another in a Peer-to-Peer environment.

U.S. patent application Ser. No. 10/165,330 assigned to Yeager et al. and U.S. patent application Ser. No. 10/285,133 assigned to Yeager and Chen, describe the creation and distribution of a trust mechanism within a Peer-to-Peer network. In their implementation, trust is a value that is quantitatively calculated through the interaction of peers or determined a priori as a numerical value by the user. The total trust and risk of an object on their network can then be established as a path summation of the nodes that offers the object. The disadvantage of this design is that it requires a series of interactions between users on the network before a level of trust can truly be established. There is no provision for ratings based on pre-existing relationships of trust. In addition, the work of Yeager et al., does not provide a mechanism to identify and authenticate a user and relied on their defined "Trust mechanism".

The key element in the establishment of a social network is the implicit understanding of the concept of "trust" between known users of a social network. Trust is defined in Merriam-Webster's Dictionary as "assured reliance on the character, ability, strength, or truth of someone or something". The nature of trust has proved to be elusive and has been discussed extensively in the context of philosophy. The practical implications of trust can be explained using game theory, human physiology and psychology. The concept of trust also forms the basis of corporate strategy, and economics and sociology.

In the *Republic* (Plato, 390 BC), Plato suggests that trust exists because of the rules governing social transactions and the fear of punishment for disobedience. In this world view, self interest is the major component of trust (see for example, Niccolo Machiavelli (1513), *The Prince* and Thomas Hobbes (1651), *Leviathan, or the Matter, Forme, and Power of a Commonwealth, Ecclesiasticall and Civil*). In contrast, other worldviews introduce the properties of innate goodness of man, sympathy (for example, David Hume (1739), *A Treatise of Human Nature*) or shared morality (Immanuel Kant (1790), *The Science of Right*) as the basis for trust.

Strategic interactions among humans can be described using mathematics. This was first demonstrated by Von Neumann in *Theory of Games and Economic Behavior* (1944) in the field of game theory. In game theory, it can be shown that there are optimum strategies for dealing with given situations or confrontations and the strategy depends on the goals of rational participants. For example, there are different strategies depending on whether one's objective is to maximize the probability of achieving a goal, maximizing one's gains, minimizing one's losses or risk, or ensuring that one's opponent suffers the greatest damage. A classical example of game theory is known as the "Prisoners' Dilemma" (A. W. Tucker (1950), memo republished in *On Jargon: The Prisoner's Dilemma*, UMAP Journal 1, 101, 1980) which established the value of trust among participants. In this hypothetical situation, the best possible outcome for the group as a whole occurs if each user trusts each other. In contrast, the worst possible results for the group occur when each user acts in their own interest.

Social organizations both formal and informal are a trait shared by all human beings. Interaction between relatives, family and kin can be explained based on a biological imperative. By including the element of trust to the psychological development of man, explanation of human interactions can be extended to friends and other members of social groups, businesses, communities, cultures and even nations. Elements involved in trust in a sociological context includes an expectation of future cooperation and a sense of reciprocity.

Trust is also recognized as a valuable component of business strategy (see for example, Robert Bruce Shaw and Jossey-Bass (1997), *Trust in the Balance: Building Successful Organizations on Results, Integrity, and Concern*, Jossey-Bass Business & Management Series). Trust exists within the human behaviour spectrum of confidence (result of specific knowledge built on reason and facts) and faith (belief that is largely immune to contradictory information or events). Trust for an individual can be characterized as a belief that those on whom the individual depends will fulfill that individual's expectations of them. In a sense, therefore, predictability of behaviour engenders trust. For individuals, varying levels of trust can be established based on fulfilling expectations, acting with integrity and being empathetic.

The concept of trust is also a key element in the theories of macro-economics. In this context, trust can be characterized as an expectation within a community that users of the community will exhibit regular, honest, and cooperative behaviour, based on commonly shared norms. The existence of trust creates social capital, which in turn determines the size of firms, businesses and even economies.

The ability to collaborate on and to edit documents, share views and activities is an important function of a network. Previously, such activities were carried out in two ways: either via a Web-based content management system (CMS) or through a Peer-to-Peer collaborative environment. In a Web-based system, the resources are located in one central location with specific functions provided by a web server and a database (see for example, CMS Review 2005). In decentralized systems, individual machines execute local programs to create a shared environment connected by a network (see for example, U.S. Pat. Nos. 6,859,821; 6,640,241; and 6,446,113 to Ozzie et al.). However, in a web-based system, a central computer is required which can be complicated to setup and maintain. In a pure Peer-to-Peer system, the management of access control can be quite burdensome. There is therefore a need for a network which can be easily established, added to and maintained but where authentication of users is managed. In the present invention, where the users are all connected by pre-existing relationships characterized by trust, access issues are easily dealt with and each trusted peer computer can collaborate and edit information using local resources.

Traditionally, borrowing and lending activities are carried out through financial institutions such as banks or informally. In 2005, Zopa.™. launched the first peer-to-peer lending network in the United Kingdom. Zopa.™. syndicates loans requested by "borrower" members out to "lender" members, based on criteria and parameters set by both parties. One main important criterion for lending is the credit-worthiness of the borrower. Zopa.™. allows strangers to lend money to strangers. Access to the system is contingent upon the users passing a credit check.the users passing a credit check.

SUMMARY OF THE INVENTION

An object of the present invention is to provide a system for a plurality of users to share resources. In accordance with an embodiment of the present invention, there is provided system for a plurality of users to share resources comprising: one or more software clients, each of said software clients installed on a computing device; one or more trusted servers; one or more communication means allowing communication between said one or more trusted servers and said one or more software clients, wherein said trusted servers comprise: a network interface operable to receive data packets from the software clients and further operable to send processed data packets to the software clients; a processing engine in communication with the network interface, said engine operable to associate each data packet with an identifier and to thereby provide said processed data packets; a database containing an identifier associated with each software client in said system, and wherein each identifier in said database is related to each other identifier by means of a criterion, wherein said criterion is the degree of separation between one user of a software client and a second user of a software client based on a pre-existing relationship of trust, as defined by said users.

In accordance with an alternative embodiment of the present invention, there is provided a system for a plurality of users to share resources, said system produced by the following process:
a) providing a software client to a first user for installation on a first computing device;
b) receiving a first set of data packets relating to said first user from said software client to one or more trusted servers via one or more communication means;
c) compiling a database of said first data packets;
d) receiving a second set of data packets relating to at least one second user with whom said first user has a pre-existing relationship defined by a criterion, wherein said criterion is trust, as defined by said first and second user;
e) adding said second set of data packets to the database and relating said second set of data packets to said first set of identifying data by means of said criterion;
f) providing the software client to the second user for installation on a second computing device;
wherein, said first, second, or new user can repeat steps b to f resulting in additional users being added to said system.

In accordance with an alternative embodiment of the present invention, there is provided a method of searching for information, resources or services contained on a computing device connected to the system of claim 1, based on the properties of the object as well as criteria as specified by the user wherein the search can be conducted either by said software client or be the trusted server.

In accordance with alternative embodiment of the present invention, there is provided a method for creating a market on a system for a plurality of users to share resources, said method comprising the following steps: establishing a network of computing devices used by two or more users wherein each of said users possesses a unique network identifier and wherein each unique identifier can be related to each other unique identifier based on a criterion, wherein said criterion is the degree of separation between one user and another user based on a pre-existing relationship of trust, as defined by said users; and providing a market server connected to said network wherein said computing devices can exchange processed data packets with said market server; wherein said processed data packets relate to the buying and selling of goods and wherein said market server coordinates interactions between said users of said computing devices.

In accordance with an alternative embodiment of the present invention, there is provided a method for creating an auction on a system for a plurality of users to share resources, said method comprising the following steps: establishing a network of computing devices used by two or more users wherein each of said users possesses a unique network identifier and wherein each unique identifier can be related to each other unique identifier based on a criterion, wherein said criterion is the degree of separation between one user and another based on a pre-existing relationship of trust, as defined by said users; and providing an auction server connected to said network wherein said computing devices can exchange processed data packets with said auction server; wherein said processed data packets contain information relating to the designation of objects that are available to be auctioned, and bids for said by one or more of said users; and wherein said auction server manages said processed data packets to manage and regulate auctions on said network according to pre-set rules.

In accordance with an alternative embodiment of the present invention, there is provided a method for playing games via a system for a plurality of users to share resources, said method comprising the following steps: establishing a network of computing devices used by two or more users wherein each of said users possesses a unique network identifier and wherein each unique identifier can be related to each other unique identifier based on a criterion, wherein said criterion is the degree of separation between one user and another based on a pre-existing relationship of trust, as defined by said users; and providing a game server connected to said network wherein said computing devices can exchange processed data packets with said game server; wherein said processed data packets contain information relating to a game in which the users are participants; and wherein said game server coordinates and manages the interactions between the users according to pre-set rules.

In accordance with an alternative embodiment of the present invention, there is provided a method for distributing one or more objects to members of a system for a plurality of users to share resources, said method comprising the following steps: establishing a network of computing devices used by two or more users wherein each of said users possesses a unique network identifier and wherein each unique identifier can be related to each other unique identifier based on a criterion, wherein said criterion is the degree of separation between one user and another based on a pre-existing relationship of trust, as defined by said users; providing one or more trusted servers connected to said network wherein said computing devices can exchange processed data packets with said one or more trusted servers; establishing a list of unique network identifiers corresponding to users who wish to receive the object and the location of a folder on said computing devices of said users designated to receive said one or more objects, said list located on said trusted servers; transmitting said one or more objects to said one or more trusted servers with instructions to distribute said object to the members on said list; and transmitting said one or more objects from said one or more trusted servers to the members of said list.

In accordance with an alternative embodiment of the present invention, there is provided a method for banking via a system for a plurality of users to share resources, said method comprising the following steps: establishing a network of computing devices used by two or more users wherein each of said users possesses a unique network identifier and wherein each unique identifier can be related to each other unique identifier based on a criterion, wherein said criterion is the degree of separation between one user and another based on a pre-existing relationship of trust, as defined by said users; and providing a banking server connected to said network wherein said computing devices can exchange processed data packets with said banking server; wherein said processed data packets contain information relating to communication between said two or more users relating to borrowing or loaning money from one of said two or more users to another of said two or more users; and wherein said banking server coordinates and manages the interactions between said users according to pre-set rules.

BRIEF DESCRIPTION OF THE FIGURES

Further features of the invention, its nature and various advantages will be more apparent from the accompanying drawings, and the following detailed description in which like reference numerals refer to like elements and in which:

FIGS. 59A-59C list the terms and representative symbols used in the application and their descriptions/definitions.

DETAILED DESCRIPTION OF THE INVENTION

Figure 1:
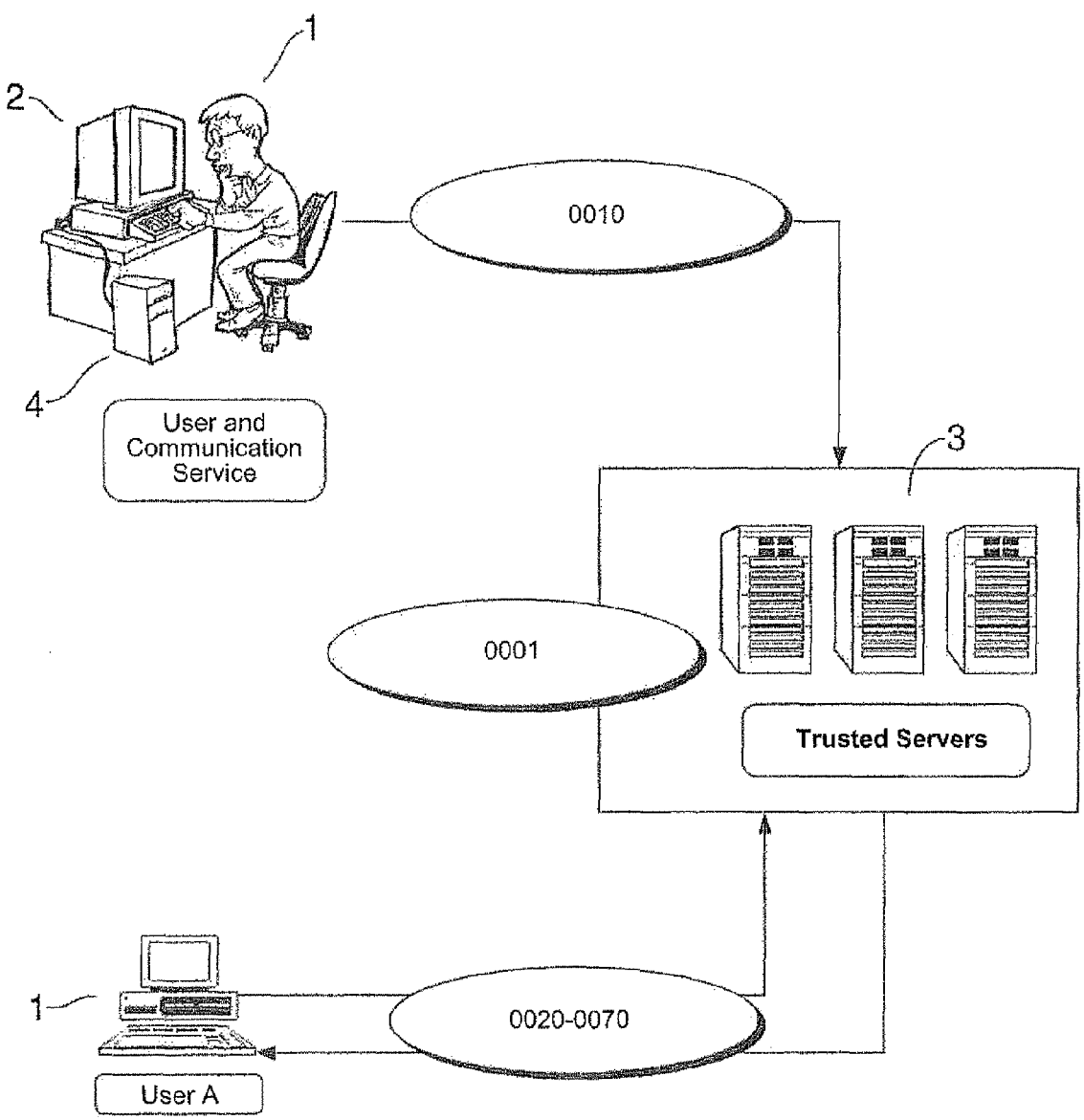
FIG. 1 is a process diagram for setting up the Network according to one embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention submits that acceptable social behaviour or trust can be codified as a security rule and through its implementation can create a secure electronic community. For example, the simple rule "I trust my close peers and will therefore allow them access to my computing device" can be extended to include "I trust peers of my peers and will therefore allow them access to my computing device". This logic can be extended recursively until the list of immediate and extended social links are exhausted. The underlying social expectations inherent in a pre-existing relationship characterised by trust, forms the security rule for a Peer-to-Peer network. The trust that forms the basis of social relationships can also be found in the workplace. In such cases, the implicit trust is based on the roles of an individual within an organization. For example, the CEO of a company allows the vice presidents permission to access a company resource. The vice presidents can allow their managers access to the same resource without the intervention of the CEO or another central administrator. The implications for this type of environment are that each user, through their role within an organization, is responsible and can make resource access decisions. This role-based trust can once again form the basis of the security rule for establishing a Peer-to-Peer network. The criteria of trust therefore is defined independent of the actions occurring within the network, does not need to be quantitatively assigned, and is derived from pre-existing social networks.

The system is a combination of a Peer-to-Peer network and Client-Server network formed of computing devices designed to permit users to share resources. Users are understood to be human beings. Resources can include without being limited to: data, digital files, memory, processing power, and storage space. A computing device would be understood by a worker skilled in the art to include any electronic device with storage and computing capability and a communication means with which to communicate with other computing devices. Computing devices may include but are not limited to computers, cell phones, mp3 players, pagers, gaming consoles, handheld gaming devices, wireless devices, and personal digital assistants. The communications means would be understood by a worker skilled in the art to include any necessary elements of hardware, including but not limited to communications ports, wireless transmitter/receivers, wires or fibre optics, and software, including but not limited to telephony, e-mail, facsimile, Bluetooth®, TCP/IP, FTP, XML, and IRC, that allow a computing device to exchange data packets with another computing device.

Access, control and configuration of the system are based on user-defined social relationships. Trusted servers provide the services of authentication, identification and verification for each user within the network. The trusted servers are computing devices connected to the network that can identify, verify and authenticate users of the network. This process defines who the users are, for example by means of a login and password, and where they are located in relation to other users of the network, for example an IP address. The trusted server can confirm these facts as part of an authentication process. Authorization and some services are provided by the trusted servers in a client-server environment. Once users are authorized to access the system, interactions between users take place in a Peer-to-Peer environment.

A software client installed on each computing device connected to the network acts as an interface to allow the user to communicate with the trusted servers and other computing devices. Initial access to the network is controlled by each of the users who can invite members of their trusted social network to access the network. Once invited, a new user can download the software client, access the network and invite new members. Processes are described that lead to the formation of electronic communities, which facilitates communication between computing devices connected to the system and transactions between those computing devices in a defined manner.

As each user is added to the network they are assigned a criterion N, defined as the degree of separation relative to the other users on the network. For example, User A invites a trusted friend, User Z to join the system. User A and User Z have a degree of separation of 0, thus N=0. If User Z invites another trusted friend, User Z1 to join the network then User Z and User Z1 will have a degree of separation of 0 and User Z1 and User A will have a degree of separation of 1. Users of the system can define the required degree of separation necessary to access resources on their computing device. If User A wishes to restrict access only to his or her friends, he or she sets access rules to N equals 0. The effect of different definitions of N is explored in the following table:

TABLE 1

An example of network access based on degrees of separation.

| Degree of Separation (N) | Description |
|---|---|
| 0 | A trusted network, only friends can connect |
| 1 | Only friends of trusted friends can connect |
| 2 | Friends of trusted friends' friends can connect |
| . | . |
| . | . |
| . | . |
| N is a very large number | Everyone who has social relations on the network can connect |

Once users are connected based on their defined properties, they can communicate and share services and resources. Some examples of interactions and services that are possible using this type of system are: transfer and exchange of electronic files, transfer or exchange of text messages and/or transfer and exchange of voice data, such as executable programs, digitized music, video and photo files, streamed media such as videos, remote access and file sharing, transaction based electronic markets, electronic markets of electronic and non-electronic goods and resources, auctions and reverse auctions, instant messaging (IM) services, Voice Over Internet Protocol (VOIP) services, interactive video services, electronic resource sharing such as hard drive space and processor capacity, non-electronic resource sharing, information collaboration and management, playing games, advertising, multi-level marketing programs, information distribution, distribution of digital content involving digital rights management, collaboration on projects involving editing and distribution of information, distribution and synchronization services for information, banking services, directed distribution incorporating push technology, and RSS feed services.

Due to the relationships of trust present between users of the system, the present invention allows users to share resources without the need to negotiate access on a case-by-case basis.

Alternatively, in a business or professional environment, pre-existing social relationships are replaced by roles that are pre-defined by the position and responsibility of the individual within an organization. The same trust and security issues exist and can be used to form networks using the present invention.

Although the embodiments discuss a single network of users linked through pre-existing social relationships it should be understood that the present invention may consist of an unlimited number of such social networks existing parallel to one another. If none of the members of two networks have a pre-existing social relationship to one another, members of one network will be unaware of the existence of members of the other network or networks for the purposes of interaction via the system.

The process diagrams shown in the figures provide a high level view of the specific processes. The system is comprised of various steps outlined below, with the numbers in brackets representing the corresponding steps in the detail process description and the corresponding flowchart:

Setup (0000-0100)
Propagation (0100-0499)
New User Contacted Through trusted server (0100-0499)
Direct User-to-User Contact (0300-0402)
Linking known clients (0400-0499)
Logon-Logoff from Client (0500-0799)
Logoff gracefully (0600-0699)
Logoff suddenly (0700-0799)
Searching (4000-499)
Searching through trusted Client (4000-4099)
Searching through Location Server (4100-4250)
Transfer/Exchange/Communications (5000-5999)
Remote access (6000-6099)
Setup (0000-0100)

Referring to FIG. 1 there is generally shown an overview of the setup process for the system according to one embodiment of the present invention. The user 1 uses a computing device 2. The computing device 2 has a software client 6 installed on it, which is supplied from a legitimate source, such as a CD bought from a merchant or downloaded from the trusted servers 3. The software client 6 is a software interface that manages the flow of data between the computing device 2, the trusted servers 3 and other computing devices connected to the network. The computing device 2 can be any digital device with sufficient capacity to run the software client 6 and to exchange data packets with other computing devices. The computing devices 2 include, but are not limited to, a computer, cell phone, mp3 player, pager, gaming console, handheld gaming device, wireless device, personal digital assistant and the like. The trusted servers 3 are computing devices connected to the network that can identify, verify and authenticate users of the network. The user 1 uses the software client to connect to the trusted servers 3 and the rest of the network. The software client can run on any computing device that has the capacity to store and process digital information and one or more communication means 4. The communications means 4 would be understood by a worker skilled in the art to include any necessary elements of hardware, including but not limited to communications ports, wireless transmitter/receivers, wires or fibre optics, and software, including but not limited to telephony, e-mail, facsimile, Bluetooth®, TCP/IP, FTP, XML, and IRC, that allow a computing device to exchange data packets with another computing device. The user 1 of a computing device 2 communicates with the trusted servers 3 by means of the communications means 4, downloads the software client, completes the setup process and is designated as User A 1.

Figure 2:
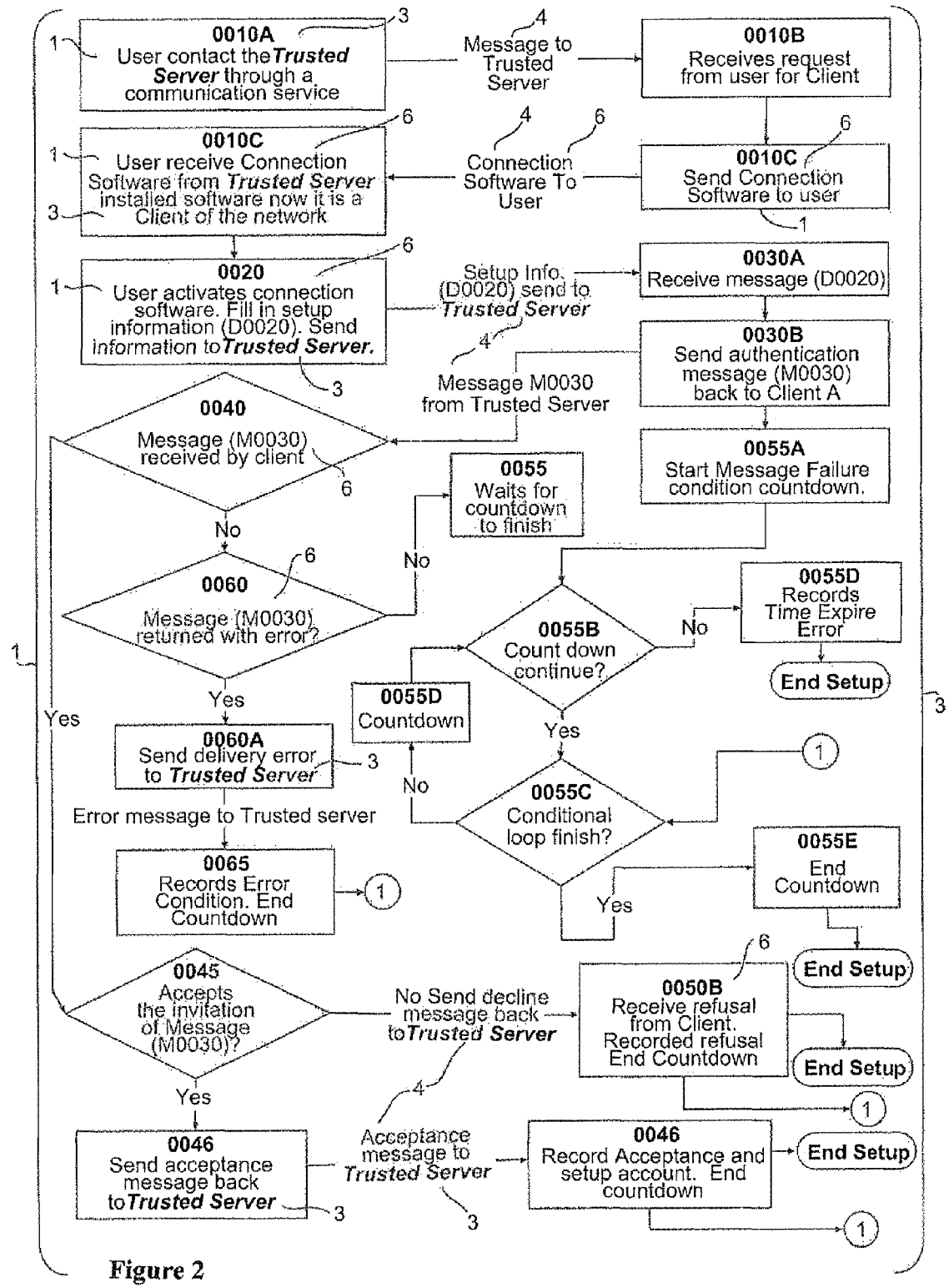
FIG. 2 is a flowchart diagram for setting up the Network according to one embodiment of the present invention.

FIG. 2 is a representation of the same process as a flowchart. Descriptions of the steps required in the process are as follows. In steps 0010A to 0010C of the process, the user 1 contacts the trusted servers 3 through an appropriate communication service 4 and downloads the software client 6. In an alternative embodiment of the present invention, the user 1 obtains the software client 6 from an offline source such as a software store. After the installation of the software client 4, the user 1 can now be known as User A 1. Once the software client 6 is installed, step 0020 is for User A 1 to activate the software client 6. The software client 6 queries User A 1 for setup information (D0020). In one embodiment of the present invention, the setup information (D0020) contains the contact information for User A 1 (e.g. Telephone number, e-mail, mailing address). In an alternative embodiment of the present invention, the setup information also includes demographic information such as gender, age, salary range, education, occupation, and other points of contact. User A 1 enters the required setup information D0020 which is sent through communication service 4 to trusted servers 3. In steps 0030A and B, trusted servers 3 receive the setup information (D0020) and send an automatically generated authentication message (M0030) to User A 1 based on the contact information specified in D0020. This step represents a confirmation of contact information provided by the software client 6. In step 0040, User A 1 receives the message. User A 1 now has a choice of actions after receiving information (M0030) from the trusted servers 3. In step 0045 User A 1 accepts the terms and conditions of use and, in step 0046, sends acceptance to trusted servers 3. The trusted servers 3 then create an account for User A 1. In step 0050B, User A 1 declines to accept the terms and conditions of use for the network, this refusal is send to the trusted servers 3. The trusted servers 3 note that User A 1 has abandoned the signup process. In steps 0055A to E, User A 1 does not act on Message (M0030) after a set period of time. The trusted servers 3 assume that the application has been abandoned. Alternatively, steps 0060A and B assume that the authentication message (M0030) was returned to trusted servers 3 with an error condition for message delivery. Examples of error conditions include but are not limited to a bounced back e-mail, a busy signal on a telephone or a returned mailing. In step 0065 the trusted servers 3 take note of the failure and reacts accordingly, either by abandoning the application process or repeating attempts to contact User A 1.

Propagation (0100-0499)

Propagation describes the process of how a user, in this case, User A adds another user whom they trust as a result of a pre-existing relationship (e.g. friends, family, and co-workers). This process can be repeated indefinitely to build up a list of trusted peers for User A.

User A can add a trusted peer in three ways:
ask trusted servers to contact a new user;
direct new user to the trusted servers, or
linking two users already on the network.
Each of these scenarios will be described in more detail as follows.

New User Contacted Through Trusted Servers (0200-0299)

Figure 3:
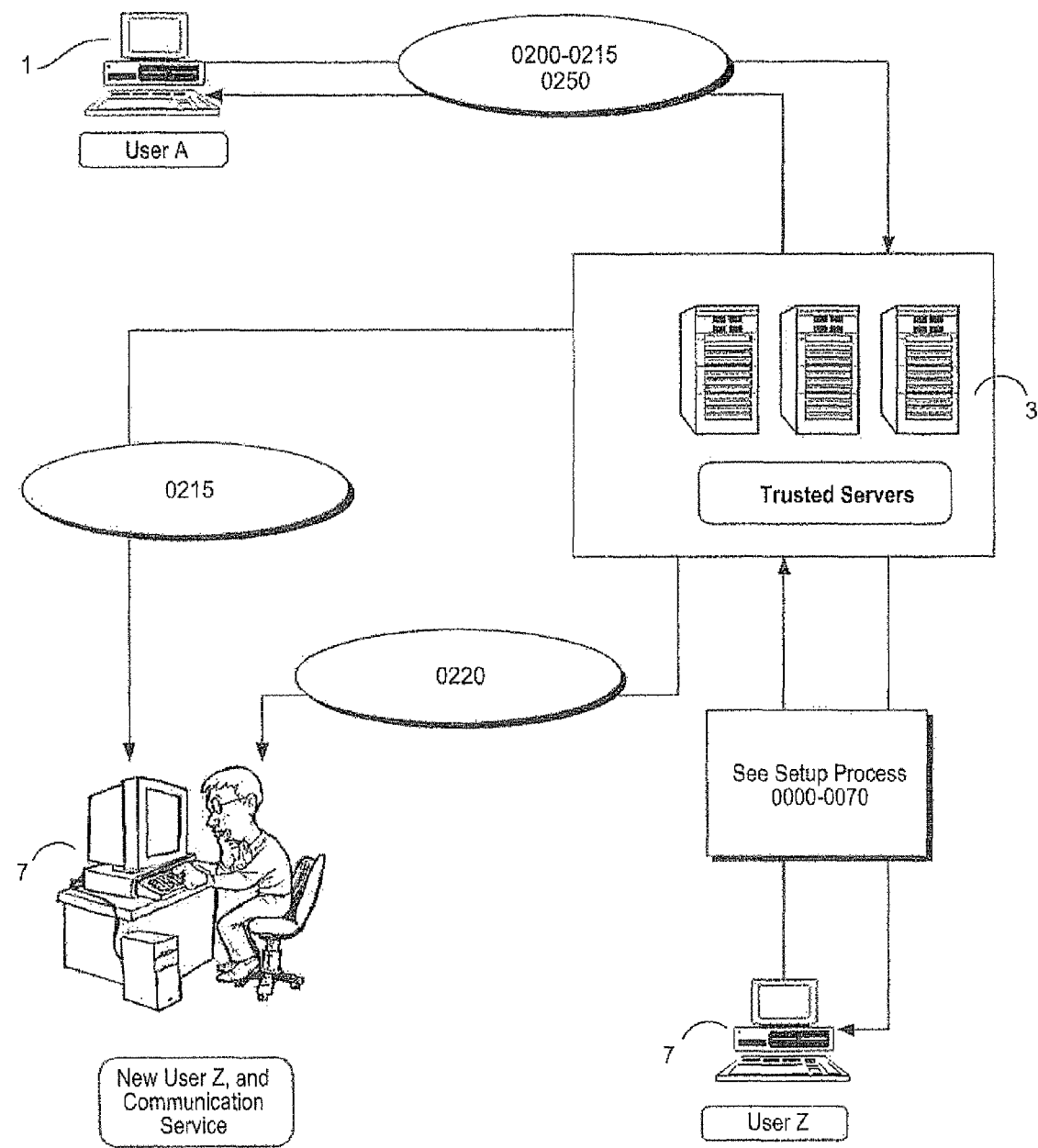
FIG. 3 is a process diagram describing the situation in which a new user is invited to join the network and contacted through a trusted server according to one embodiment of the present invention.
Figure 4:
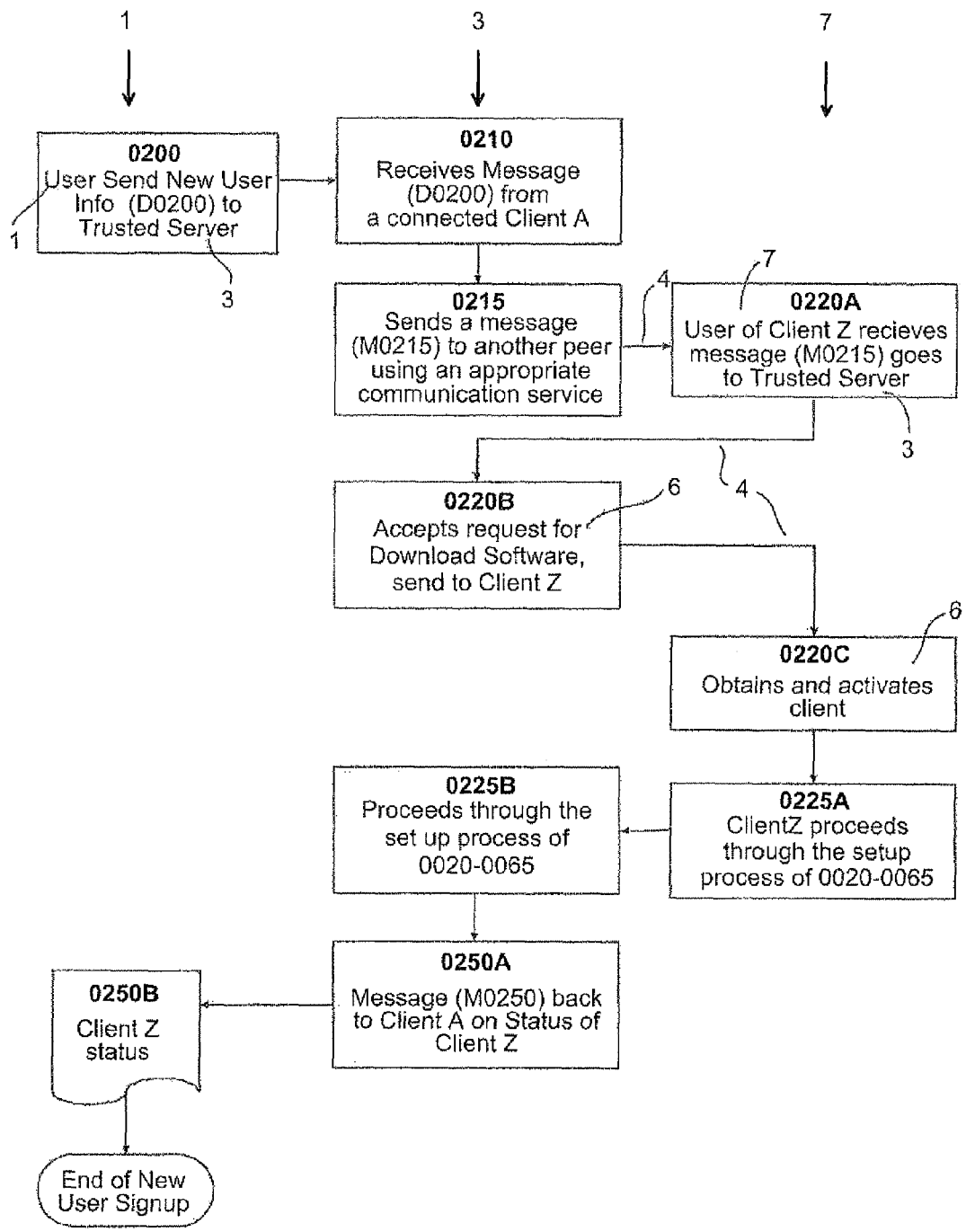
FIG. 4 is a flow chart describing the situation where a new user is contacted through the trusted servers according to one embodiment of the present invention.

With reference to FIG. 3, in one embodiment of the present invention, a user of the network, User A 1, initiates the process of adding a new user by sending the contact information of a trusted individual to the trusted servers 3. In an alternative embodiment of the present invention this process can take place at the same time as User A 1 initially joins the network. The new user, in this case defined as User Z 7, is contacted by the trusted servers 3 and prompted to join the network. User Z 7 is a person with whom User A 1 has a pre-existing relationship of trust either through a social network or through predefined roles in an organization. With reference to FIG. 4, in step 0200 User A 1 logs on to the network and sends a message (D0200) to the trusted servers 3. Message D0200 is comprised of the contact information for another trusted peer Z 7, as defined by User A 1 (for example, telephone number, e-mail, etc.). This is the start of the referral process for a new user, in this case, referred to as Z, a trusted peer defined by User A 1. In step 0210 the trusted servers 3 receive message D0200 and initiate the referral process. In step 0215, the trusted servers 3 send a message (M0215) to User Z 7, through an appropriate communication means 4 (as defined by the contents of message D0200) inviting User Z 7 to obtain the software client 6 from the trusted servers 3. The message (M0215) comprises: Explanation of Service, How to Download Software Client from trusted servers. In step 0220, User Z 7 receives message (M0215), and then downloads and installs the software client 6. In step 0225 User Z 7 proceeds through the setup process defined above by steps 0020-0070, above. Once this process is complete, in step 0250, the trusted servers 3 send a confirmation message (M0250) back to User A 1 indicating that User Z 7 is now a user of the electronic community. Step 0280 is the end of new user signup process.

Direct User to User Contact (0300-0399)

Figure 5:
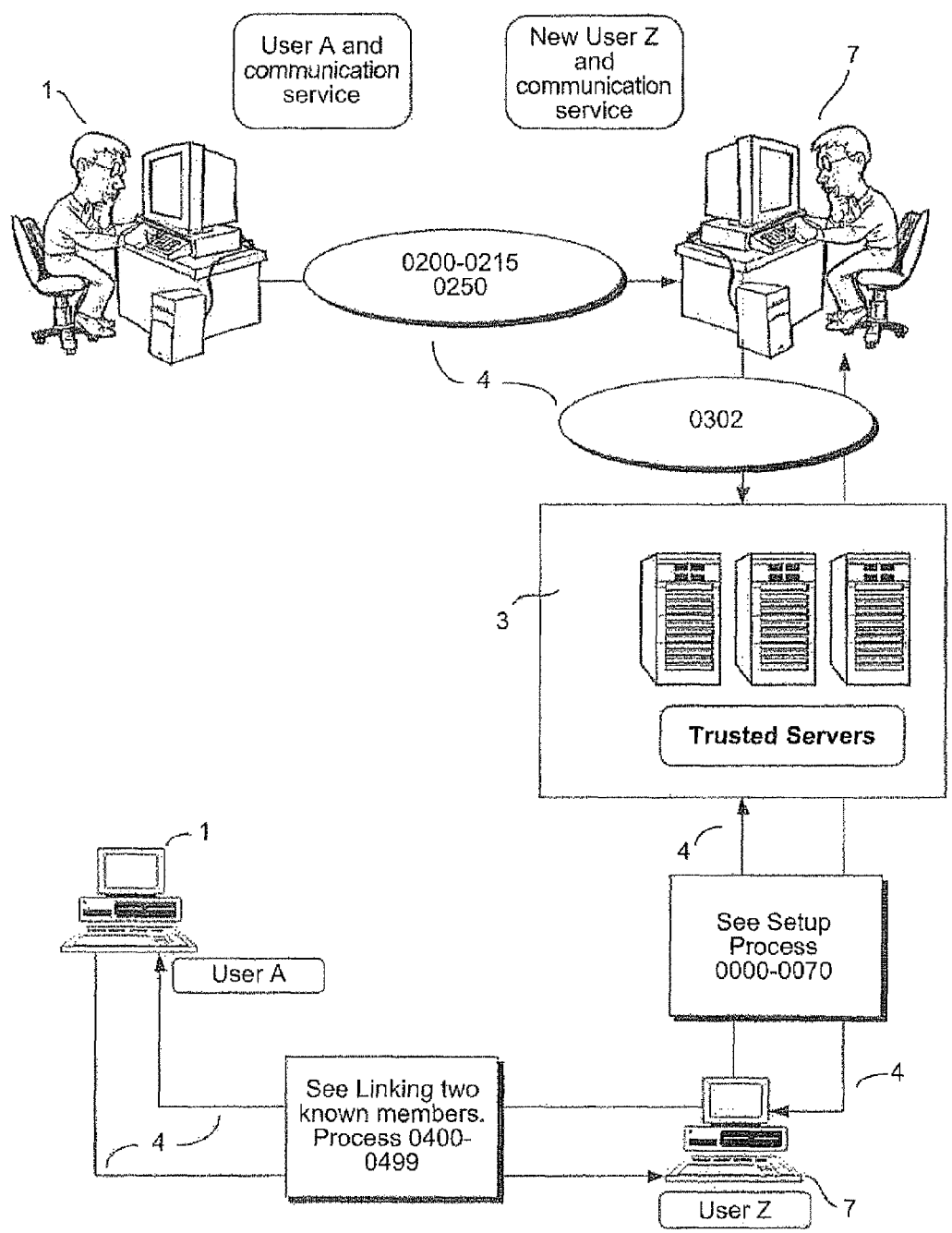
FIG. 5 is a process diagram describing the process by which a user refers a friend to the trusted server according to one embodiment of the present invention.
Figure 6:
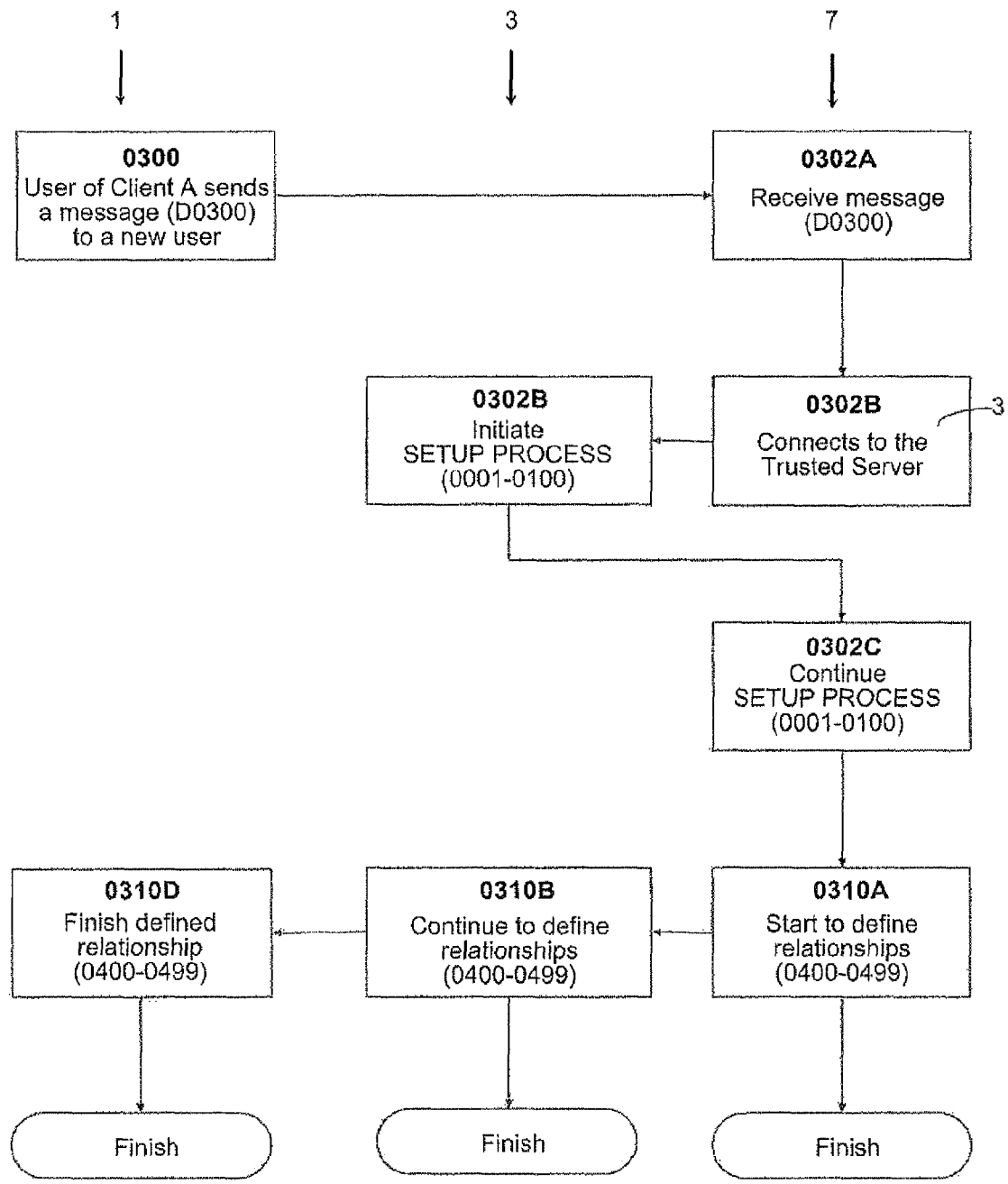
FIG. 6 is a flow chart describing the situation where a user is referred by a friend to the service according to one embodiment of the present invention.

In an alternative embodiment of the present invention, the new user is contacted by another user directly and prompted to sign up for the service. With reference to FIG. 5, User A 1 refers User Z 7 to a website where the software client can be downloaded and User Z 7 goes directly to this website. Alternatively, User Z 7 could obtain the software client through offline sources such as buying the software client on a CD from a store. The details follow and the accompanying flow chart is shown in FIG. 6. In step 0300 User A 1 sends a message (D0300) through an appropriate communication means 4 to a trusted peer, User Z 7, to tell them to sign up onto the network. Message (D0300) contains the location where User Z 7 can download the software client 6. In steps 0302A to C, User Z 7 receives Message (D0300), connects to the trusted servers 3 and proceeds through the Initial Setup process as discussed above in steps 0010-0100. In steps 0310A to C, after the account is set up, User Z 7 proceeds to define his or her relationship with User A 1 as outlined in process 0400-0499 below.

Linking Users Already on the Network (0400-0499)

Figure 7:
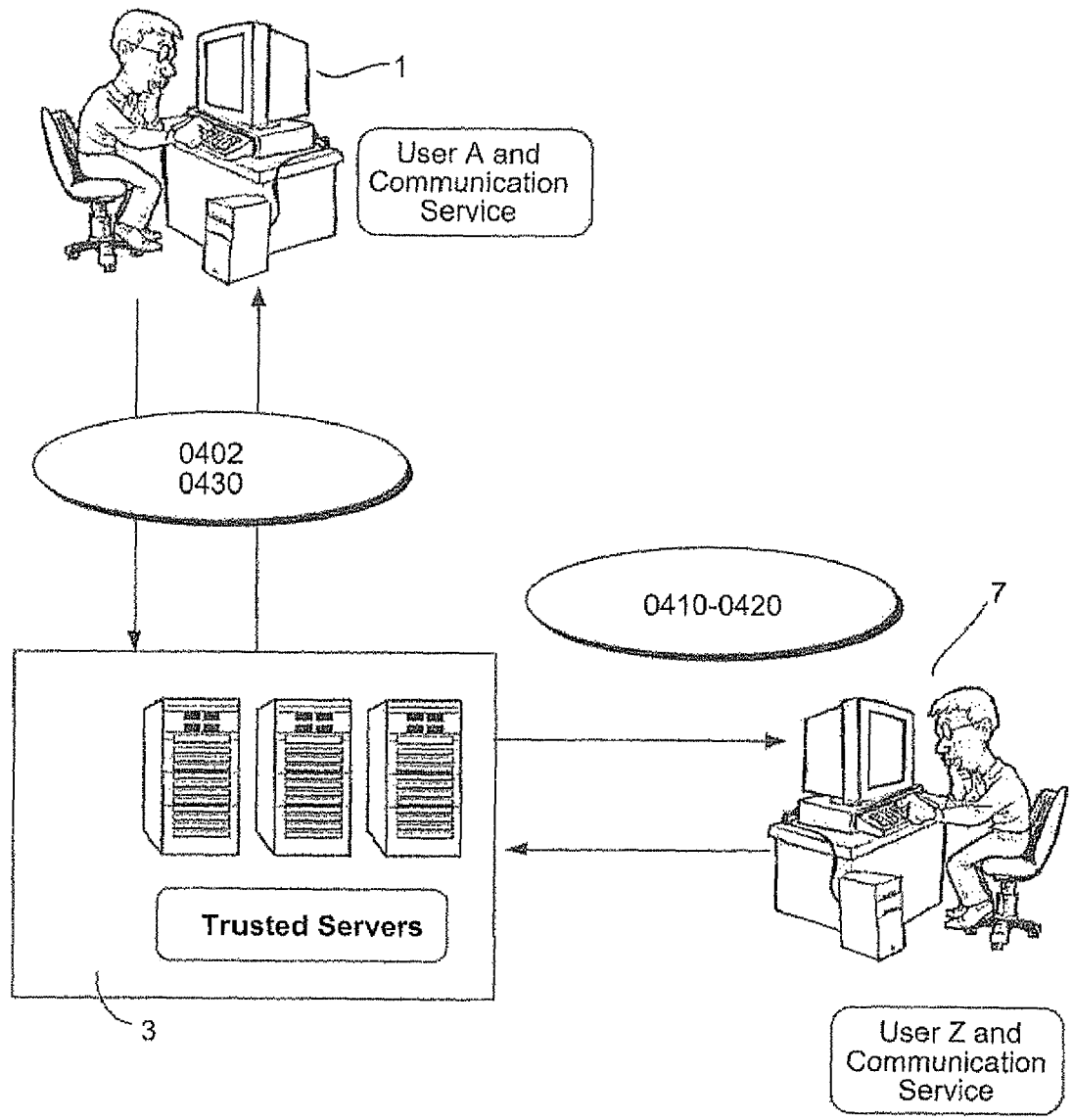
FIG. 7 is a process diagram describing the process by which a user establishes a relationship with another user of the network according to one embodiment of the present invention.
Figure 8:
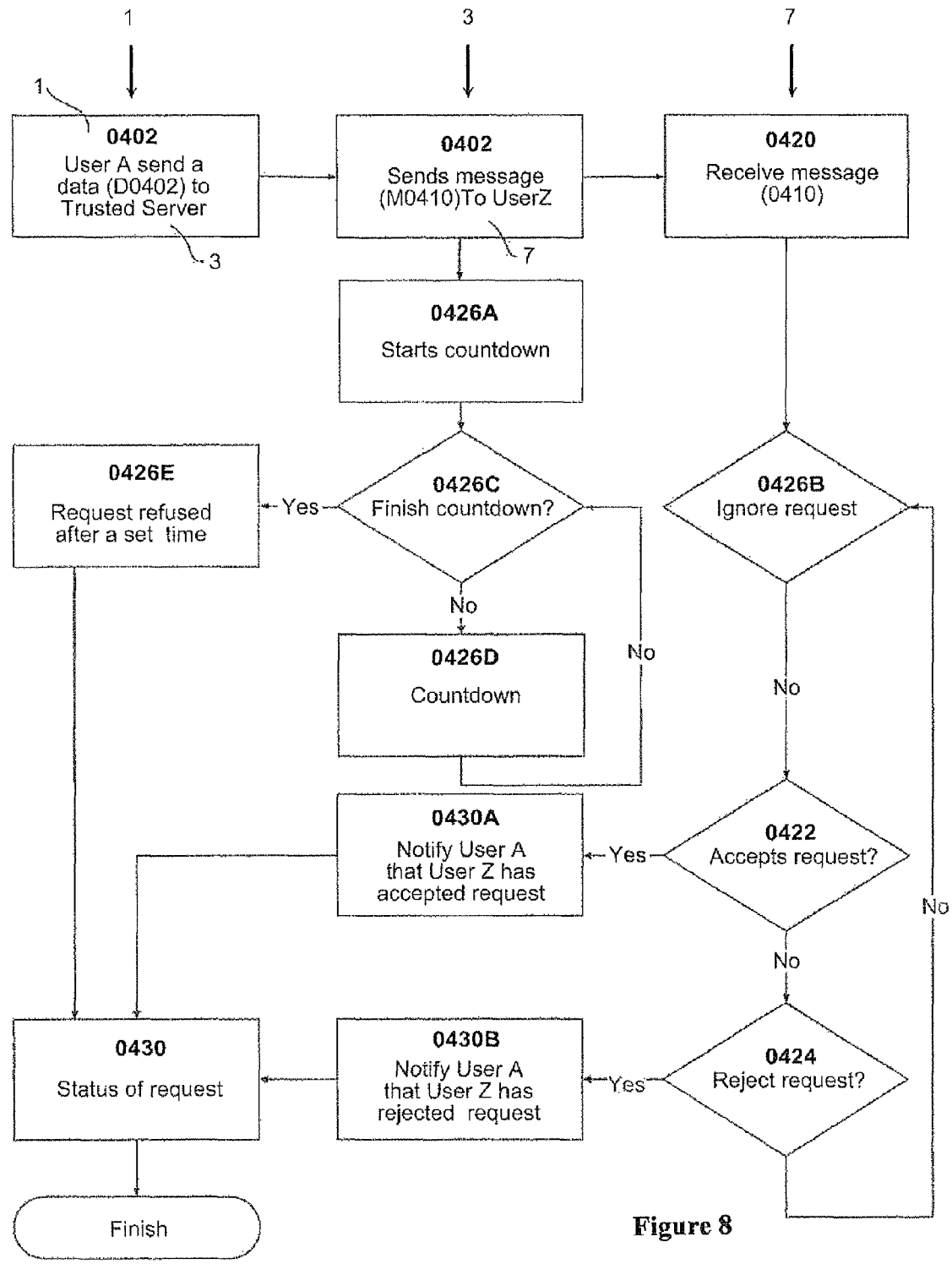
FIG. 8 is a flowchart describing the process by which a user establishes a relationship with another user of the network according to one embodiment of the present invention.

In an alternative embodiment of the present invention, a user wishes to establish a linkage with another user that is already a member of the network. With reference to FIG. 7 both User A 1 and User Z 7 are users of the network with a pre-existing relationship characterized by trust but who are not related users on the network. User A 1 sends a message to the trusted servers 3, defining User Z 7 as a trusted peer. User Z 7 can accept or reject this new definition, by communicating with the trusted servers 3. With reference to FIG. 8, in step 0402, User A 1 sends data (D0402) to the trusted servers 3 defining User Z 7 as a trusted peer. Data (D0402) comprises the unique identifying information of User Z 7. In step 0410, the trusted servers 3 receive data (D0402) and send message (M0410) to User Z 7 notifying them of a request to create a relationship with User A 1. In step 0420 User Z 7 receives message (M0410) and takes one of several, alternative, actions. In step, 0422 User Z 7 accepts the request and sends acceptance (D0422) back to the trusted servers 3. In step 0424, User Z 7 declines the request and sends refusal (D0424) back to the trusted servers 3. Finally, in steps 0426A to E, User Z 7 ignores the request and the request is considered to have been refused after a set time has elapsed. In step 0430, the trusted servers 3 relay the action of User Z 7 to User A 1 and also note the action for the authentication and identification service.

Logon to the Network with the Client Software (0500-0599)

Figure 9:
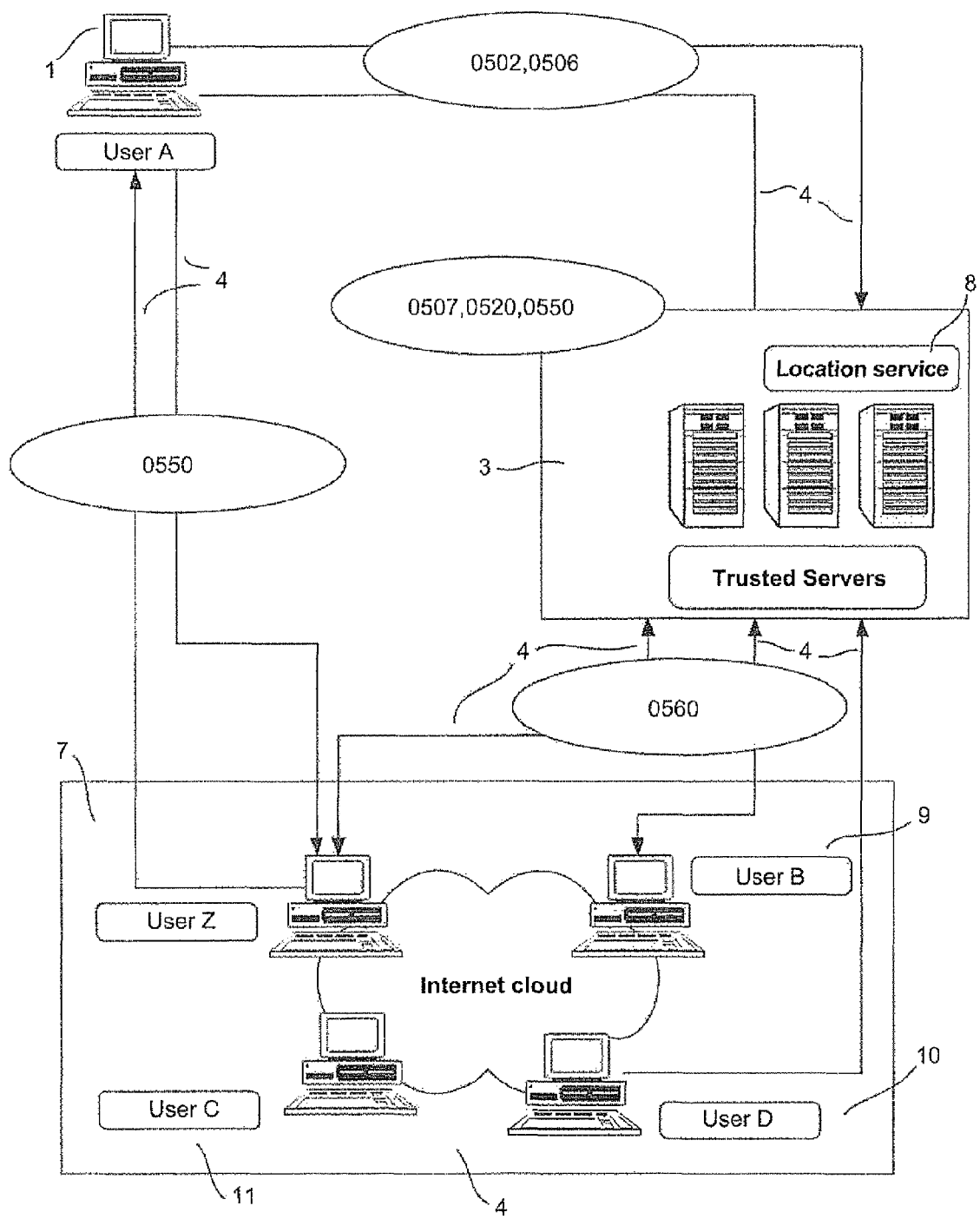
FIG. 9 is a process diagram describing the process of accessing to the network according to one embodiment of the present invention.
Figure 10:
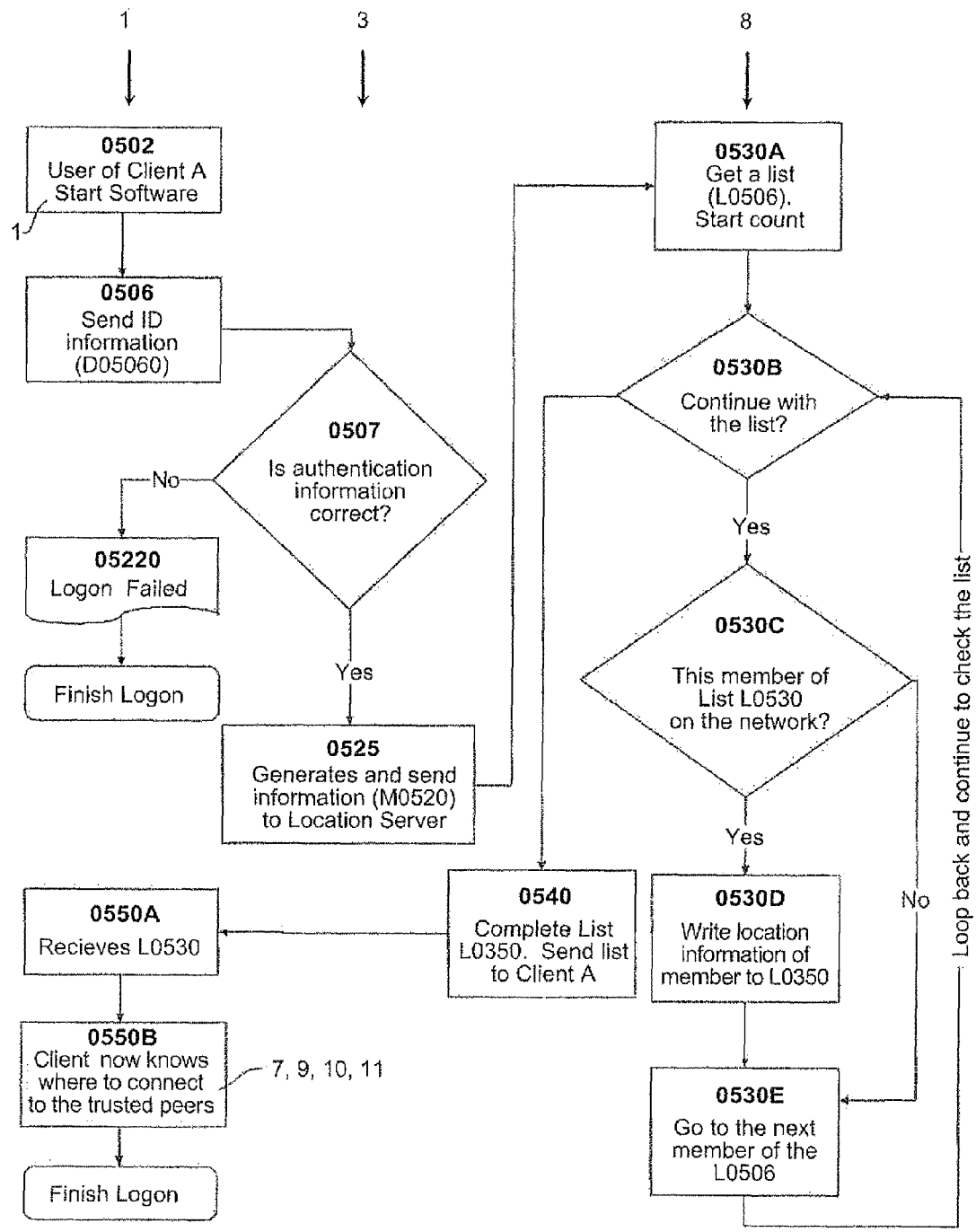
FIG. 10 is a flow chart describing the access process according to one embodiment of the present invention.

The process of access to the trusted network by a user using the client software is summarized in FIG. 9. The details of the process are shown in steps 0500-0599 and are represented by a flowchart in FIG. 10. In step 0502, User A 1 activates software client 6. In step 0506 the software client 6 contacts the trusted servers 3 through an appropriate communication means 4 and sends the identification information (D0506) which comprises a UserID and a Password. In an alternative embodiment of the present invention, the identification information can further comprise an e-mail address, communication port information or IP address, N (level of trust required to access the user's information, or a list of trusted peers (L0506). In step 0507, User A 1 undergoes an authentication process on the trusted servers 3. In one embodiment of the present invention the authentication process comprises comparing the UserID and password submitted by User A 1, with information stored on the trusted servers 3. In an alternative embodiment of the present invention, the authentication information further comprises biometrics data such as fingerprint or retinal scan, facial recognition, or other types of metrics that are designed to verify the identity of User A 1. In step 0520, User A's 1 identity is verified. Then, in step 0525, the trusted servers 3 generate information and instructions (M0520) which are sent to the Location Service 8, a software program. The information and instructions (M0520) include at the minimum the UserID and a list of trusted peers for the particular User. The Location Service 8 is a specialized service that has access to a database comprising the identifying information and connection point of each user on the network. The Location Service 8 is run by a Location Server which is considered to be one of the trusted servers 3. In one embodiment of the present invention, connection point is defined as a socket connection for a TCP/IP network. In steps 0530A to E, the Location Service 8 goes through a list and determines which trusted peers 7, 9, 10, 11 of User A 1 are currently connected to the network. The connection points of the users are summarized in a list (LIST0530). In step 0540, the Location Service 8 sends list (LIST0530) to User A 1. In step 0550, the list (LIST0530) has been received and User A 1 can now connect to each of the trusted peers on the list. The trusted peers of User A that are currently not connected to the network are identified as "not available". In step 0560, the Location Service also goes through list (LIST0530) and notifies each user of the list, namely, User Z 7, User B 9, User D 10, and User C 11 that User A 1 is now available on the network. Alternatively, in step 0550, User A's 1 identity is not verified. The trusted servers 3 will not allow User A 1 to proceed further. Step 0599 is the end of the logon process.

Logoff (0600-0799)

In one embodiment of the present invention, there are two ways to logoff or disconnect from the network. The two ways are:

Logoff gracefully—when the user can exit the program using a series of predefined steps.

Logoff suddenly—when the connection was terminated abruptly.

Each of those steps is described in this section.

Logoff Gracefully 0600-0699

Figure 11:
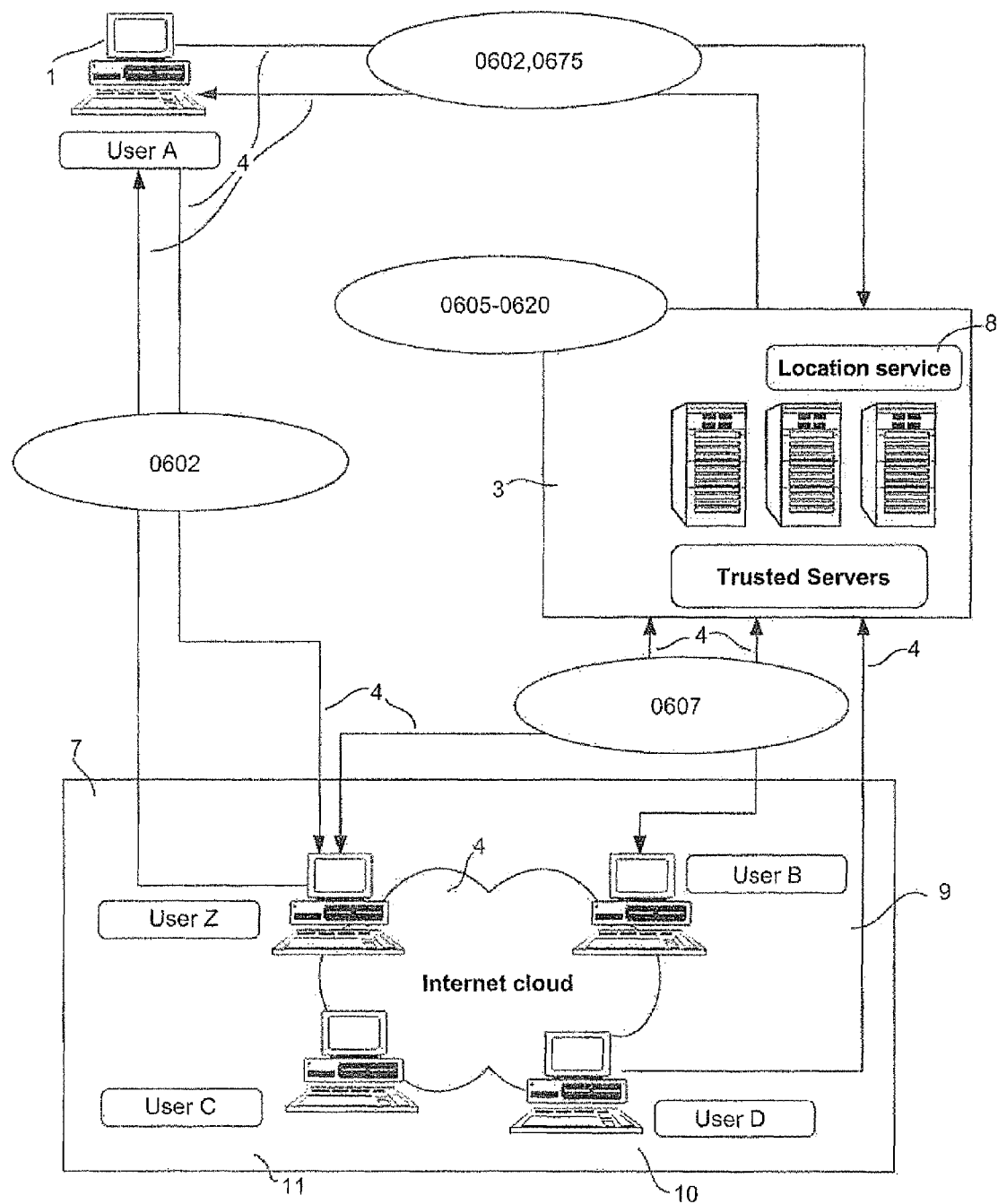
FIG. 11 is a process diagram describing the process to access to the network according to one embodiment of the present invention.
Figure 12:
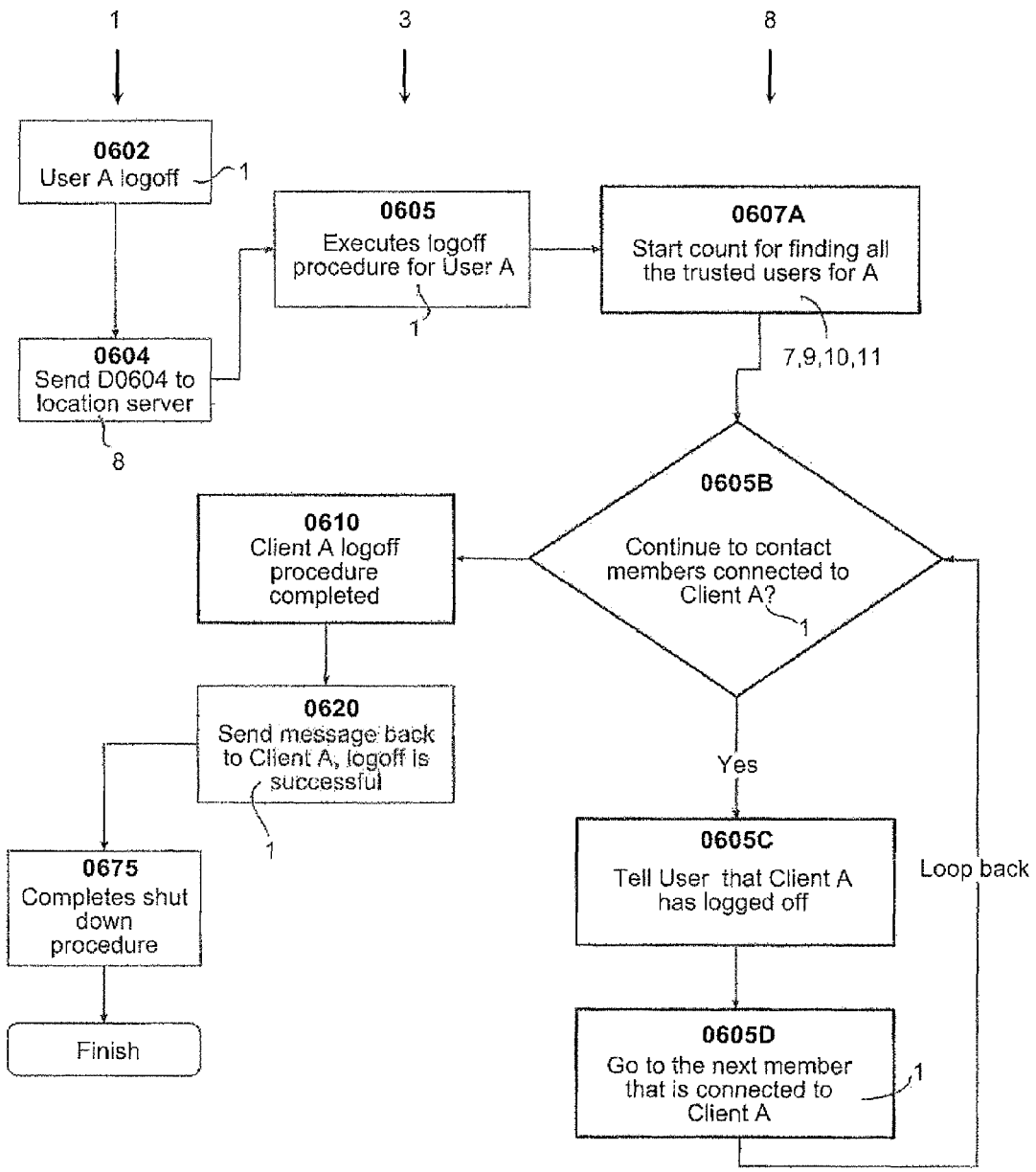
FIG. 12 is a flow chart describing the situation where the client logoff from the network gracefully according to one embodiment of the present invention.

The process details regarding disconnecting or logging off from the network gracefully are summarized in FIG. 11. The details of the process are given in steps 0600-0699 and a flow diagram given in FIG. 12. The graceful logoff process begins at step 0602 where User A 1 decides to disconnect from the network and follows the standard logoff procedure. The logoff procedure comprises suspending all activities and, optimally, saving all key configurations. In step 0604, User A 1 uses the software client 6 to send a command to log off of the network (D0604) to the trusted servers 3. In step 0605, the trusted servers 3 execute the logoff procedure for User A 1. The trusted servers 3 inform the Location Server 8 that User A 1 is logging off. In step 0607, the Location Server 8 executes procedures to inform all the trusted peers of User A 1 that User A 1 will be unavailable. For example, User Z 7 will be informed that User A 1 is no longer available. In step 0610, the Location Server 8 sends message to the trusted servers 3 that User A's logoff procedure is completed. In step 0620, the trusted servers 3 send message to the software client 6 of User A 1 that it is allowed to shut down. In step 0675, the software client 6 of User A 1 completes the shutdown routine.

Logoff Suddenly 0700-0799

Figure 13:
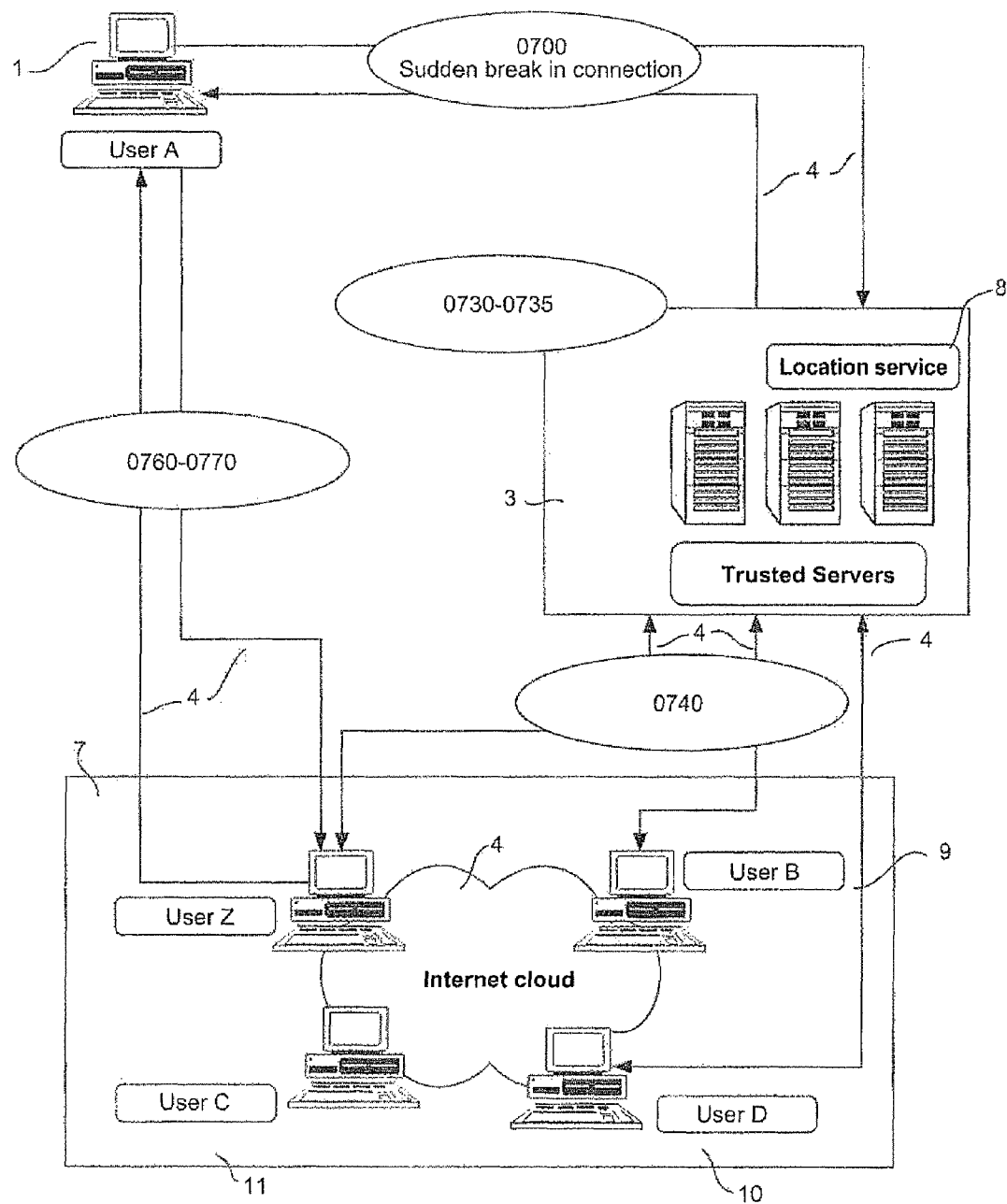
FIG. 13 is a process diagram describing the situation where the client logs off from the network suddenly according to one embodiment of the present invention.
Figure 14:
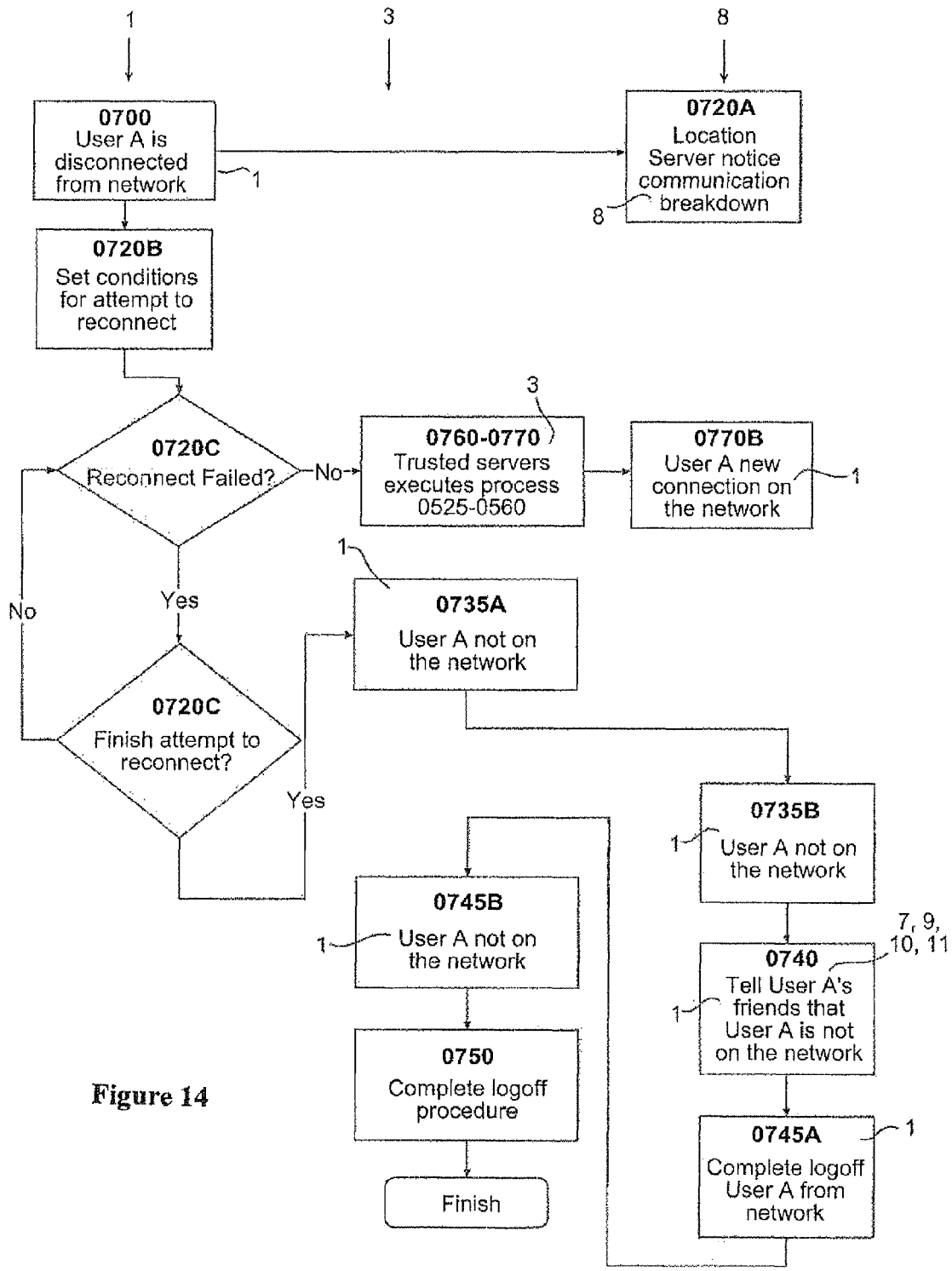
FIG. 14 is a flowchart describing the situation of sudden client logoff from the network according to one embodiment of the present invention.

The process details for when a software client suddenly disconnects from the network is summarized in steps 0700-0799. A process diagram for those steps is given in FIG. 13 and the corresponding flow diagram for this process given in FIG. 14. In step 0700, User A 1 is suddenly disconnected from the trusted servers 3 (i.e. the connection point between the location server 8 and the software client 6 is severed, for example, due to an equipment or power failure). In step 0720, the client software of User A 1 attempts to reconnect to the trusted servers 3. In one embodiment of the present invention, the number of reconnection attempts is defined by a set condition, such as a finite number of attempts or a defined period of time. In step 0730, the attempt to reconnect fails. In step 0735, User A 1 executes logoff procedure. In step 0740, the Location Server 8 executes procedures to inform all the trusted peers connected to User A 1, namely 7, 9, 10, and 11 that User A 1 will be unavailable. In step 0745, the Location Server 8 sends message to trusted servers 3 that User A's 1 logoff procedure has been completed. As a result, in step 0750, the trusted servers 3 note that User A 1 is not on the network. Alternatively, in step 0760, User A 1's attempt to re-connect with the trusted servers 3 succeeds. In step 0765, the trusted servers 3 note the new connection point for the User and, in step 0770 starts process 0525-0560 to inform User A 1's trusted peers 7, 9, 10, 11 that User A 1 is again available. Step 0799 is the end of the sudden logoff process.

Searching 4000-4999

In one embodiment of the present invention, there are provided three ways of searching or discovering resources through the network. The processes are defined as:

Query through trusted clients including identification information

Query using relays

Query through the trusted servers

These three processes are not mutually exclusive and can be used in conjunction with each other to search the network.

Searching Through Trusted Clients Including Identification Information 4000-4099

Figure 15:
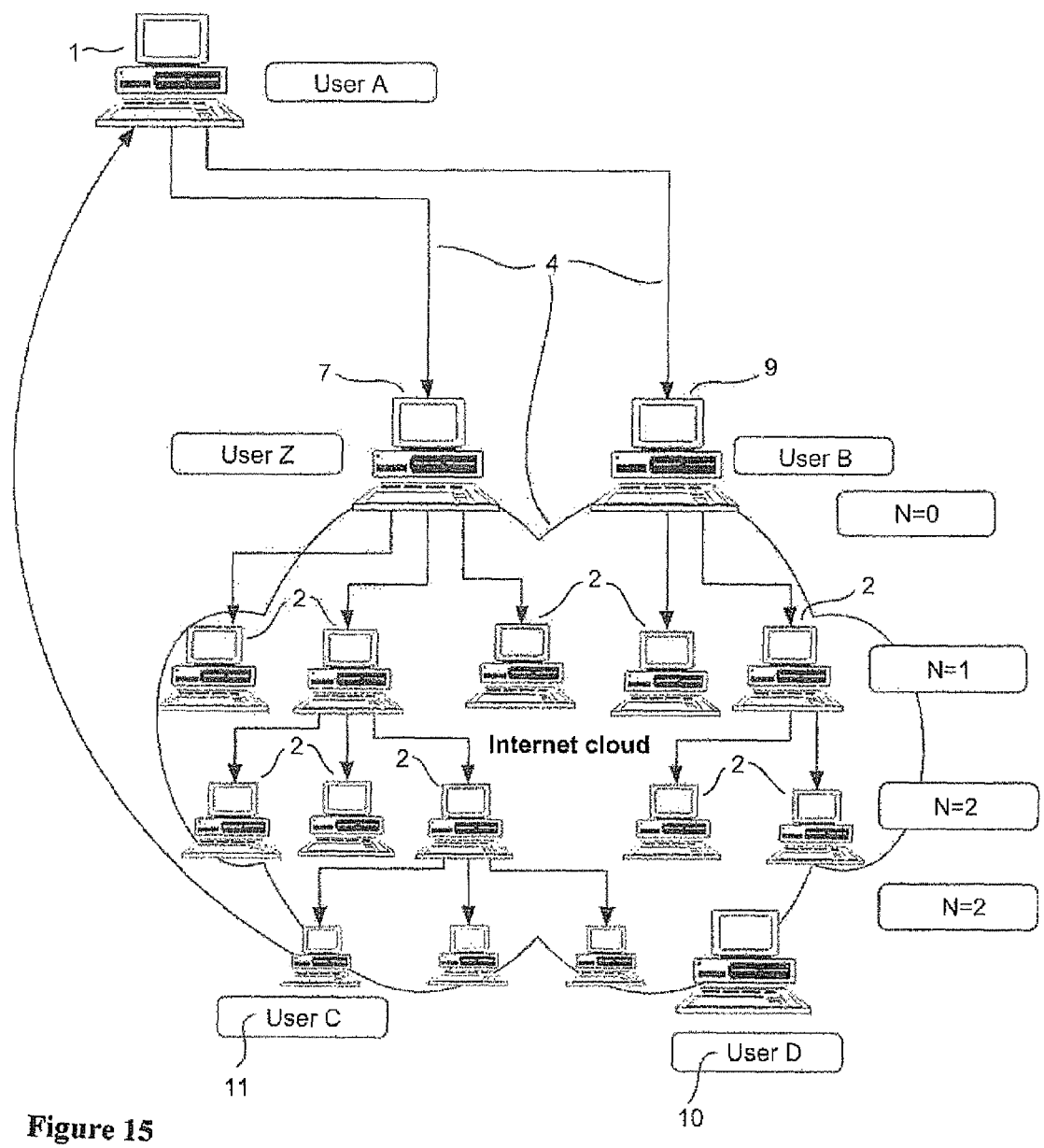
FIG. 15 is a process diagram describing searching other trusted clients with information passing directly back to the initiator according to one embodiment of the present invention.

In this type of search, the search is carried out on the trusted social network with the user identification being transmitted along with the query. This type of searching provides the least amount of privacy and anonymity to the searcher. The process details for searching through trusted clients are summarized in steps 4000-4099. The process diagram is given in FIG. 15 and the corresponding flow chart is given in FIG. 16. FIG. 15 is an example of a search carried out thorough three degrees of separation (N=3). User A 1 initially sends out a query to search through N=3 on the network. User A 1 is known as the initiator of the query. For this case, the query is sent to User Z 7 and User B 9. They in turn, forward the query from User A 1 to their list of trusted peers. From the perspective of User A 1, the search depth has now increased by one level and the search is now defined as a search of one degree of separation (N=1). This search continues through all the trusted peers in User A 1's network until the depth of N=3 has been reached. In each case, the local computing device 2 of each user is searched to see if the objective of the query can be satisfied. For this example, User C 11, who is N=3 levels away from User A 1, can answer the query and communicates the response to the search directly with User A 1, the initiator. In this example, User D 10 who is authorized to be on the network but bears no social relationship to User A 1 will not be queried.

Figure 16:
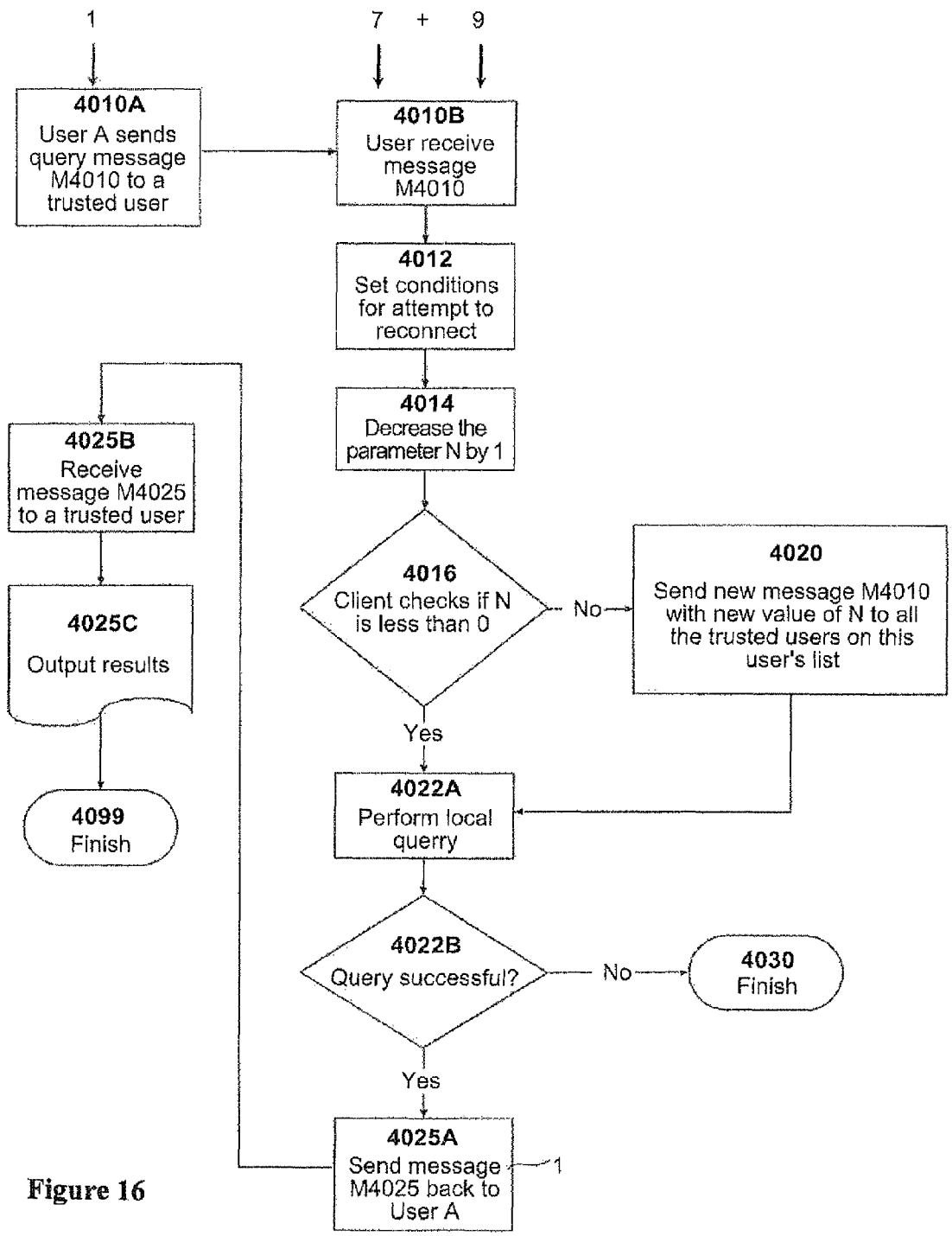
FIG. 16 is a flow-chart diagram describing the process of searching other trusted clients with information passing directly back to the initiator according to one embodiment of the present invention.

With reference to FIG. 16, In step 4010, User A 1 sends a message (M4010) containing a search query, the degree of separation (N) and identification information to each of the trusted peers on the network. User A 1 is known as the initiator of the query. In one embodiment of the present invention the search query can be comprised of, text strings, file descriptors, commands or instructions. In step 4012, the message is sent to one of the trusted peers of User A 1, for example User Z 7. In step 4014, User Z 7's software client decreases the parameter N by 1, then, in step 4016, it checks to see if N is less then 0 then proceeds to step 4022, performing a query of the system of User Z 7. Then, in step 4020, the client of User Z 7 sends a new message with the initial query and the new value of N to the trusted peers of User Z 7. These steps generate a recursive process that will search through all the clients related to User A 1 by N degrees of separation. In step 4025, the query is successful send message M4025 to the initiator. In this case, User C 9 sends back a message (M4025) to User A 1. In one embodiment of the present invention, message M4025 comprises the location and availability of the object and the parameter N. Alternatively, in step 4030, the query is unsuccessful and the search ends on that particular computing device. In either case, step 4099 is the end search.

Query Using Relays 4100-4250

Figure 17:
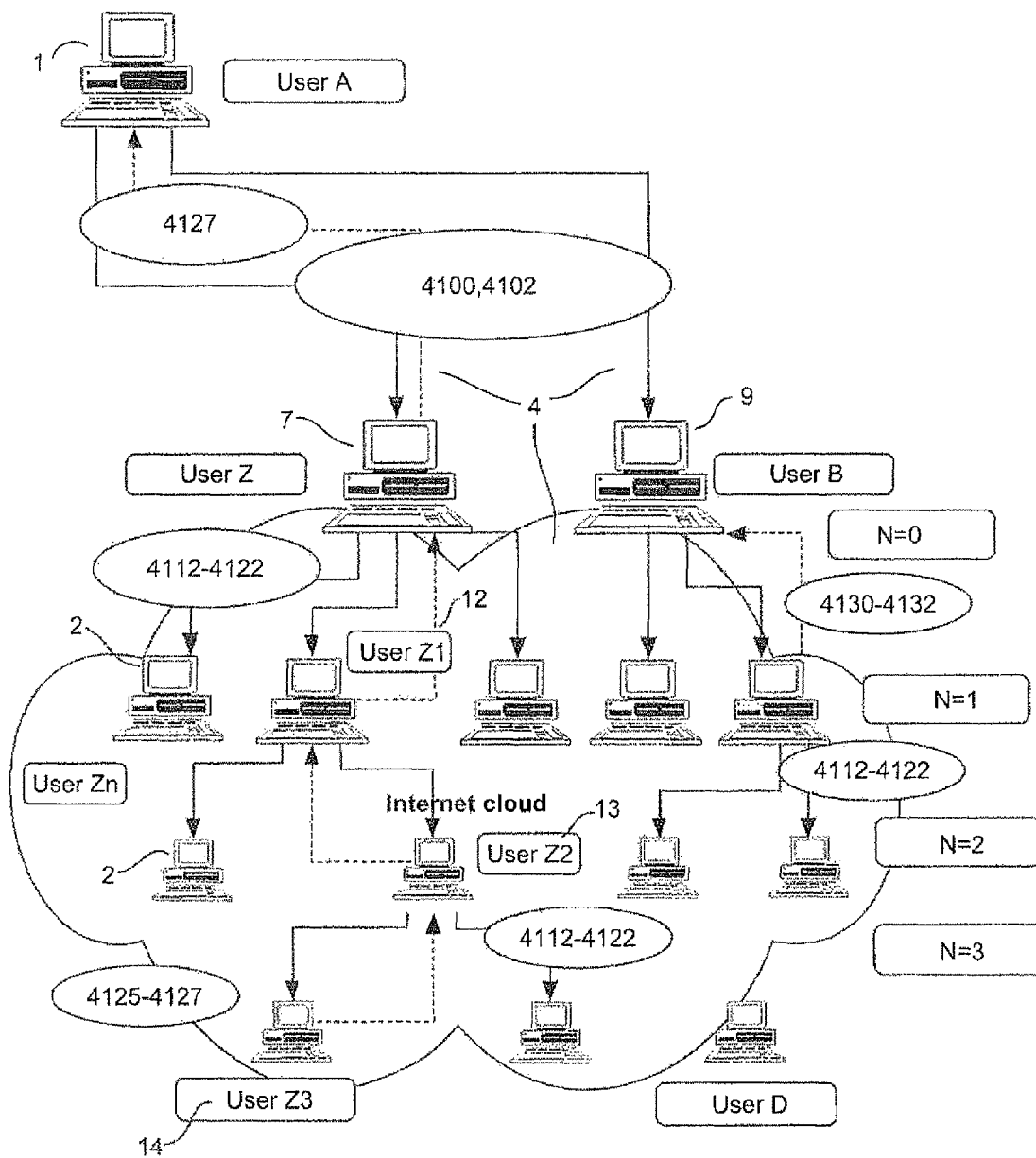
FIG. 17 is a process diagram describing the process of searching for information on the computing devices of trusted peers with some degree of privacy according to one embodiment of the present invention.

In certain cases, the initiator of a query wishes to protect their anonymity or limit the knowledge of their identity only to their own trusted peers. In such a case, identification information of the initiator is not passed on with the search query through the trusted network. Each user queried is only aware of the identity of the user who forwarded the query to them, not the identity of the initiator. The process details for searching in this fashion are summarized in steps 4100-4250. The process diagram is given in FIG. 17 and a flow chart is given in FIG. 18. In FIG. 17, User A 1, the initiator of the query, performs a search that is defined for three degrees of separation (N=3). In this case, User A 1 sends the query to two trusted peers, User Z 7 and User B 9. Both User Z 7 and B 9 keep an internal record of the query and then pass on the query to the trusted peers on their list. For example, User Z 7 passes the query to Z1 12 and Zn 2. This process continues until the degree of separation of three (N=3) is reached. In each case, the User performs a search on their own computing device to determine if they can satisfy the query and records the originator of the query. In this example, User Z3 14 is finally reached and a local search on Z3's 14 system indicates that Z3 14 has an answer. The response to the query is passed back to the immediate user that submitted the query—in this case, User Z2 13. This process continues through the network until the initiator, in this case, User A 1, receives the answer. In this example, User Z3 14 passes the answer back to User Z2 13, who in turn passes the information back to Z1 12. Z1 12 passes back to Z 7 and finally Z 7 responds to User A 1.

Figure 18:
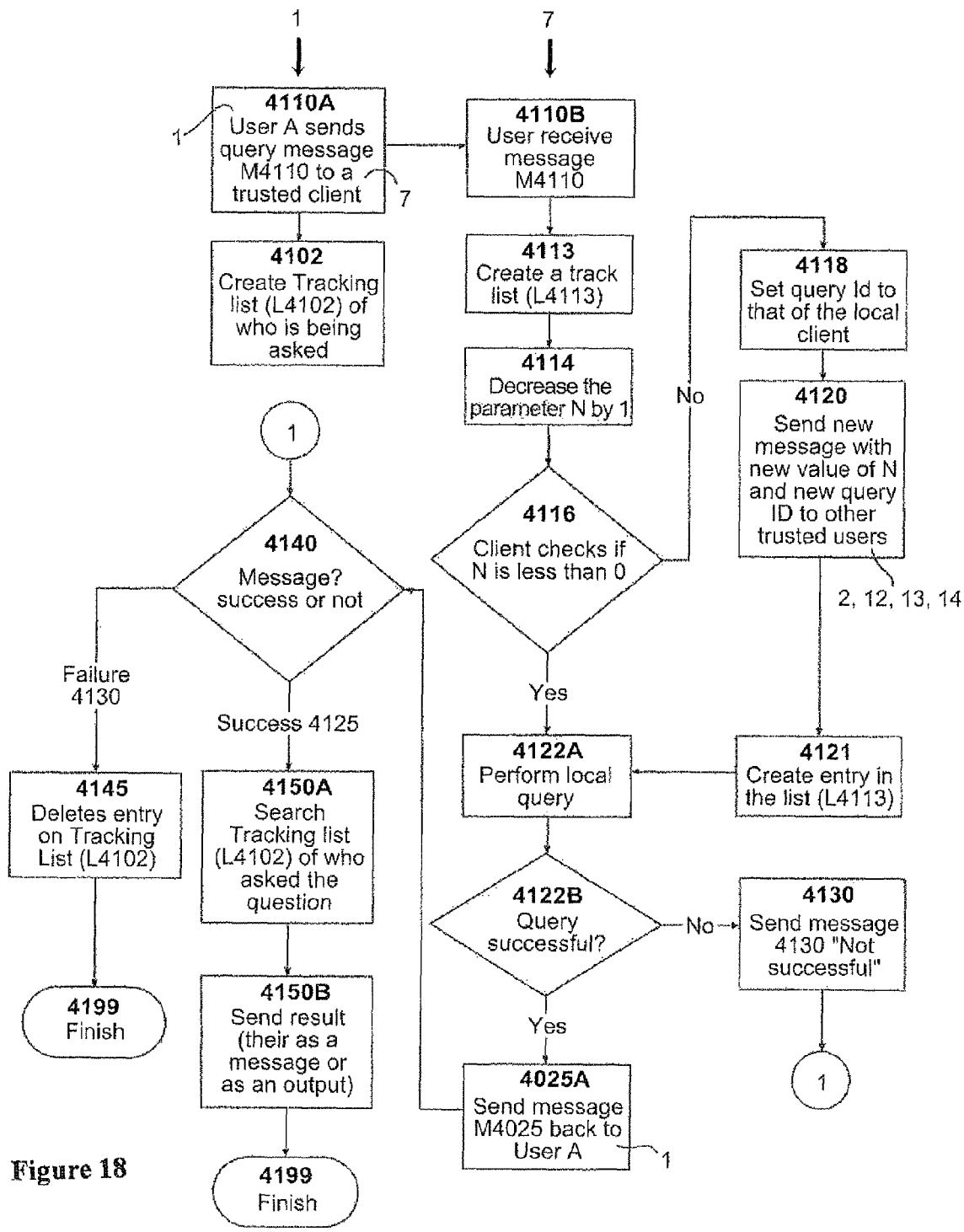
FIG. 18 is a flow chart describing the process of searching for information on the computing devices of trusted peers with some degree of privacy according to one embodiment of the present invention.

In this method, only the trusted peers of the initiator know the identity of the initiator. The computing device for each User receives only the information on the last user to forward the query or to respond. With reference to FIG. 18, in step 4100, User A 1 sends a message (M4010) containing a search query, the degree of separation (N) to each of User A 1's trusted peers on the network and query identification information. The search query can be, but is not limited to, a text string, file descriptors, commands or instructions. The query identification information includes but is not limited to a unique identifier of a query, the originator of the query and the recipient of the query. In this case, User A 1's question Q1 is sent to User Z 7. In step 4102, the software client 6 of User A 1 creates a tracking list (L4101) of trusted peers that were forwarded Q1, namely, User Z 7 and User B 9 were asked the question Q1. In step 4113, on one of the trusted peers of User A 1, for example User Z 7, the software client 6 also creates a list to track the trusted peers (L4113) that will have Q1 forwarded to them. For example, all the trusted peers of User Z 7, 12, 13, 14 that are forwarded Q1 from User Z 7. In step 4114, the software client 6 of User Z 7 decreases the parameter N by 1. In step 4016, the software client 6 of User Z 7 checks as to whether N is less than 0. If N is greater than 0, the software client proceeds to step 4122, below and, in step 4018, amends the query identification in Q1 to be that of User Z 7. In step 4020, the software client sends a new message from User Z 7, with the new query identification information and the new value of N to each trusted peers as defined by User Z 7. For example, Q1 is forwarded to User Z1 12 and to User Zn 2. In step 4021, the software client 6 of User Z 7 creates an entry on the list (L4113) for each query sent to each particular trusted peer of Z 7. If, in step 4016 above, N is less than 0 then the software client does not forward the query on to further trusted peers. This series of steps generates a recursive process that will search through all the clients related to User A 1 by N degrees of separation as defined by User A 1. Once the above chain of steps is completed, the software client 6 proceeds to step 4122 and performs the query on the local computing device. If the query is successful the software client 6 moves to step 4125 and sends a message (M4125) to the user that requested the information based on the query identification information. For example, User Z3 14 sends message M4125 back to User Z2 13 that the search was successful. Message M 4125 includes but is not limited, to the location and availability of the object of the search. If the query is unsuccessful on the local computing device, the software client 6 sends a message (M4130) back to the contact as specified in the query identification information. Message M4130 comprises a report that the query was not successful. In step 4140, the software client 6 of the next user in the chain of communication checks to see if the message is 4125 (successful query) or 4130 (unsuccessful query). In step 4145, a software client 6 that receives the unsuccessful query message 4130, deletes this entry from the tracking List L4113. In step 4150, the software client 6 that receives message 4125 (successful query) searches on list L4113 to identify the queror and sends a response back to this initiator on the success of the query. This information is relayed from one trusted peer to the next until the original initiator of the query is contacted. As outlined in the process diagram, User Z3 14 can satisfy User A 1's query. User Z3 14 sends an affirmative message to Z2 13. User Z2 13 searches on list L4113 to see that Z1 12 forwarded the query to User Z2 13. Z2 13 then informs Z1 12 that Z2 13 has an answer to the query. This process continues until User Z 7 informs User A 1 that an answer to the query is available. At this point User A 1 can access the object of the query on User Z3's 14 computing device.

Searching Through Location Server 4300-4399

Figure 19:
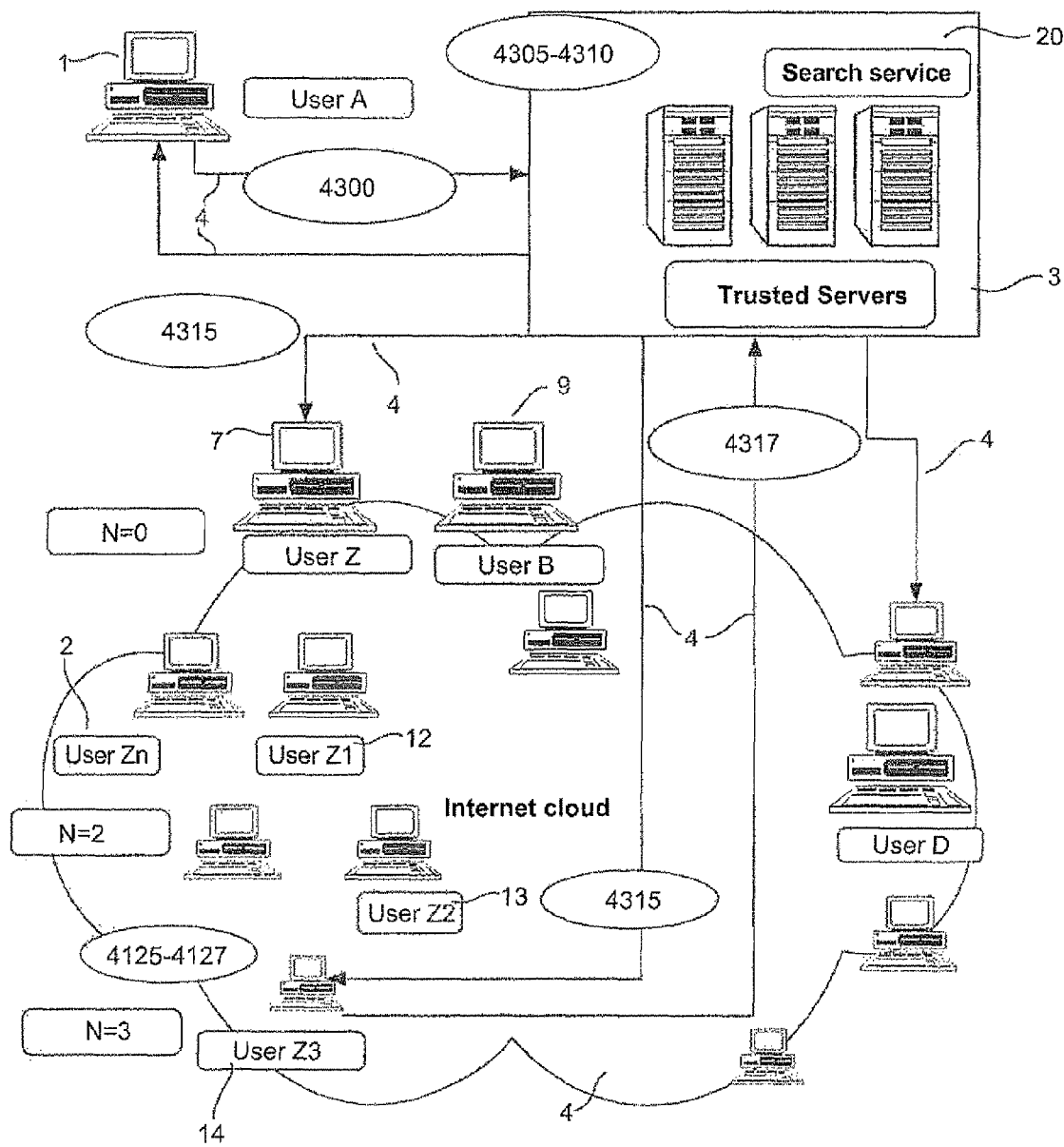
FIG. 19 is a process diagram describing the process of searching for information located on the computing devices of trusted peers through the trusted servers according to one embodiment of the present invention.
Figure 20:
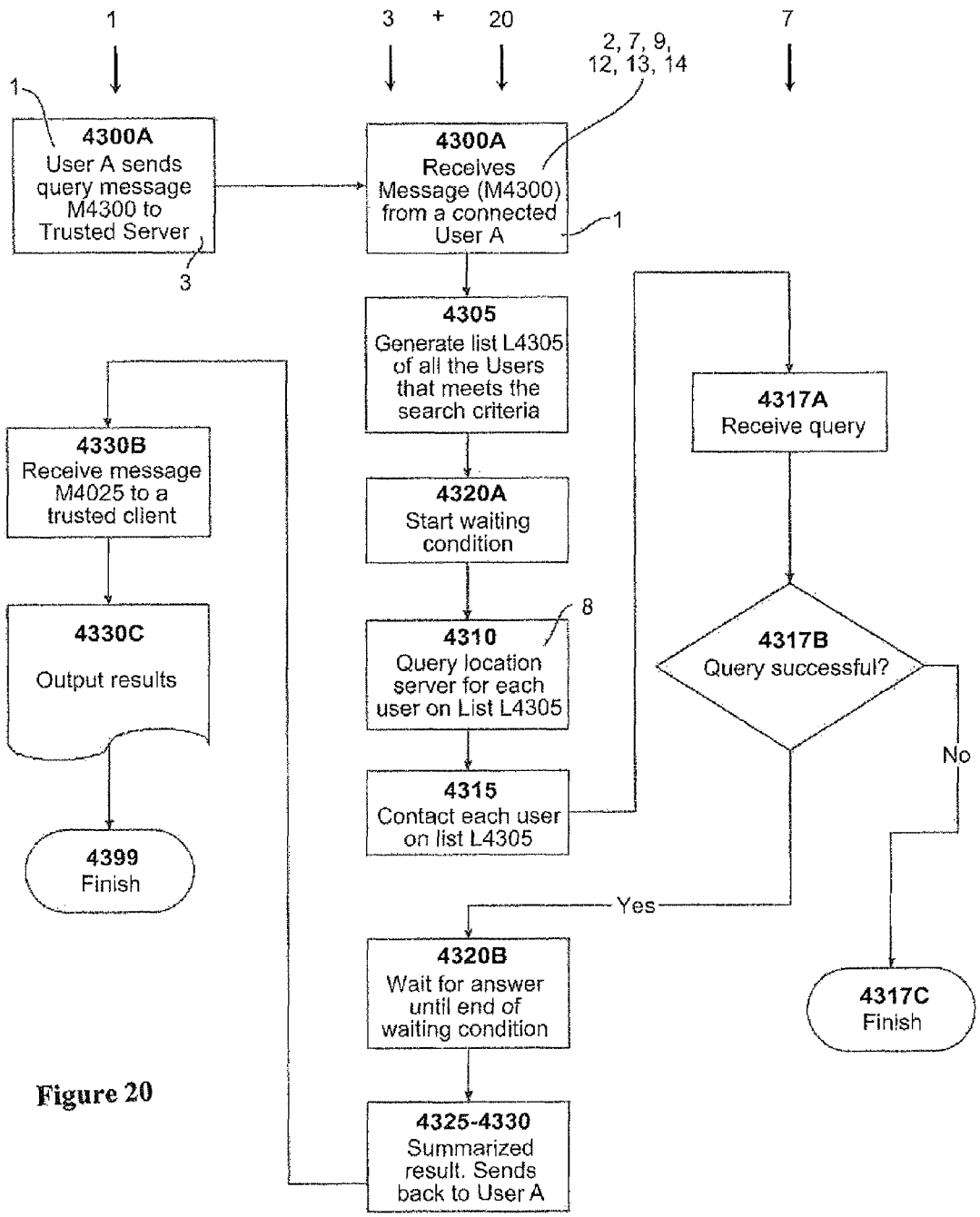
FIG. 20 is a flow chart describing the process of searching for information located on the computing devices of trusted peers through the trusted servers according to one embodiment of the present invention.

Search processes can also be carried out through the use of a search service that can be a part of the trusted servers. The search service in this case will be used to generate the list of users that need to be contacted, contact each user with the query, summarize the response and send this response back to the originator of the query. The process details for searching through the location server are summarized in steps 4300-4399. The process diagram is given in FIG. 19 and a flow chart is given in FIG. 20. In step 4300, User A 1 sends a message (M4300) containing a search query, the degree of separation (N) to the trusted servers 3. Again, the search query can be, but is not limited to, text string, file descriptors, commands or instructions. In step 4305, the search service 20 on the trusted servers 3 receives a message M4300. The search service 20 then generates a list (L4305) of all the trusted clients that can be reached by User A 1 based on N. In step 4310, the search service queries the location server 8 for the connection point for each of the trusted peers on list L4305. Then, in step 4315, the search server 20 contacts each of the trusted peers on list L4305 2, 7, 9, 12, 13, 14 and sends them a query based on message M4500. In step 4317, the software clients of the users on list L4305 receive the query and search the local computing device. If query is successful, the software client 6 of the user who can successfully respond to the search query sends back a message to the trusted servers 3. This message includes at the minimum the answer to the query. In step 4320, the search service 20 waits for a set condition to make sure that all contacted users have an opportunity to reply. In step 4325, the search service summarizes the results, which include at the minimum the answer to the query. In step 4330, the search service sends the results back to User A 1.

Services and Applications Over the Trusted Network 5000-5599

In one embodiment of the present invention here are provided three ways in which actions and applications can be carried out over the trusted network. The three ways are Direct connection Connection through a trusted proxy Delivery though relays Example of actions and applications are, for example, Electronic resource sharing Communication Data exchange Service sharing The implementation details will be described in the following sections. More specific examples of actions and applications are described in the embodiments of the present invention described herein.

Direct Connections (5000-5200)

Figure 21:
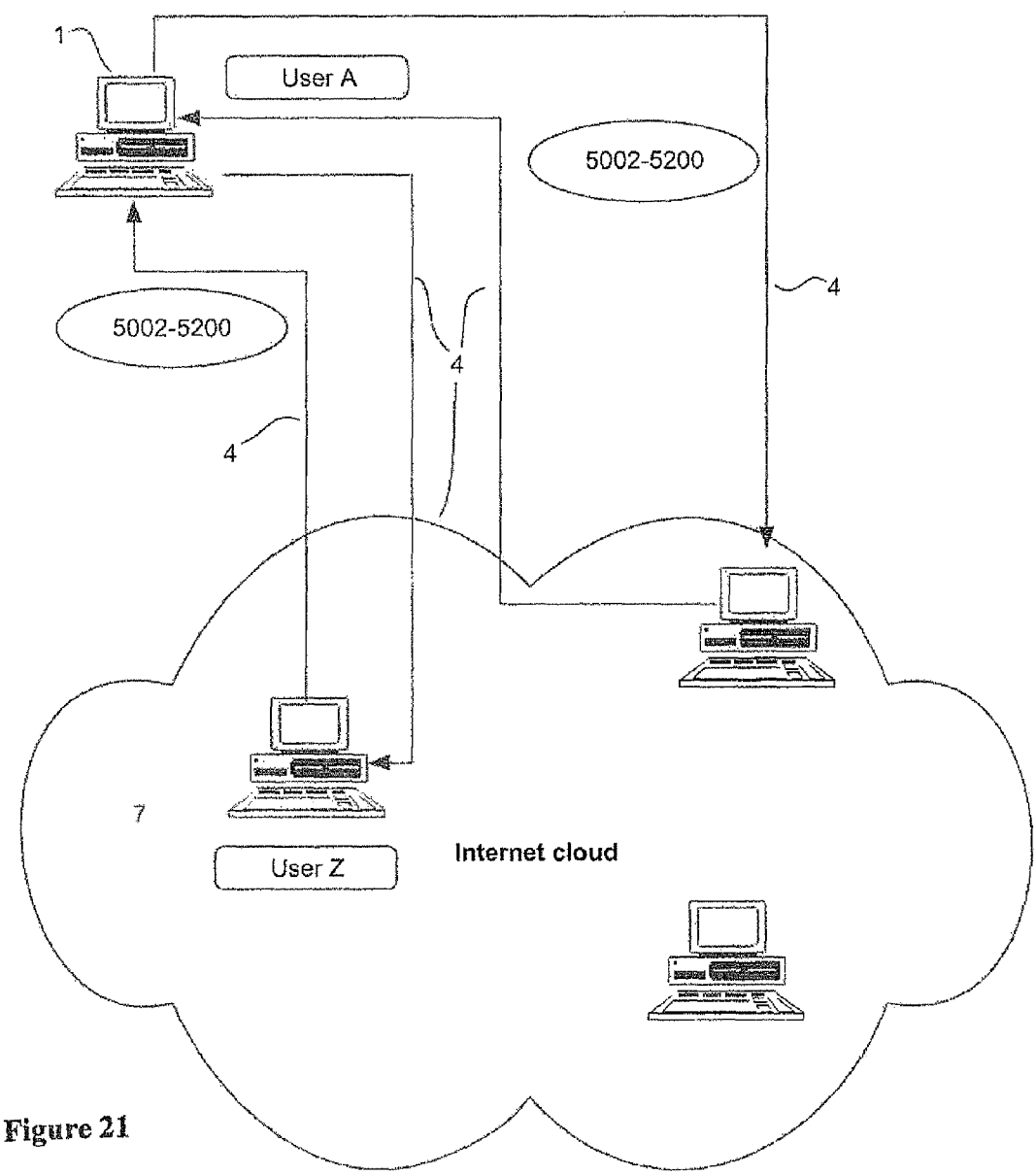
FIG. 21 is a process diagram describing the process of transferring/exchanging/communicating through the network according to one embodiment of the present invention.
Figure 22:
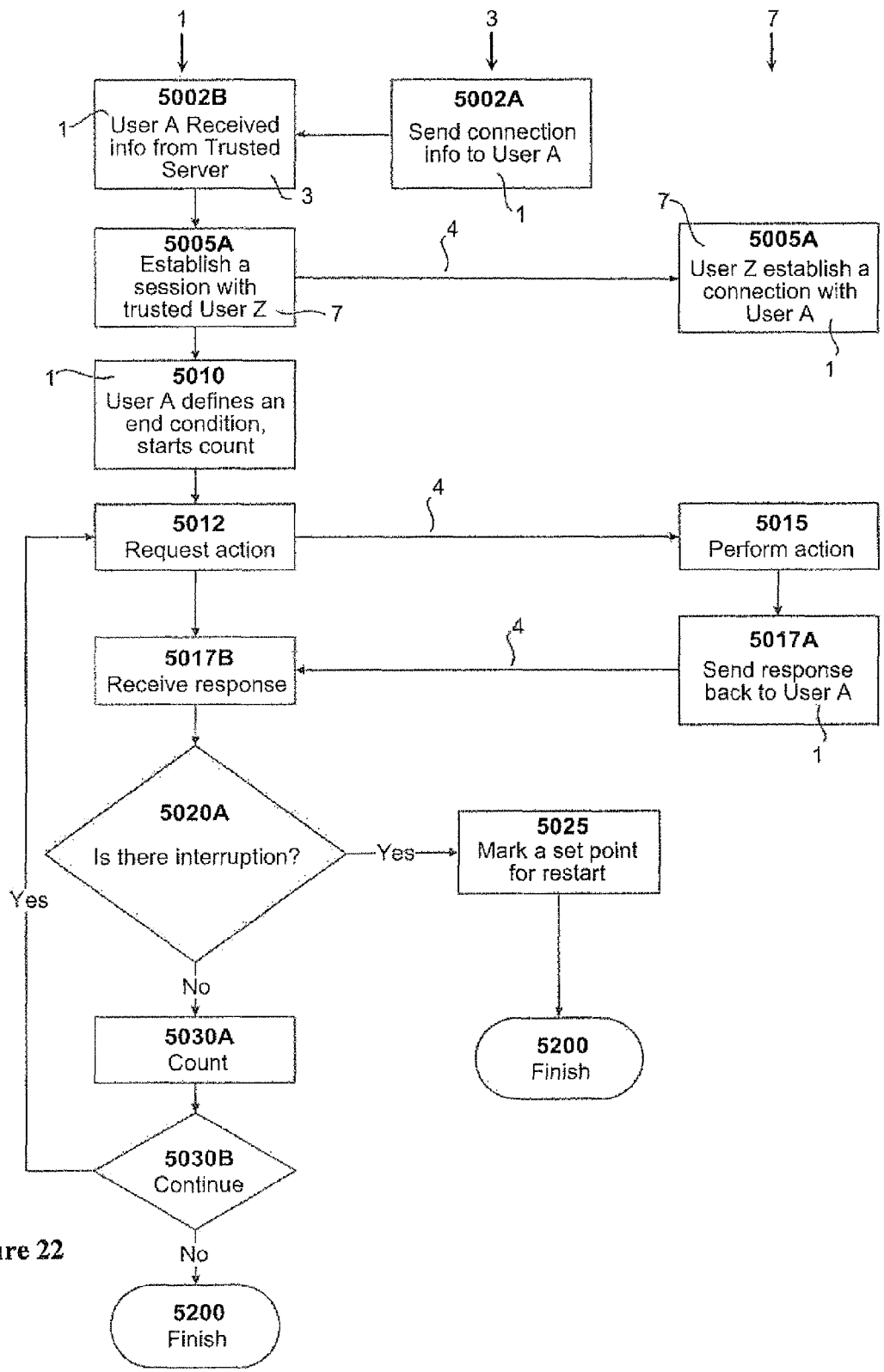
FIG. 22 is a flow chart describing the process of transferring/exchanging/communicating through the network according to one embodiment of the present invention.

Direct connections can be established through the Login process (0500-0599). Through the Searching process (4000-4999) a user can be connected directly to another trusted peer on the network. In this case, any actions and applications can be carried out directly between the two users in a Peer-to-Peer environment. In this case the trusted servers supply location information to allow the software clients of two trusted peers to connect but are otherwise not involved. FIG. 21 is a process diagram illustrating this connection and FIG. 22 is the corresponding flow chart detailing the steps required in this process. In FIG. 21, User A 1 is directly connected to User Z 7 and therefore can exchange services. With reference to FIG. 22, the details of the process are described as follows. In step 5002, User A 1 establishes a link with User Z 7 based on information supplied by trusted servers 3. Users A 1 and Z 7 must be within the same network and have defined N such that they both fall within N for each other. In step 5005 a session is established that connects the two users. In step 5010 User A 1 defines an end condition and starts a count for the end condition. The end condition can be, for example, a time for the connection to last or could be defined by the time to complete a file transfer, etc. In step 5012, User A 1 sends a request to User Z 7. In step 5015, the software client on User Z's 7 computing device performs the action requested by User A 1. In step 5017, User Z 7 sends a response back to User A 1. In step 5020, if there is an interruption, such as a sudden disconnection caused by a power failure, the software client on User A 1's computing device, in step 5025 creates a set point, which can be used to restart action on reconnection. In step 5030, the software client of User Z 7, continues the action requested by User A 1 until end point is reached. In step 5200, the end condition is satisfied and the session is ended.

Connection Through a Trusted Proxy (5200-5399)

Figure 23:
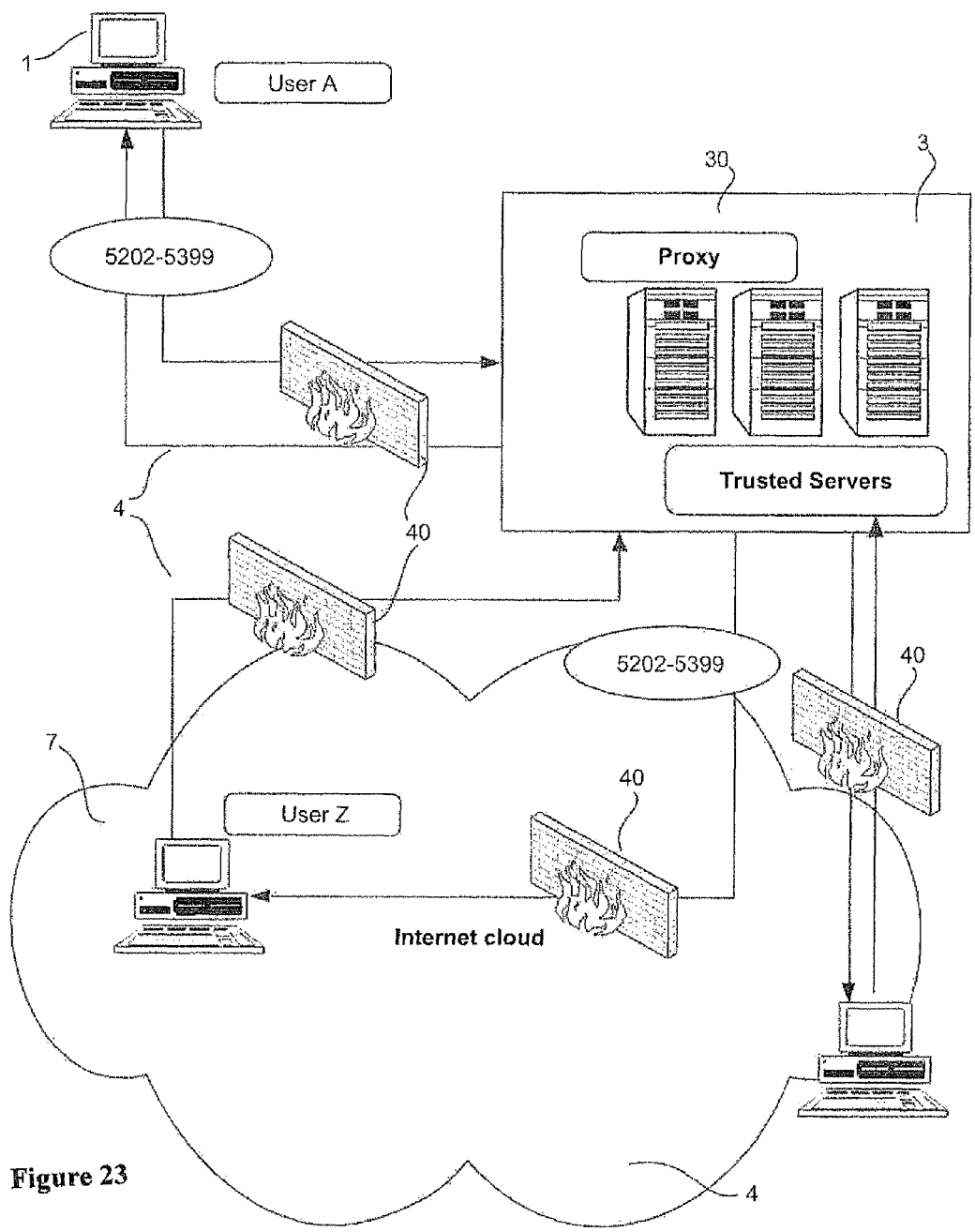
FIG. 23 is a process diagram describing the process of transferring/exchanging/communicating through the network according to one embodiment of the present invention.
Figure 24:
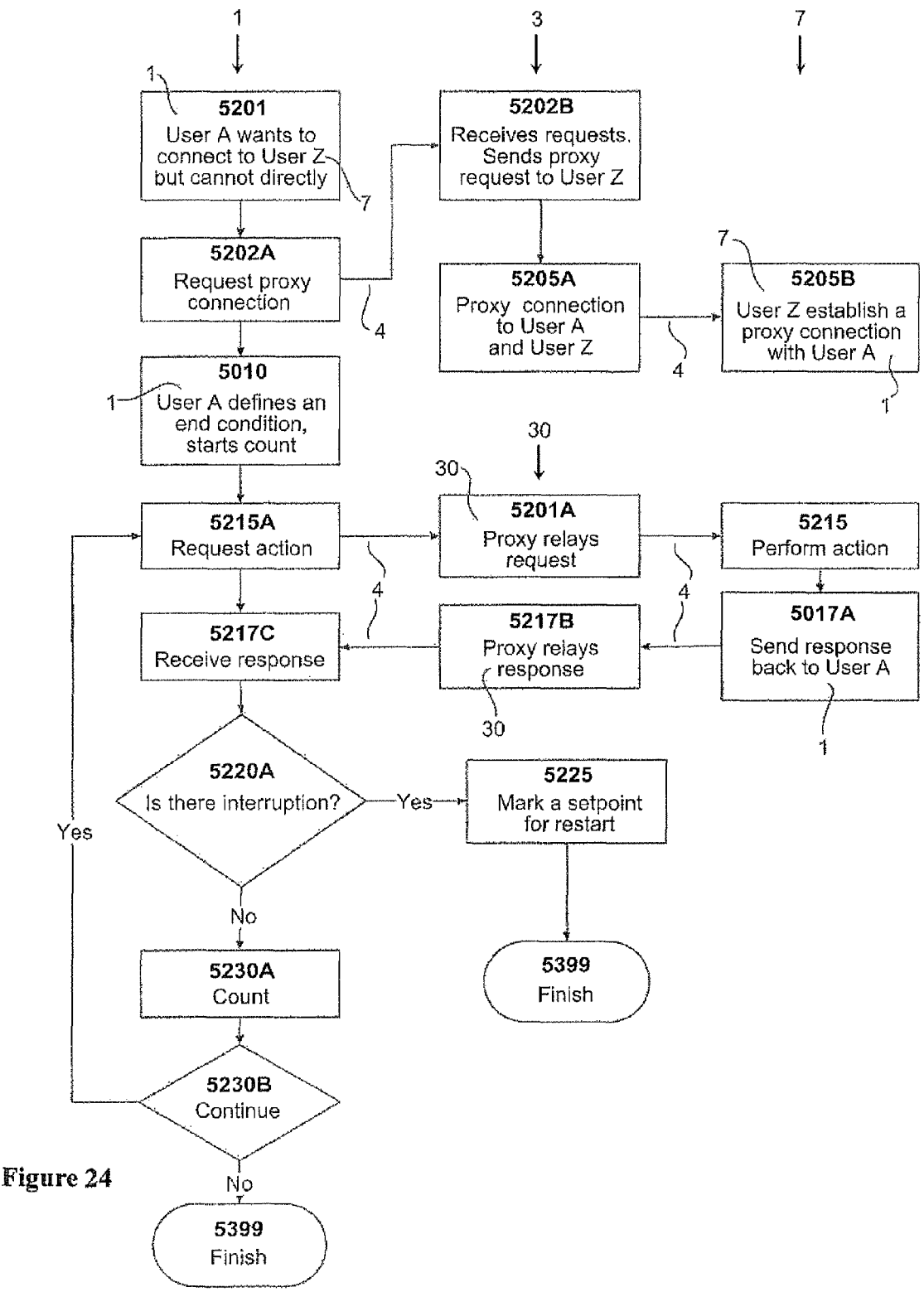
FIG. 24 is a flow chart describing the process of transferring/exchanging/communicating through the network according to one embodiment of the present invention.

In some cases, direct connections cannot be established between trusted peers on the network due to the presence of a firewall or other protective measures available on a network. In this case, the user must first request a connection to a trusted proxy server before connecting to the other user. A proxy is a service that allows clients to make indirect network connections to other users. A User connects to the proxy server, and then requests a connection, file, or other resource available on another trusted peer. The proxy provides the resource, possibly by connecting to the specified user, or by serving it from a cache. FIG. 23 is a process diagram illustrating this connection through a trusted proxy and FIG. 24 is the corresponding flow chart detailing the steps required. In FIG. 23, User A 1, who is behind a firewall 40, first connects to a proxy 30 and then requests a connection to User Z 7. The trusted servers 3 then direct User Z 7 to the appropriate proxy 30. The actions or operations can then be carried out through the proxy 30. The details of the process are described as follows. In step 5201, User A 1 performs a search as described in process 4000-4999 and receives the information that User Z 7 has the required service. In step 5202, User A 1 requests a proxy connection from the trusted servers 3 because User A 1 and User Z 7 cannot connect directly. In this example, a proxy 30 is a service that allows the software client to make indirect network connections to other users. User A 1 and User Z 7 must be related by N degree of separation. In step 5205, a session is established that connects the two users through the proxy 30. In step 5210 an end condition for the length of the session is defined. In step 5215 the requested action is performed by User Z 7 through the proxy 30. In step 5217, User Z 7 sends a response back to User A 1 via the proxy 30. Step 5220 governs the possibility of an interruption in the connection between Users A 1 and Z 7. If an interruption occurs, in step 5225 the software client of the initiator of the connection, in this case User A 1 creates a set point which can be used to restart action on reconnection. In step 5230, the action is continued until end condition is satisfied. In step 5399 the end condition is satisfied and the session is ended.

Delivery Through Relay (5400-5599)

Figure 25:
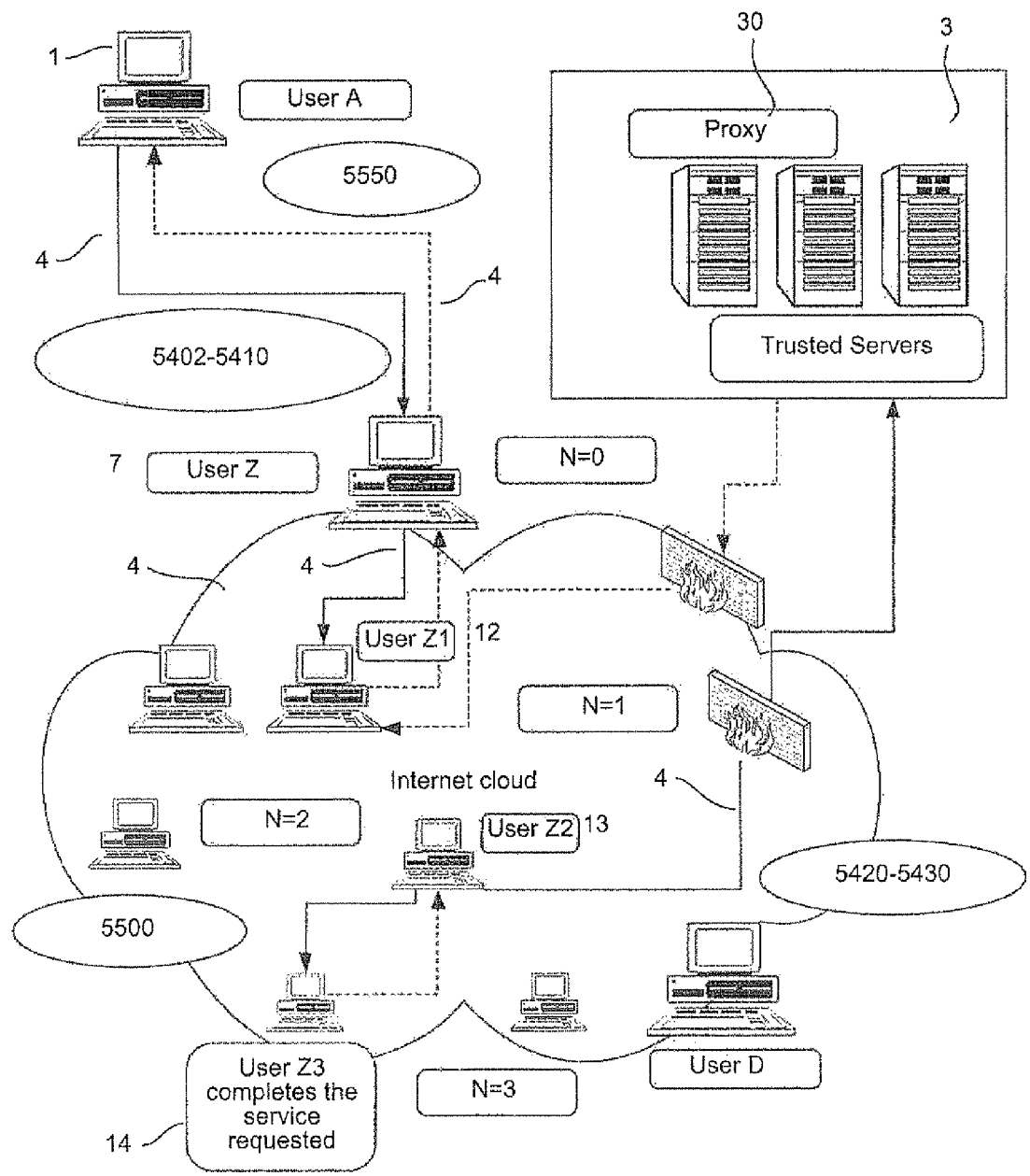
FIG. 25 is a process diagram describing the process of service delivery through a relay according to one embodiment of the present invention.
Figure 26:
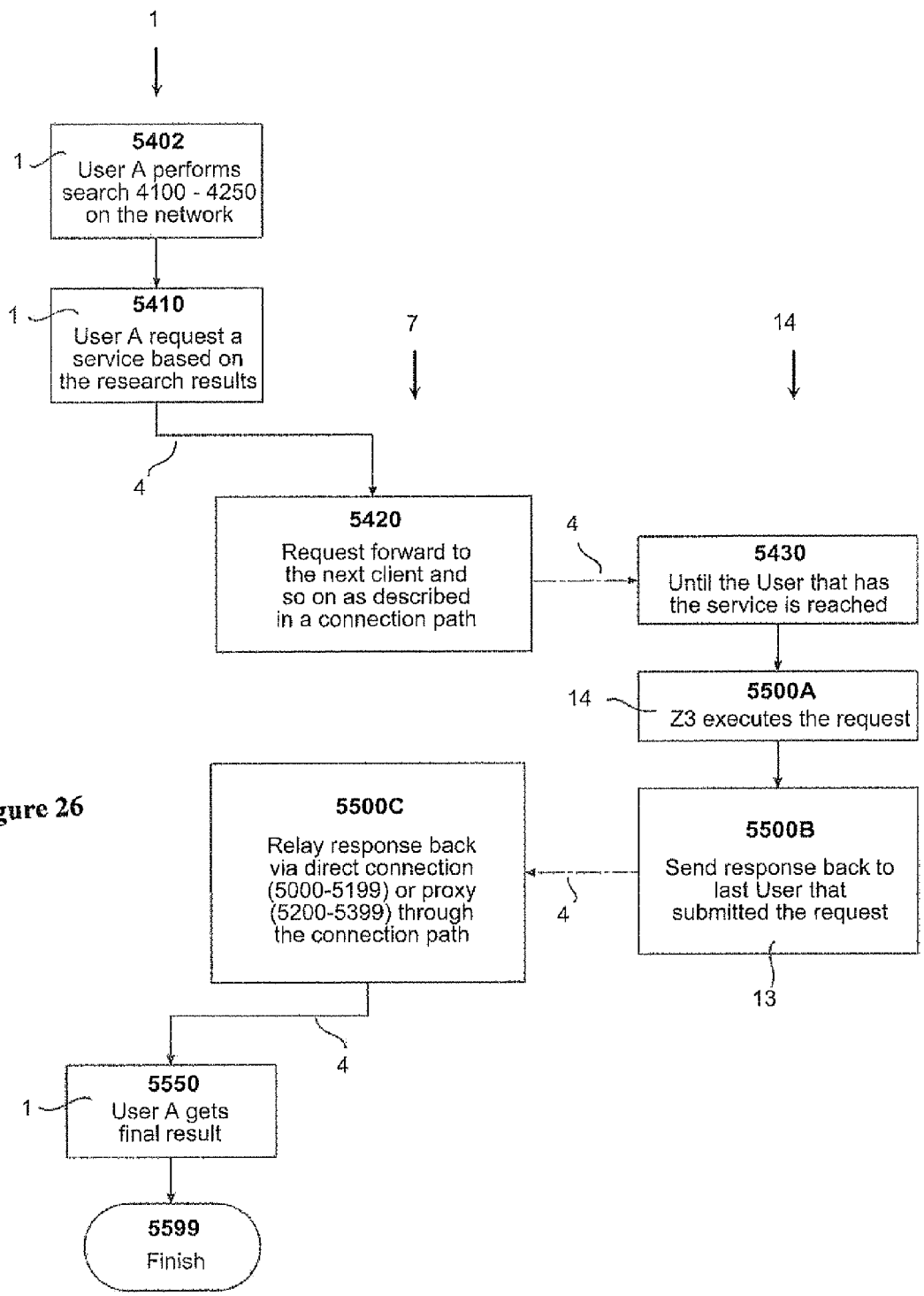
FIG. 26 is a flow chart describing the process of service delivery through relay according to one embodiment of the present invention.

In some cases, a user wants to their identity to be known only to those users that the User trusts (i.e. users that are directly related to them i.e. N=0) but still wishes to exchange information with users with a greater degree of separation. Services and actions can still be delivered through a series of relays if the initial search and discovery for the services and action is performed using the search with some degree of privacy option (4100-4250). In which case, the application or service can be delivered based on the path developed by the search. The process diagram is given in FIG. 25 and a flow chart is given in FIG. 26. In FIG. 25, User Z3 14 has the service requested by User A 1. In order to deliver the service without User Z3 14 being aware that User A 1 has requested the service, User Z3 14 performs the service and delivers the result to the trusted peer Z2 13. User Z2 13 in turn delivers the result back to User Z1 12, and Z1 12 then delivers it back to User Z 7. User Z 7 finally fulfils the request of User A 1. Based on this scenario, User A 1 only knows that one of his trusted peers, namely, User Z 7, has responded to the request. User A 1 does not need to know that User Z3 14 is the one that actually fulfils the request. The connection between users can be a direct connection as described in steps 5000-5199 or connections via a proxy 30 as described in steps 5200-5399. A detailed description of service delivery through relays is as follows. In step 5402, User A 1 performs a search as defined in steps 4100-4250 on the network. However, in this case, the nature of the search requires that the initiator's privacy be protected. In step 5410, User A 1 requests a service based on the results of the search. In step 5420, the service request is passed to each user in the connection path between the initiator and the user that has the resources being requested. The identity of the originator of the search is only known to the first user in the connection path with whom User A 1 has an N of 0, in this case User Z 7. In step 5430, the service request reaches the user that has the resources, in this example, User Z3 14. In step 5500, User Z3 14 executes the service request and delivers the result back to the next user in the connection path who relays it to the next user etc. until it reaches the originator, User A 1. The delivery of the result can be via a direct connection as described in steps 5000-5199 above or through a proxy connection as described in steps 5200-5399 above. In step 5550, the initiator of the query, User A 1, receives the results of the User Z 7.

Remote Access and Control of the Software Client (6000-6099)

Figure 27:
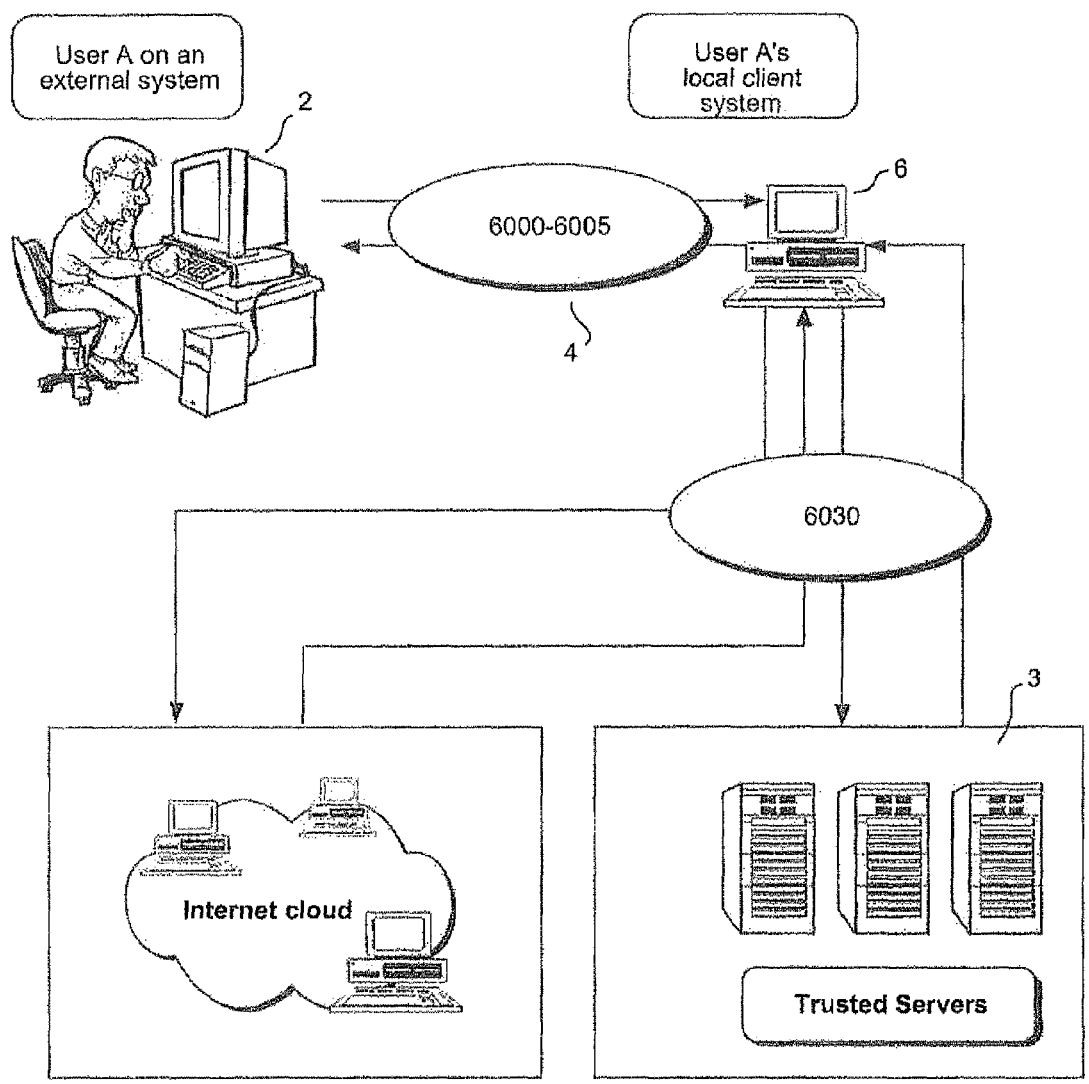
FIG. 27 is a process diagram describing the process of remote client access according to one embodiment of the present invention.
Figure 28:
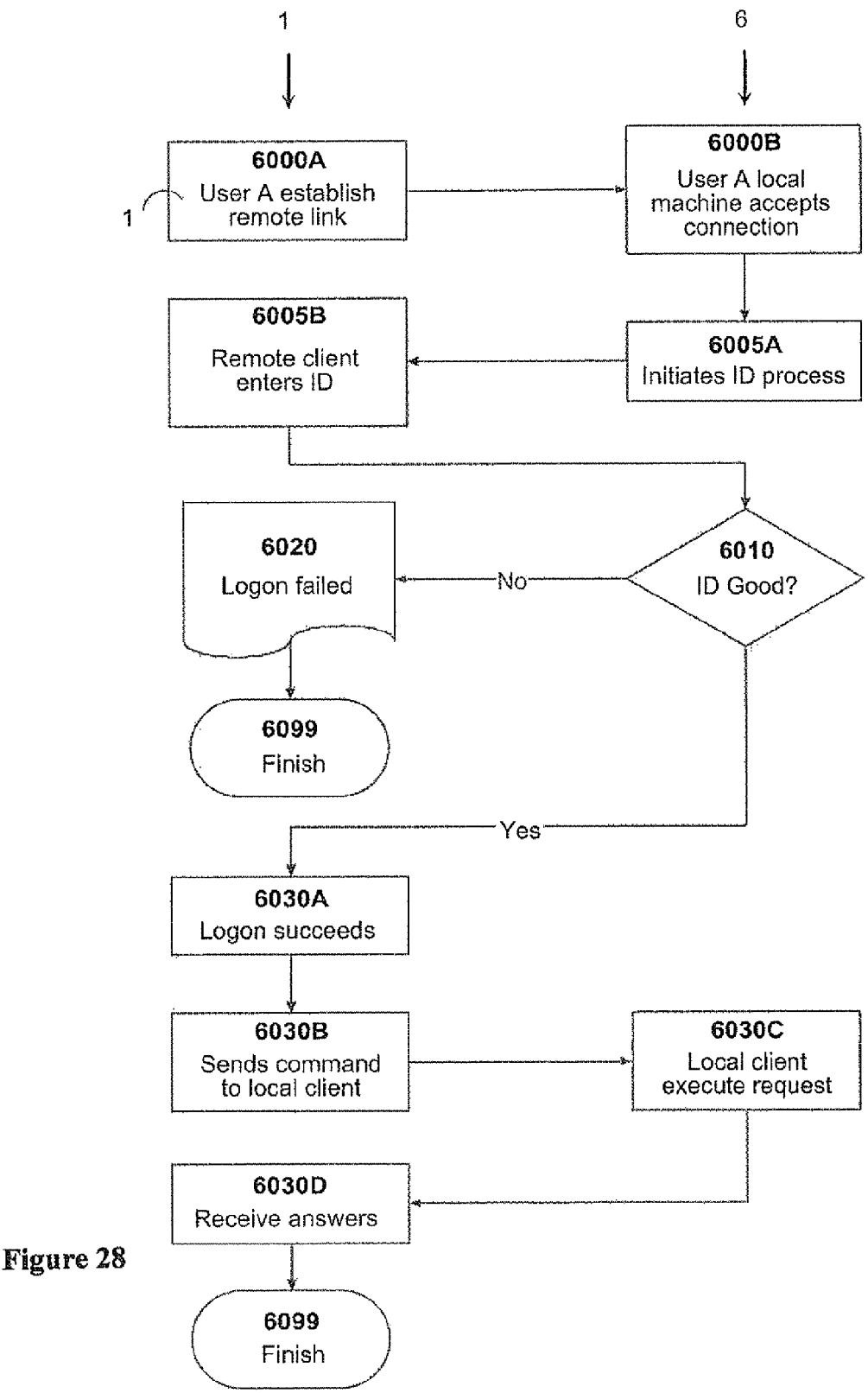
FIG. 28 is a flow chart describing the process of remote client access according to one embodiment of the present invention.

The services of the software client on a computing device can be accessed remotely if the proper communication, authentication and identification processes are built into the software client. The process diagram for remote access is given in FIG. 27 and the corresponding flowchart is given in FIG. 28. In FIG. 27, User A 1 remotely establishes a connection with his software client 6, for example, via an http connection, and undergoes an identification and authentication process. Once authorized, User A 1 can then control the local services such as searching and service requests remotely. In step 6000, User A 1 establishes a link through a communications means 4 with the software client 6 from an external system 2 and establishes a communication session. In step 6005, the software client 6 provides an authentication and identification process for the remote User A 1. In step 6010 the software client 6 reviews the identifying data provided by the remote User A 1. At this point, either, in step, 6020 authentication fails and the remote request will not be considered, or, in step 6030, the authentication succeeds and the remote request can continue until the session is terminated. In effect, the external system 2 can issue commands and receive replies through the communication link to the software client. In step 6099, User A 1 terminates the remote link and ends remote access.

Collaboration Between Trusted Peers

In an alternative embodiment of the present invention, there is provided a peer-to-peer social network with collaboration features.

Information is one particular type of resource that is ideally suited to be accessible and available on a trusted social network. Examples of information include but not limited to digital movies, digital music or different types of documents (e.g. text files, spreadsheets, graphic files, etc.).

Figure 52:
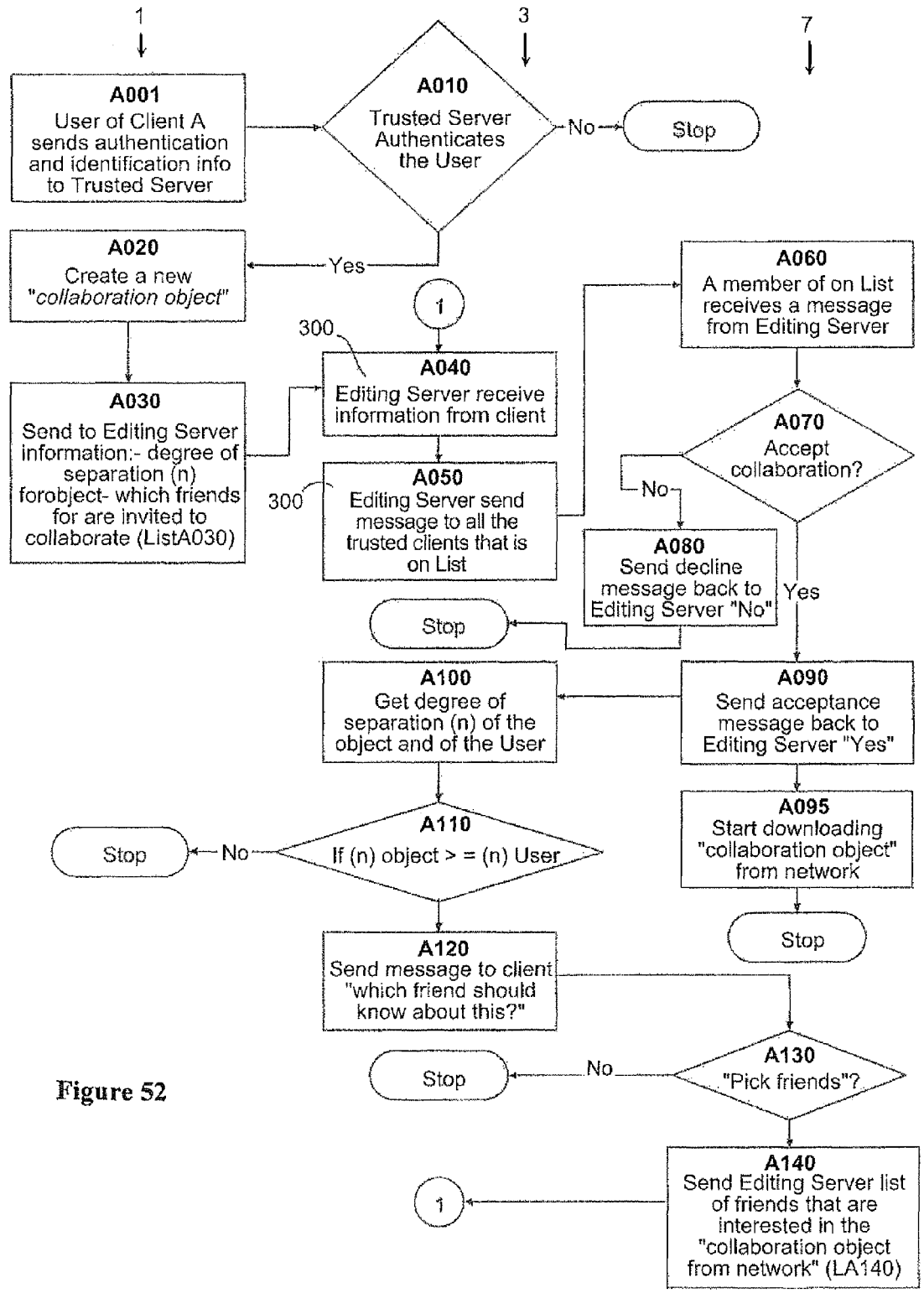
FIG. 52 is a flow chart describing the steps required to create and distribute an initial collaboration object using a trusted network according to an embodiment of the present invention according to one embodiment of the present invention.

FIG. 52 is a flow chart describing the steps required to create and distribute the initial collaboration object. In FIG. 52, steps A001-A020 represent the authentication steps. User A 1 must first be identified and receive authorization from the trusted servers 3 to access the network. Once authorized, User A 1 receives the most current contact list of trusted peers on the network. In step A20, User A 1 creates a piece of information using local resources on User A 1's computing device such as word processing software. This information is designated as a "collaboration object". User A 1 saves the file on a shared directory and sets the file properties as being a collaboration object. In step A030, this designation of a new collaboration object is sent to the editing server 300. In step A050, the editing server 300 then relays this information to the trusted peers on User A's contact list, for example, User Z 7. User A 1, as the creator of the object, can set the degree of separation required to access the object. For example, by setting the degree of separation to 1 (n=1), only User A 1's trusted peers and their trusted peers can fully use this collaborative object. In steps A060 to A095, User Z 7 can decide whether to accept or reject the collaboration object. In steps A100 to A140, the editing server 300 offers trusted peers of User A 1 the opportunity to designate trusted peers who should receive the collaboration object. This process continues until all users within N have been invited to receive the collaboration object.

Figure 53:
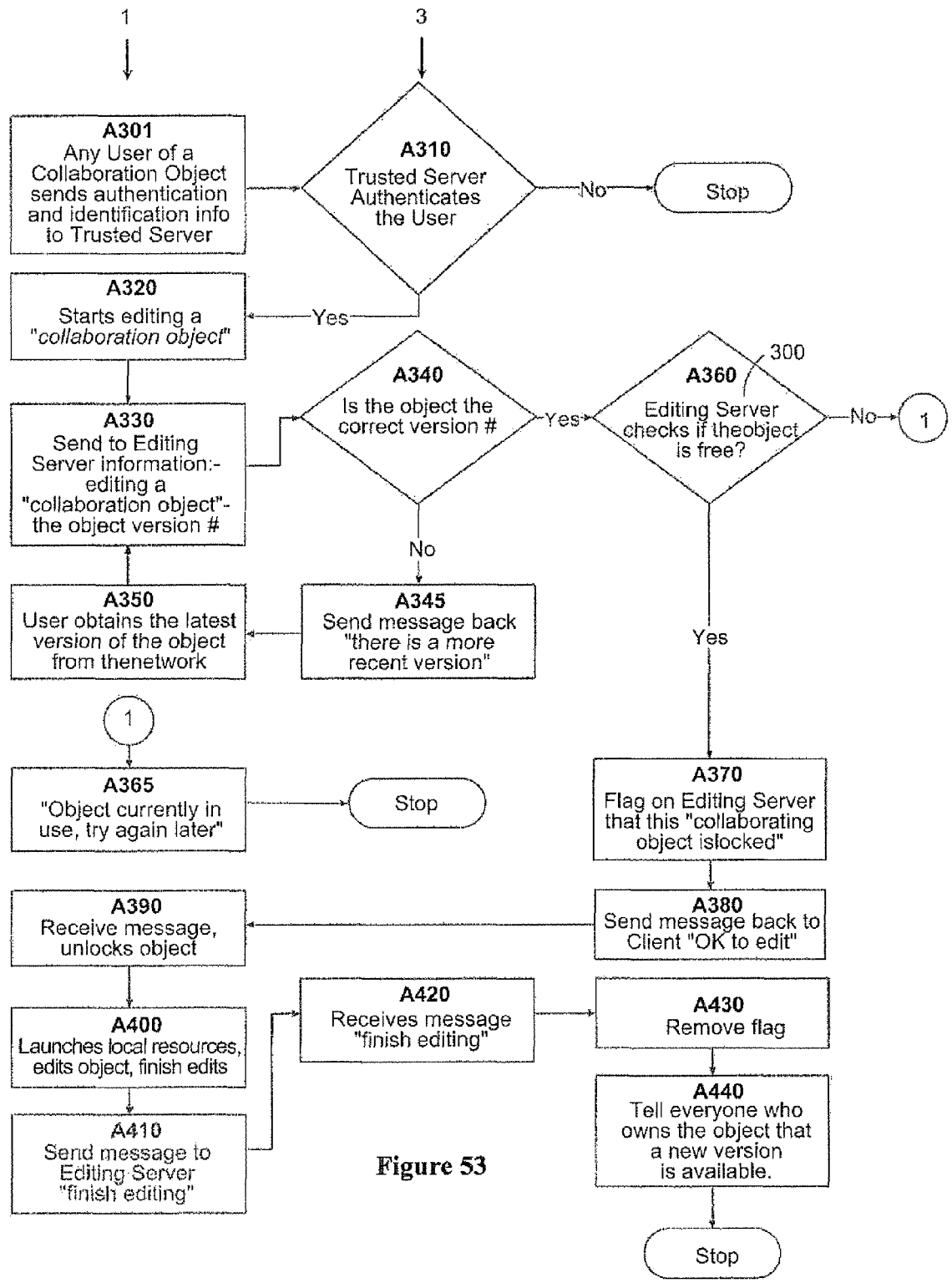
FIG. 53 is a flow chart describing the steps required to edit a collaboration object using a trusted network according to an embodiment of the present invention.

FIG. 53 is a flow chart describing the steps required to edit a collaboration object. In FIG. 53, steps A301-A320 represent the authentications steps as described above. In step A320 User A 1 wishes to edit an existing file that is marked as a collaboration object. In step A330, the client software 6 checks with the editing server 300 to determine whether another user is editing the same object. In step A340 the editing server also checks that User A 1 has the latest version of the collaboration object. In step A350, if a more recent version is available, User A 1 can download and review it prior to editing. If another trusted peer is editing the object, in step A365 the editing server notifies User A 1 that the object is in use and cannot be edited. Otherwise, in steps A380 and A390, the collaboration object is unlocked and User A 1 can proceed to edit the object using User A 1's local computer resources. Steps A390-A430 describe the process of completing the editing on a collaboration object. Step A440 is an optional step that informs all members that a new version of the collaboration object is available.

Similar to the process above, a trusted peer, who is connected to the network and who is a trusted peer of User A can query the editing server for new collaborating objects or edit the objects using local resources.

The editing server responds to queries based on the rules and regulations governing access to information and regulates the transfer of collaboration objects between trusted peers. The steps for information delivery are as follows:
a) The editing server notifies each trusted peer that an update to a collaborating file is available.
b) Each trusted peer has the choice of accepting or declining the update. This setting can be set to a default value so that a trusted peer will always obtain the latest versions.
c) Each trusted peer accepting the update receives the new object by downloading the latest version.
d) Trusted peers that have the latest update can become a source of the new object until the object is distributed to all trusted peers within the preset degrees of separation.

The editing server is connected to each member of the trusted social network to ensure that each member has the appropriate access to the information. Depending on the type of version control system required, the type of resource information control stored in the editing server is as follows:
a) Check in/check out—whether a file is being edited by another trusted peer.
b) Permissions—who can have rights to view and modify the file and to what degree of social relationship should the collaborative object be extended.
c) Most recent version—parameters that identify whether the file is the most recent version of the file.
d) Differences—rather then checking in the entire file, compare the differences between files and update the differences.

As a result of this system, information can be edited, manipulated, grouped and shared on a trusted network according to the preference of each individual user.

In an alternative embodiment of the present invention, users can share and synchronize objects such as files, folders, or local resources in a trusted network. Synchronization is a feature that allows multiple users of a trusted network to have objects such as files, folders, links or local resources with the same content. The system works by allowing a user to declare that an object should be managed by a synchronization server and that the object is to be shared amongst a designated list of trusted peers on the network. The synchronization server ensures that all valid users can access a copy of the object and also can receive updates if the object is changed.

Figure 54:
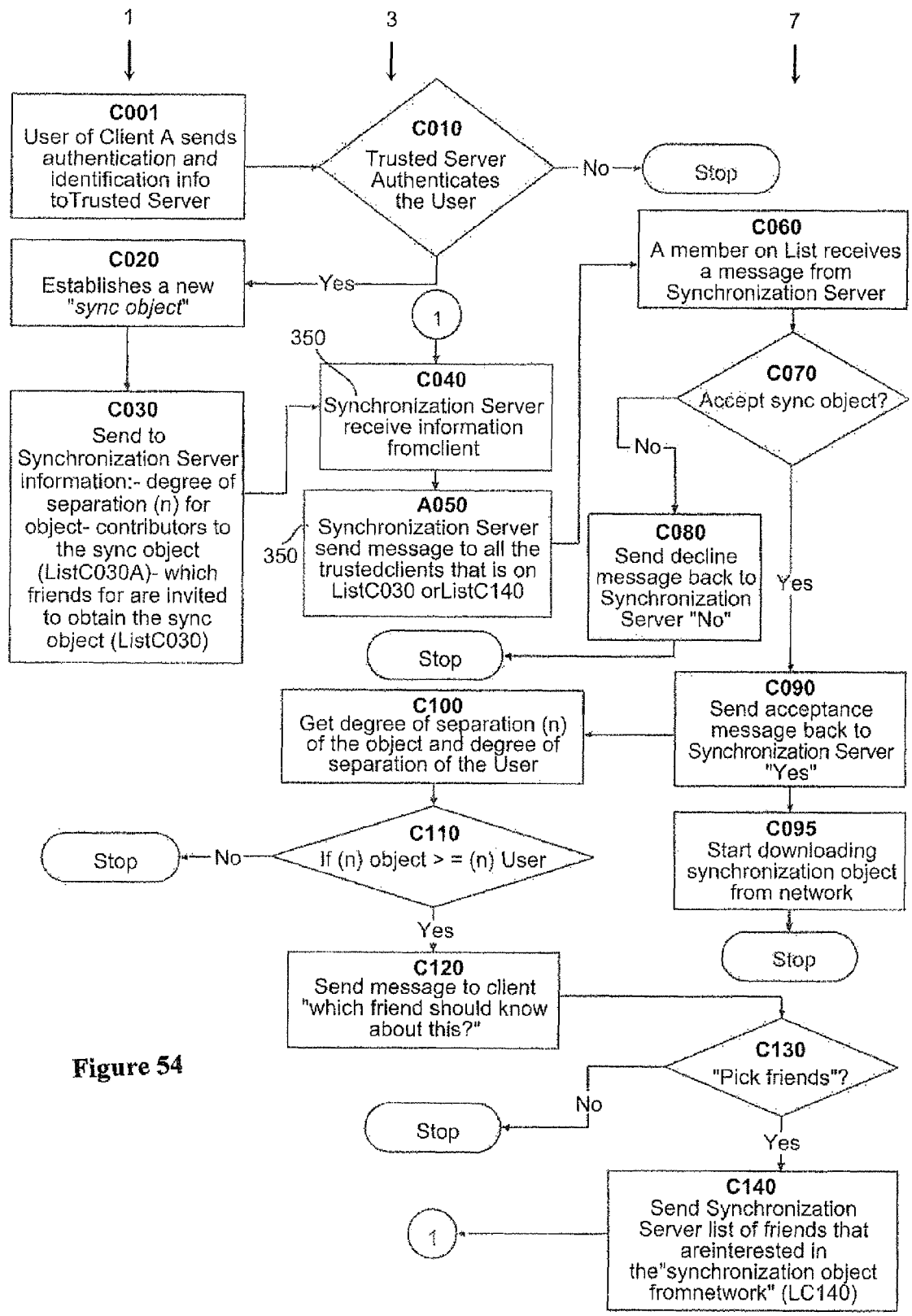
FIG. 54 is a schematic describing the steps required to initiate a synchronization object and propagate the object throughout a trusted network according to one embodiment of the present invention.

The process of implementing a synchronization feature in a trusted Peer-to-Peer network is similar to that of collaboration as discussed above. The main difference is the introduction of a synchronization server that controls the flow of information and enforces rules, which are unique to the synchronization process. FIG. 54 is a flow chart describing the steps involved in initiating a synchronization object. In FIG. 54, steps C001-C020 represents the authentication steps. Users must first be identified and receive authorization from the trusted servers to access the network. Once authorized, a User receives the most current contact list of trusted peers connected to the network. The user then determines their role in the synchronization process. Users can either be the initiator 1 of a synchronization object or can be a subscriber 7 to that object. The initiator 1 is the user who first establishes the synchronization object and establishes the preferences for the object. Examples of preferences designating users who have the authority to edit or contribute to the object, a description of the object, the degree of separation (n) from the initiator that he or she wishes the object to extend and an initial list of trusted peers that might want to have the object. The subscribers 7 are users that want the synchronization object. Each subscriber 7 must meet the criteria established by the initiator. Steps C030-C040 describes how the object is initially distributed through the social network. In step C050, after the initiator 1 creates the synchronization object, the synchronization server 350 contacts a subscriber 7 from the list suggested by the initiator 1 to see if they accept the object. In steps C070 to C090, the subscriber 7 either accepts or rejects the synchronization object and relays this response to the synchronization service 350. If the subscriber 7 agrees to accept the sync object, at step C095, the object is be downloaded. Depending on the degree of separation, in steps C120 to C140, the subscriber 7 that accepts the synchronization object can suggest a list of their trusted peers and the synchronization server 350 will then contact them. This process of contact and acceptance will continue until the initial degree of separation for the object is reached.

As described above, any user who belongs to the initiator's social network and who falls within the degree of separation defined by the initiator can search and subscribe to the synchronization object at any time. The synchronization object behaves just like any other shared resources in the social network except that some of its properties are controlled by the synchronization server.

Each synchronization object is updated depending on the initial parameters. For example, Everyone can contribute changes—in this case, the synchronization server ensures that all the synchronization objects within the network are identical.

Only some can contribute changes—in this case, the synchronization server ensures that synchronization objects belonging to users, defined as contributors, are identical. This group's objects are then distributed through the network.

Only the initiator can contribute changes—in this case, the synchronization server ensures that every synchronization object is an exact copy of the initiator's object.

As a result, users on a social network use this service to create duplicate objects throughout the network and synchronize any changes to those objects. The uniqueness of this type of synchronization service is that it automates a common activity in a network.

Banking Services

In an alternative embodiment of the present invention, a system is provided to allow users of a social network to easily lend money to one another.

Within a trusted P2P network, the risks inherent in borrowing and lending activities can be lessened because each user of the network is a trusted peer of other users. The trusted server can act as the facilitator of financial services between trusted peers and their social networks. Rather then banking with strangers, and mitigating risk through credit checks or secured loans, users of the social network can pool their resources to assist each other financially. The advantage of this approach is the increase the likelihood of having a loan repaid because a user is dealing with member of their social network. This system also reduces the dependence on external factors such as "credit worthiness" of an individual.

The process for P2P banking in a trusted P2P network is similar to that of collaboration as discussed above. The main difference is the introduction of a banking server that controls the flow of information and enforces rules for users participating in the market. Users first choose the role that he or she is willing to play in the banking service, namely either borrower or lender. The lender sends to the banking server information about the user's lending preferences. Examples of such preferences are the amount of money they are willing to lend, the desired interest rate, the loan period and the degree of separation to the borrower to whom they are willing to lend money. The borrower sends to the banking server 400 information about their borrowing preferences. Examples of such preferences are the amount of money that the user wishes to borrow, the desired interest rate, and the degree of separation to the lender to whom the user is willing to borrow money.

Figure 55:
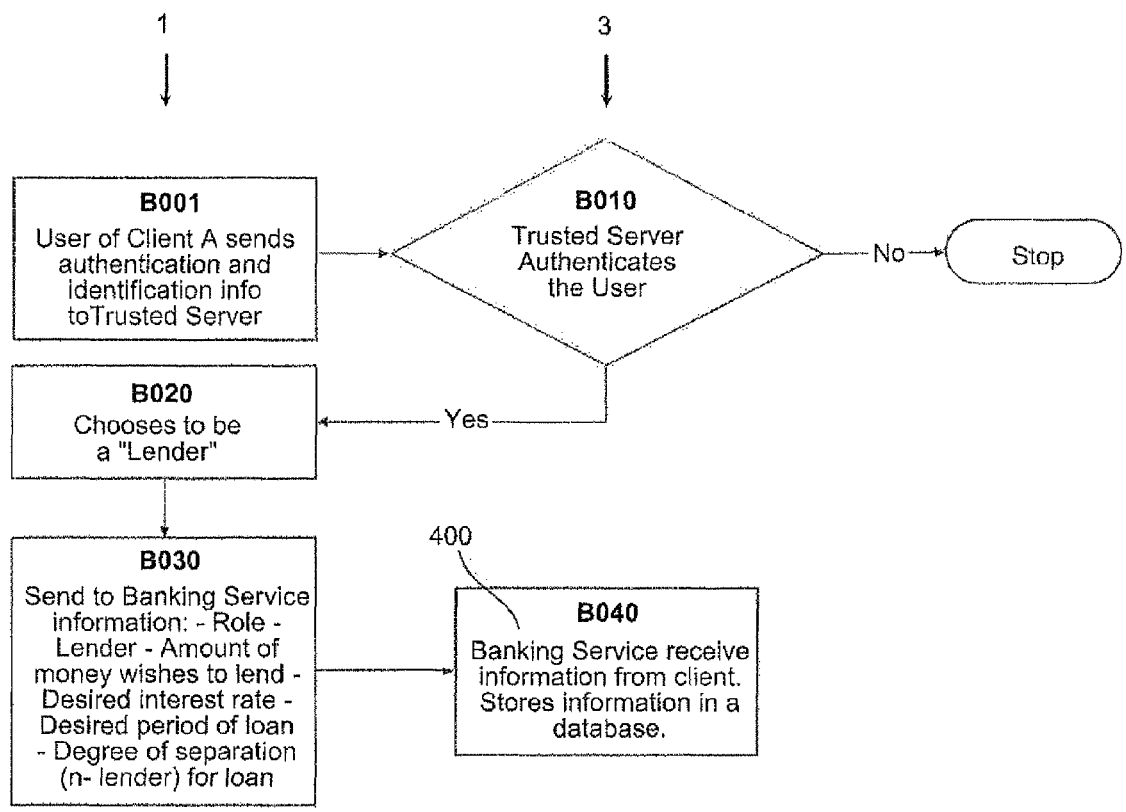
FIG. 55 is a flow chart illustrating the steps required to become a lender using a banking service in a trusted network according to an embodiment of the present invention.

FIG. 55 is a flow chart describing the steps required to become a lender in the banking server. In FIG. 55, steps B001-B020 represent the authentications steps. Users must first be identified and receive authorization from the trusted servers to access the network Steps B030-B040 describe how the lenders' preferences are sent to the banking server 400.

Figure 56:
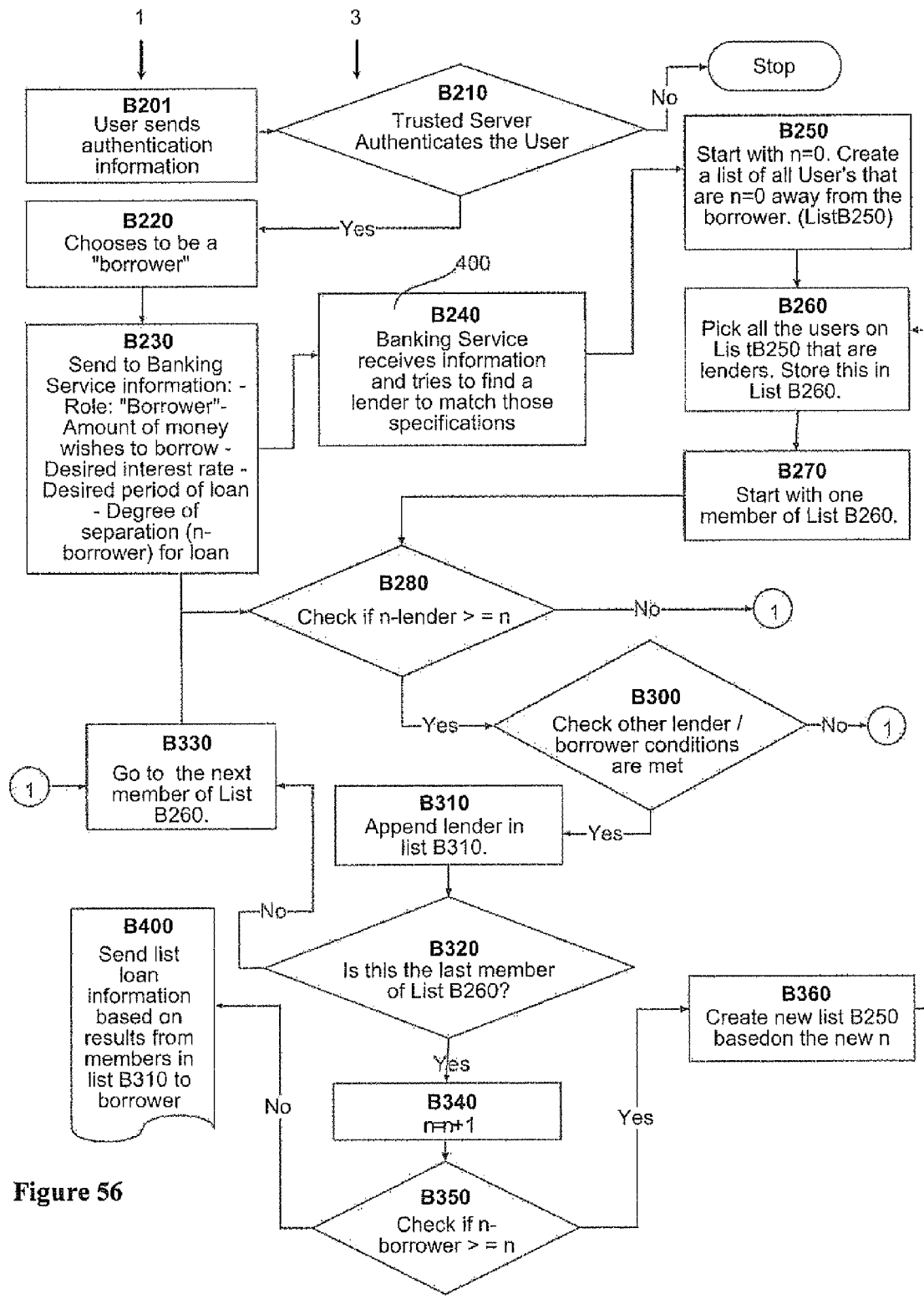
FIG. 56 is a flow chart illustrating the steps required to become a borrower using a banking service in a trusted network according to an embodiment of the present invention.

FIG. 56 is a flow chart describing the steps required for a borrower to initiate a loan request. In FIG. 56, steps B201-B220 represent the authentications steps. Users must first be identified and receive authorization from the trusted servers 3 to access the network. Once authorized, the users receive the most current contact list of trusted peers connected to the network. In step B230 the borrower 1 starts the query process by submitting their preferences to the banking server 400. In steps B240 to B360, the banking server 400, attempts to match the preferences submitted by the borrower 1 with those of lenders within N as defined by the borrower 1. Step B300 accounts for a variety of preferences including the amount of the loan or the loan period. Steps B340-B360 continue the review process for lenders until the degree of separation specified by the borrower is met. Step B400 sends summary information back to the borrower so that the borrower can proceed to finalize the loan.

Figure 57:
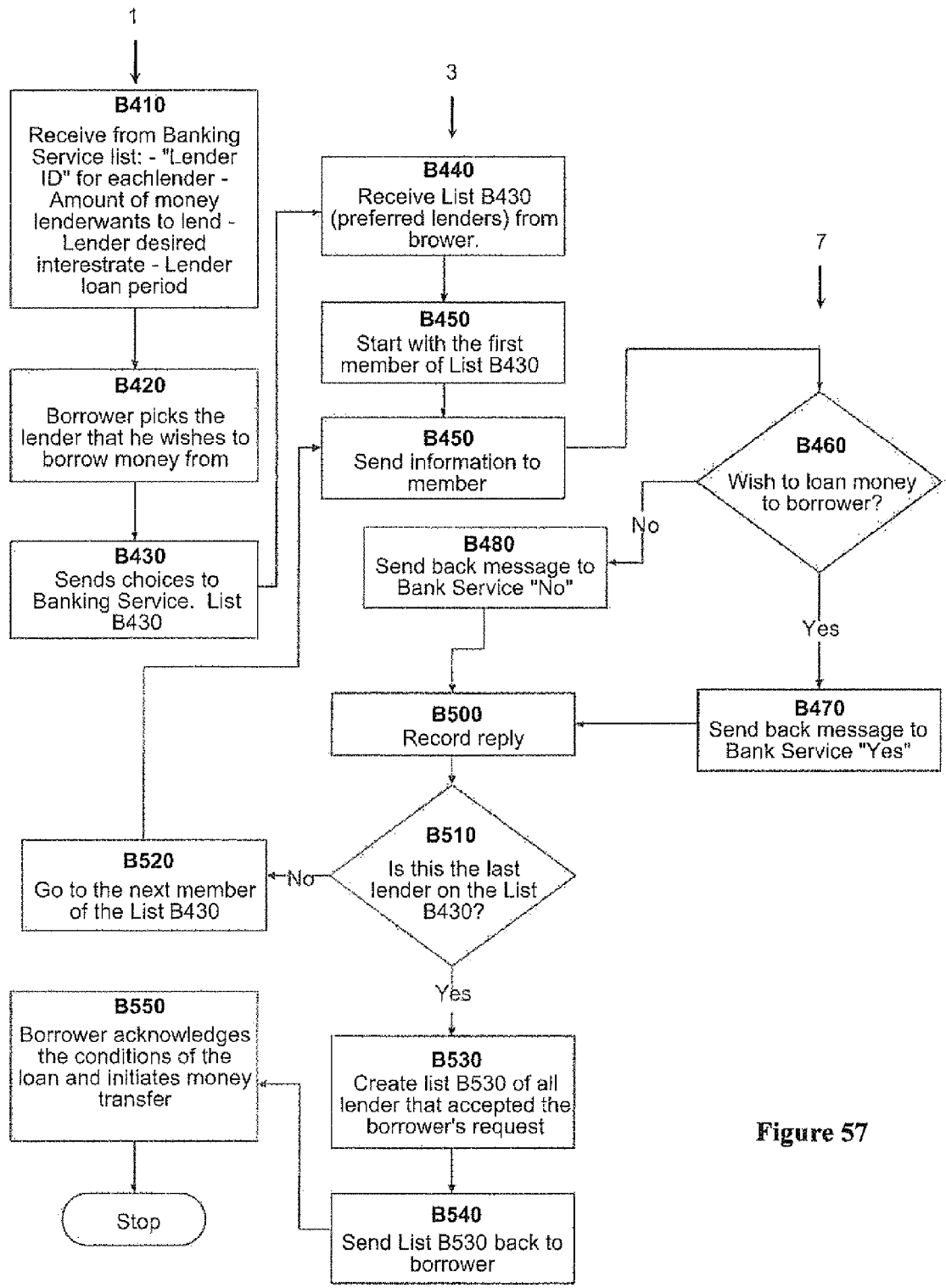
FIG. 57 is a flow chart illustrating the steps required to finalize a loan using a banking service in a trusted network according to an embodiment of the present invention.

FIG. 57 is a flow chart describing the steps required for a borrower to finalize a loan request. The banking server 400 reviews the preference setting of the trusted peers in the banking system to obtain a list of borrowers and lenders who fit each other's criteria. In step B410, the borrower 1 receives the list of potential lenders. In steps B420 and B430, the borrower 1 selects from the list and forwards their selections to the banking server 400. Steps B440 to B520 describe how the banking server 400 sends requests to each lender 7 asking them to accept the conditions of the loan. Steps B530-B550 finalize the transaction by sending the borrower 1 a list of all the lenders that accepted his or her loan request. When both borrower 1 and lender 7 agree on the conditions of a loan, the banking server 400 facilitates the transfer of money from the lender 7 or lenders to the borrower 1. At the initiation of the transfer, the banking server 400 finalizes the loan agreement between borrower 1 and lender(s) 7.

The banking server 400 ensures that the borrower makes the proper loan payments and that each payment is credited to the proper lender's account. Other duties of the banking server include:

Late payments and loan delinquency—establish policies to deal with late payments and loan delinquency.

Reputations—create a history of transactions for both lender and borrower.

Enforcement—upholding the integrity of the service.

As a result, users on a social network can freely trade and profit from their resources. The advantage of this type of collaboration over existing systems is that it duplicates the social relationships that already exist between each member of the trusted network and enables them to create a new type of financial service.

Push Communication

A further embodiment of the present invention allows content to be distributed to users of a social peer to peer network using push methods. Push is a feature that allows a user to send a file to a recipient rather than requiring a user to discover and request a file. In an open network where there is no defined relationship between users, push features can lead to abuses such as spam (unsolicited communications for marketing purposes). In a trusted social network, push features become a convenient mechanism to transfer files between users connected by a relationship characterized by trust.

The process of implementing a push feature in a social P2P network is similar to that of synchronization, as discussed above. The main difference is the introduction of a push server that controls the flow of information and enforces preset rules, which are unique to the push feature.

Figure 58:
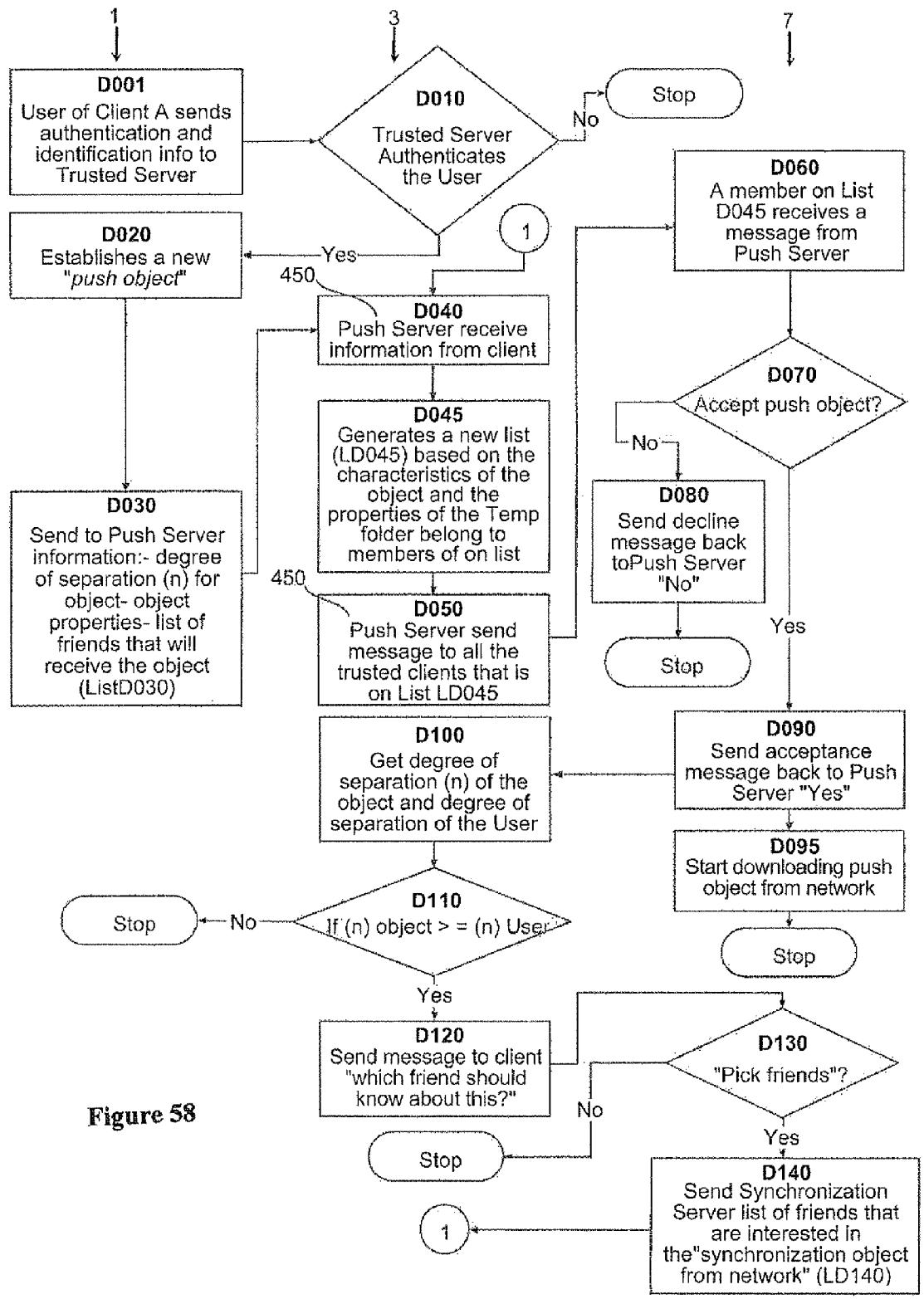
FIG. 58 is a schematic describing the steps required to initiate a push object and propagate the object throughout a trusted network according to one embodiment of the present invention.
Figure 59C:
Figure 59C:
Figure 59C:
Figure 59C:
Figure 59C:

FIG. 58 is a flow chart describing the steps involved in initiating a push object. The user first designates a folder on their local computing device to be the folder that receives push objects. The user sends information to the push server 450 such as the location of the receiving folder, access rights for the local folder which could include specific trusted peers or the degree of separation from the user that the user is willing to grant access to and limits on the push object such as size, content, or type. In FIG. 58, steps D001-D020 represent the authentications steps. Users must first be identified and receive authorization from the trusted servers 3 to access the network. Once authorized, users receive the most current contact list of trusted peers connected to the network. In step D030, the user 1 sets the properties of the push object and selects the trusted peers 7 that are to receive the object. Examples of properties include object description, degree of separation, etc. In step D040, the file information and list of users is received by the push server 450. In step D045, the push server 450 checks to see if the object meets the requirements set by each receiver 7. If the requirements are met, in step D050 the push server 450 contacts the receiver 7 for permission to accept the push object. Steps D060-D095 describe how the push server 450 obtains permission from each trusted peer 7 to receive the push object and how each trusted peer 7 can then obtain the push object from the initiator 1. Steps D100-D140 describe how the push object can be sent to other users 7 depending on the degree of separation of the object and the degree of separation of the user 7 from the initiator of the push object 1.

As a result, users on a social network can send files to their trusted peers in a controlled manner. The uniqueness of this type of feature is that it allows object transfer without the need for the receivers to search for the push object. Once the push object has been received, changes to the object could be managed using the synchronization system, as described above.

The proposed network is not limited to the sharing of electronic resources such as electronic files but creates new work processes for the user. The following are provided for exemplification purposes only and are not intended to limit the scope of the invention described in broad terms above.

EXAMPLE 1A

File Sharing on a Trusted Social Network

Figure 29:
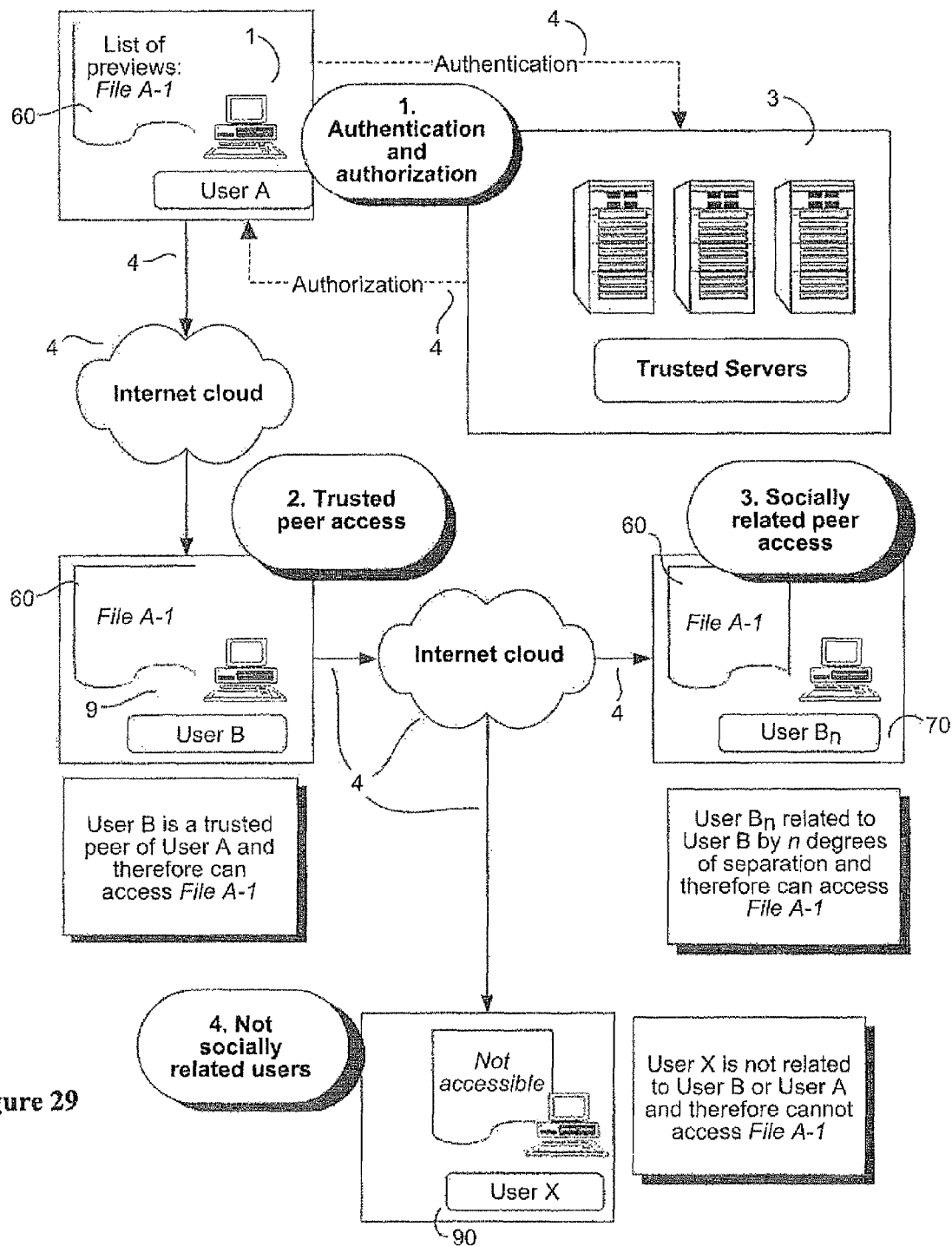
FIG. 29 is a process chart demonstrating an example of a file transfer through a trusted social network according to one embodiment of the present invention.

This example describes the process of file sharing on a trusted social network. FIG. 29 is a schematic illustrating an example of file transfer through a trusted social network. FIG. 29 illustrates the following steps:
a) Authentication and Authorization User A 1 has a list of files, namely File A-1 60 on a shared folder. User A 1 must first be identified and receive authorization from the trusted servers 3 in order to access the network.
b) Trusted peer of User A can access File A-1 A trusted peer for A 1, in this case User B 9, who is already authorized to be on the system can now access File A-1 60.
c) Socially related users can access Any connected user that are related to User A 1 or User B 9, in this case, $B_n$ 70 ($n$ representing the degree of separation from User B 9) can also access File A-1 60 depending on the permission first declared by User A 1. For example, User A 1 can limit the degree of separation (n) for which the file can be accessed.
d) Non socially related users cannot access Users on the network that do not have a social connection to Users A 1 or B 9, in this case User X 90, cannot have access to File A-1 60.

This example assumes that all users are connected to the Internet without limits on network access such as firewalls. The use of proxies on trusted servers is necessary when there are limits to network access. This scenario is discussed, for example, in the above section entitled Delivery Through Relay.

EXAMPLE 1B

Photo Sharing on a Trusted Social Network

Figure 30:
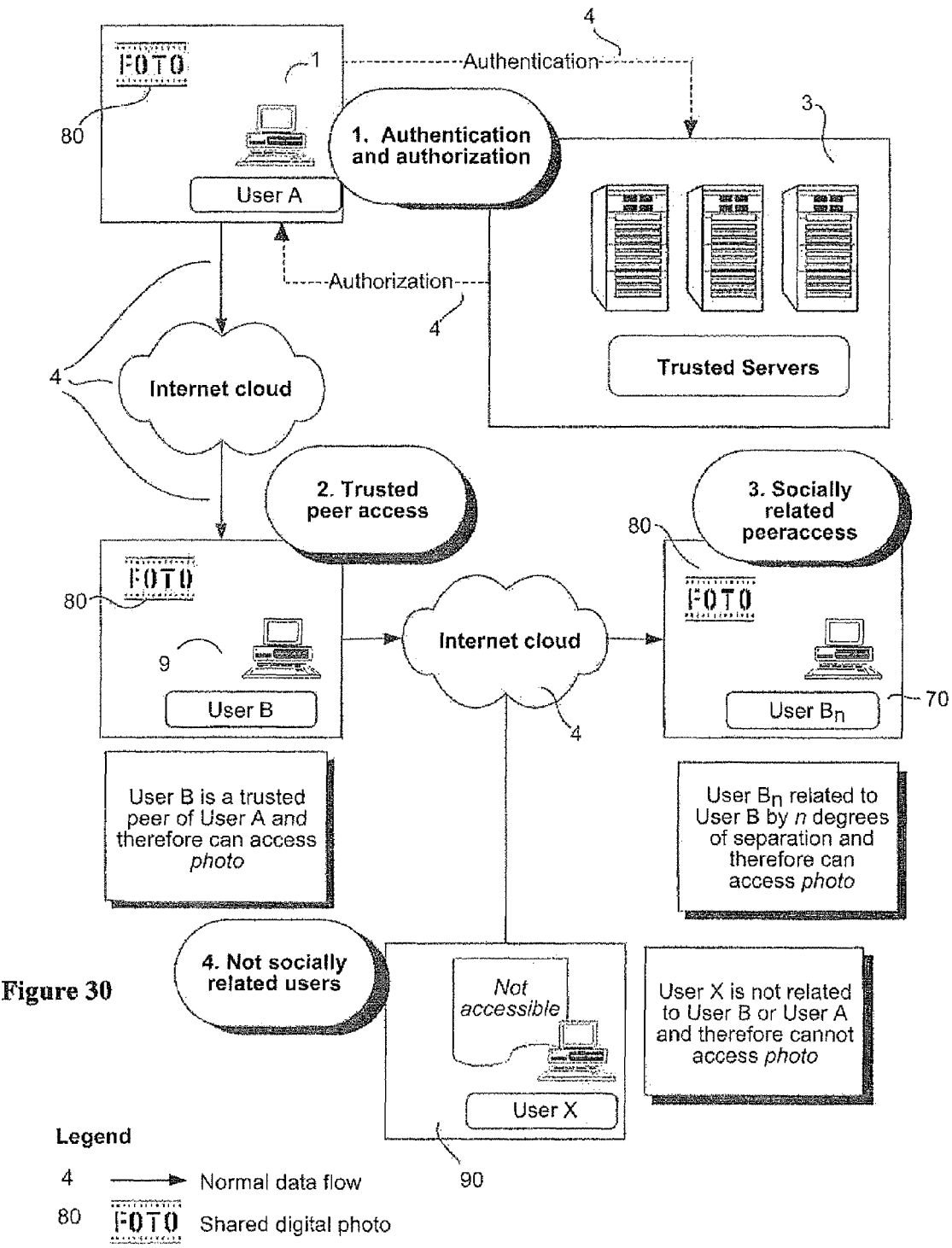
FIG. 30 is a process chart demonstrating an example of photo file sharing through a trusted social network according to one embodiment of the present invention.

This example describes the process of sharing digital photographs on a trusted social network. Digital photographs are a specific example of file transfer that involves file sizes ranging from kilobytes to megabytes. FIG. 30 is a schematic illustrating an example of sharing photograph through a trusted social network. The detail implementation is covered herein. FIG. 30 illustrates the following steps:
1. Authentication and Authorization User A 1 has one or more digital photograph file 80 on a computing device connected to the network. User A 1 must first be identified and receive authorization from the trusted servers 3 in order to access the network.
2. Trusted peer of User A can access A trusted peer to A 1, in this case User B 9, who is already authorized to be on the system can now access the photograph file 80.
3. Socially related users can access Any connected user that is related to User A 1 or User B 9, in this case, $B_n$ 70 ($n$ representing the degree of separation from User B 9) can also access the photo 80 depending on the permission first declared by User A 1. For example, User A 1 can limit the degree of separation (n) for which the photograph file 80 can be accessed.
4. Unrelated users cannot access Users on the network that do not have a social connection to Users A 1 or B 9, in this case User X 90, cannot have access to the photograph file 80.

This example assumes that all users are connected to the Internet without limits on network access such as firewalls. The use of proxies on trusted servers is necessary when there are limits to network access.

EXAMPLE 1C

Video Sharing on a Trusted Social Network

Figure 31:
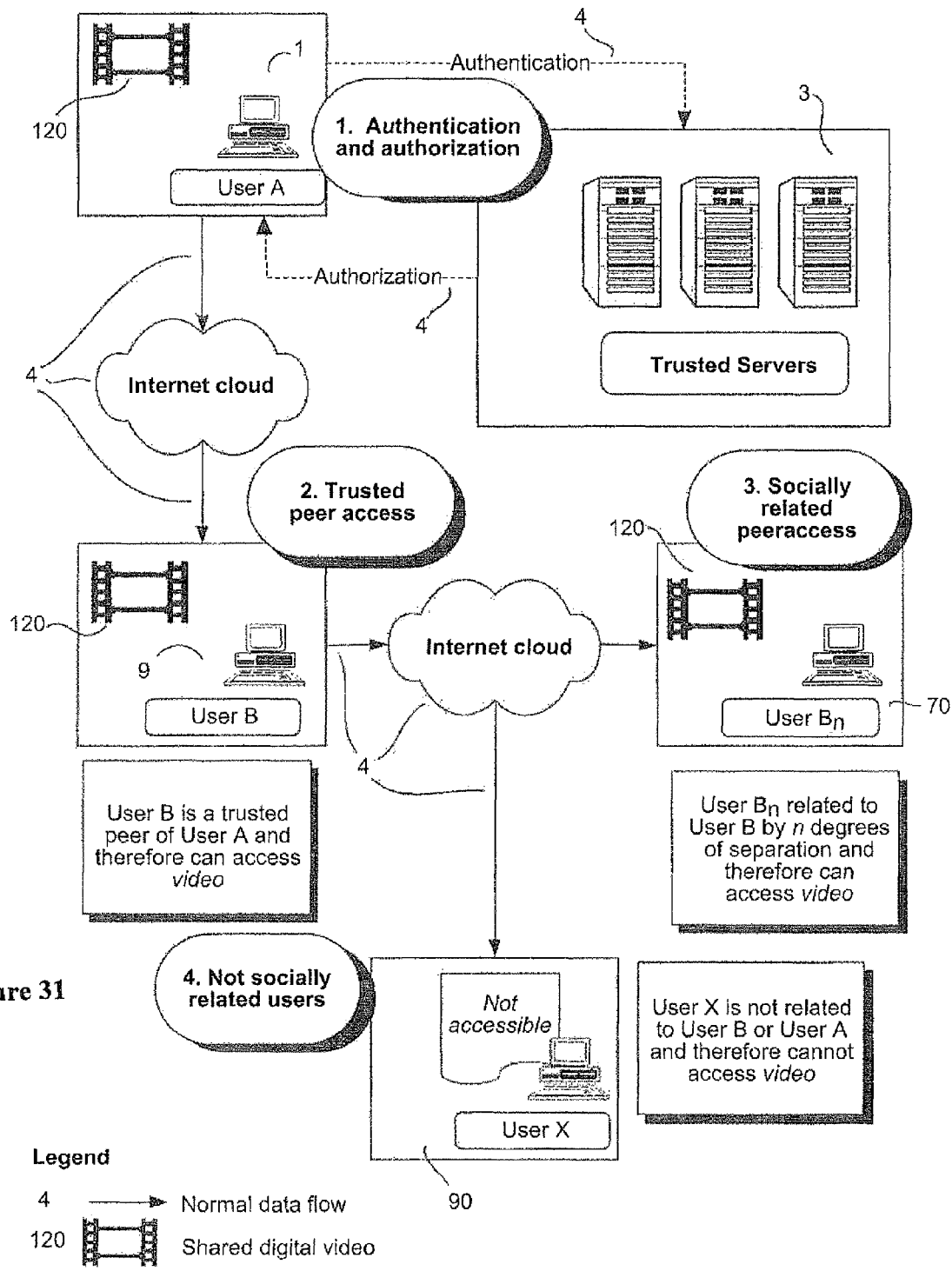
FIG. 31 is a process chart demonstrating and example of video file sharing through a trusted social network according to one embodiment of the present invention.
Figure 32:
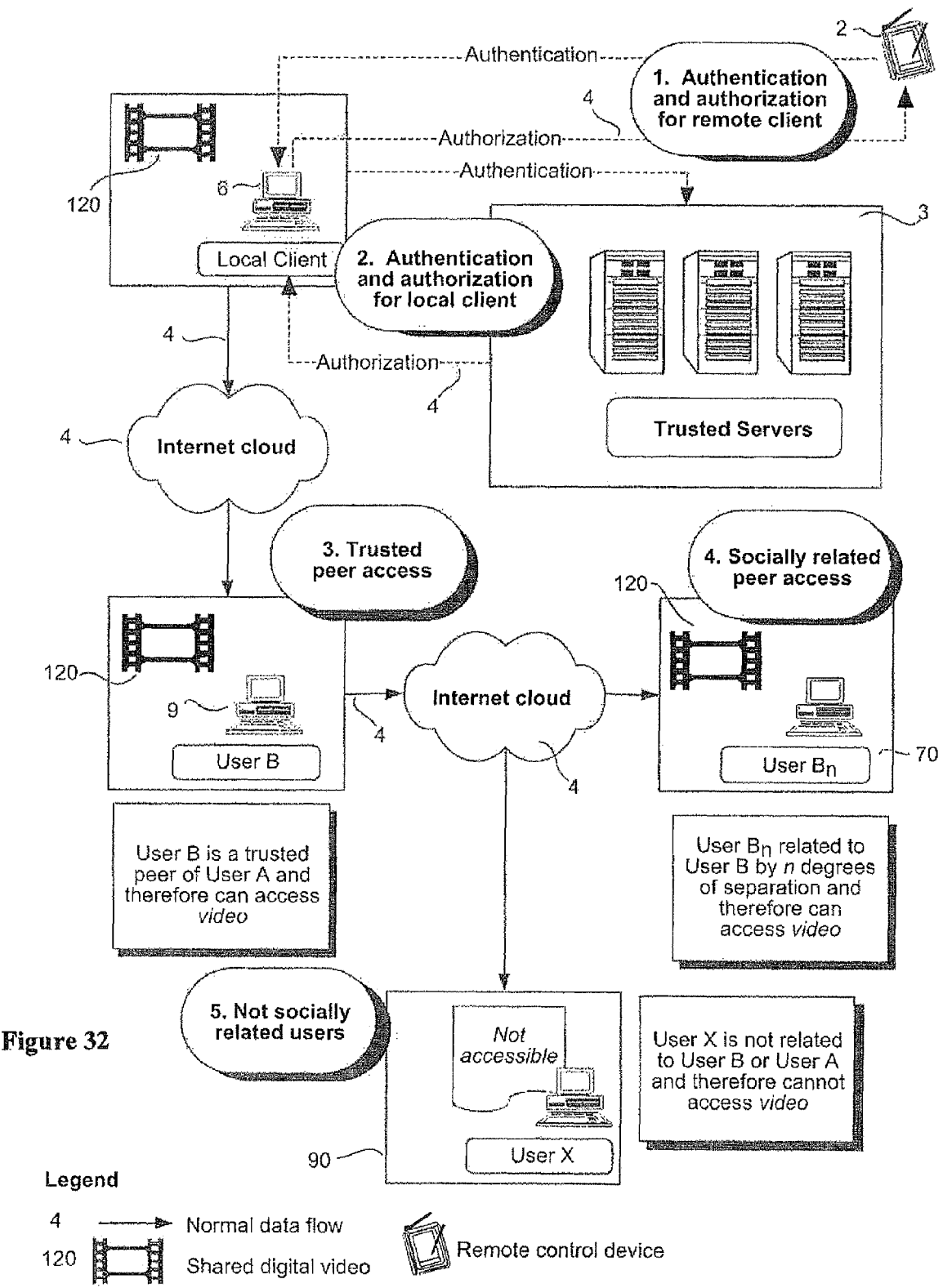
FIG. 32 is a process chart demonstrating an example of remote access and file sharing through a trusted social network according to one embodiment of the present invention.

This example describes the process of sharing digital videos on a trusted social network. Digital videos are a specific example of rich media file transfers that involve extremely large files ranging from megabytes to gigabytes in size. FIG. 31 is a schematic illustrating an example of sharing digital video through a trusted social network. FIG. 31 illustrates the following steps:
1. Authentication and Authorization User A 1 has one or more digital video files 120 located in a shared folder. User A 1 must first be identified and receive authorization from the trusted servers 3 in order to access the network.

2. Trusted peer of User A can access A trusted peer of User A 1, in this case User B 9, who is already authorized to be on the system can now access the video file 120.
3. Socially related users can access Any connected user that are related to User A 1 or User B 9, in this case, $B_n$ 70 ($n$ representing the degree of separation from User B 9) can also access the video file 120 depending on the permission first declared by User A 1. For example, A 1 can limit the degree of separation (n) for which the video can be accessed.
4. Unrelated users cannot access Users on the network that do not have a social connection to Users A 1 or B 9, in this case User X 90, cannot have access to video file 120.

This example assumes that all users are connected to the Internet without limits on network access such as firewalls. The use of proxies on trusted servers is necessary when there are limits to network access. This scenario is discussed, for example, in the above section entitled Delivery Through Relay.

EXAMPLE 1D

Remote Access and File Sharing on a Trusted Social Network

This example describes the process of remote access of the client to share digital videos on a trusted social network. The process by which a user can access the system remotely is discussed elsewhere. Once the system authorizes the remote access, the user can then carry out all the activities that are permitted on the network. FIG. 31 describes the sharing of digital videos through a remote access. The following steps are illustrated:

1. Authentication and authorization for remote client User A 1 must first establish a communication channel between the remote device 2 and the software client 6. The software client 6 will issue a challenge and User A 1 must then complete the logon steps to gain access to the software client. Once the logon process is successful, User A 1 can then issue commands to the software client 6 through the remote device 2.
2. Authentication and Authorization User A 1 starts and completes the logon process for the software client 6 and the trusted servers 3. User A 1 has a file 120 on a shared folder.
3. Trusted peer of User A can access A trusted peer for A 1, in this case User B 9, who is already authorized to be on the system can now access the file 120.
4. Socially related users can access Any connected user that are related to User A 1 or User B 9, in this case, $B_n$ 70 ($n$ representing the degree of separation from User B 9) can also access the video depending on the permission first declared by User A 1. For example, A 1 can limit the degree of separation (n) for which the file 120 can be accessed.
5. Not socially related users cannot access Users on the network that do not have a social connection to Users A 1 or B 9, in this case User X 90, cannot have access to the file 120.

This example assumes that all users are connected to the Internet without limits on network access such as firewalls. The use of proxies on trusted servers is necessary when there are limits to network access. This scenario is discussed, for example, in the above section entitled Delivery Through Relay.

EXAMPLE 1E

Editing Files Collaboratively on a Trusted Social Network

In this example, User A first creates a source file involving a trusted peer (User B) and User B's trusted peer (User B1). User A can create a source file using any type of software (e.g. Microsoft Word, WordPerfect, Open-Office, Excel, PowerPoint, Adobe Premier, Apple Quick time, etc.) and in any type of format (e.g. text, graphic, audio or video). User A then saves the file in a folder that is designated as a shared folder. User A marks the file with the appropriate access permissions such as the degree of separation of users able to view or edit the file. Users other than User A are not permitted to delete the file. Access permissions are relayed to an editing server. The editing server sends a message to User A's trusted peers (such as User B) that there is a collaboration file available. Trusted peers of User A within the appropriate degree of separation can access the collaboration file from User A through the network. When authorized users attempt to edit the file, a message is sent to the editing server that this file is being edited. The editing server checks whether the file is the latest version. If the file a user is attempting to edit is not the latest version, the user is given an option to update to the latest version. The user can then proceed to edit the file using local resources. While the file is being edited, the editing server will not allow another user to edit the file. Once the user has finished editing the file, the user sends a message to the editing server. The editing server then releases the lock on the file so that other users can edit the file. The editing server labels the new version of the file as the latest version and notifies other users who have been granted access to the file that a new version is available. Access to and editing control over the file is controlled by User A. For example, User A sets the permission so that the trusted peers of User A's trusted peers can also access the file (i.e. n=1). In this case, User B, a trusted peer of User A, can edit the file. User B1, a trusted peer of User B, but not necessary a trusted peer of User A, can also edit the file. User B1 obtains information of the existence of a collaboration file either directly (through a message from User B) or indirectly (through a search of the network). User B1 can then download the latest versions of the collaboration file from sources that have the latest version. User B1 now can edit the file unless another user is already editing the file as described above.

EXAMPLE 1F

Sharing Bookmarks and World Wide Web Links on a Trusted Network

In a more specific example of collaboration, User A uses a trusted Peer-to-Peer network to create and share a series of bookmarks and World Wide Web (WWW) links. User A first defines a collection of bookmarks or WWW links that they want to share with their trusted peers. User A then marks the collection of bookmarks with the appropriate access permissions, in this case N=0. User A further decides that other users can add to the bookmark collection but may not delete from the collection, nor delete the collection entirely. Access permissions for the collection are relayed to the editing server. The editing server sends a message to User A's contact list that there is a collaboration collection of bookmarks available. Trusted peers of User A within the degree of separation of N=0 can obtain the bookmarks from User A through the trusted network. Authorized persons can add to this collection as follows: A user accesses the collaboration collection of bookmarks and wants to contribute to the collection. A message is sent to the editing server that a user wants to contribute to the bookmark. The editing server checks whether the bookmark file is the latest version of the collection. If it is not the latest version, the user is given the option to update. Since the permission for the collection is addition only, there is no need to lock the collection while it is being edited. The user can proceed to edit the collection of bookmarks. Once the update is finished, the user sends a message to the editing server. The editing server updates its information on the latest version of the collection. Users within the network can access and contribute to this collaboration collection of bookmarks depending on the access permission provided by User A.

EXAMPLE 1G

Synchronization in a Trusted Network

In this example, the following groups of trusted peers have various degrees of separation from User A (expressed as values of "n"):

| n = 0 | n = 1 | Comment |
| --- | --- | --- |
| B | B1, B2, B3 | Trusted peers of B |
| C | C1, C2, C3 | Trusted peers of C |
| D | D1, D2, D3 | Trusted peers of D |
| E | E1, E2, E3 | Trusted peers of E |

User A wishes to synchronize a synchronization object with other trusted peers. The object can be any type of digital file and may comprise entire folders or directories. User A first defines the synchronization object using the client software. User A also enters a description of the object and the degree of separation required to access the object (in this case, n=1). The client software sends a message to the synchronization Server that includes at a minimum a description of the object and the degree of separation needed to access the object. Users of the network who fall within the criteria defined by User A (n=1) receive a message from the synchronization server informing them that User A has created a synchronization object that they can either accept or reject. If the users accept the synchronization object, they can obtain the object from User A or from other users within User A's trusted network that have the most recent version of the object. Each user that has the object can then invite their trusted peers to download the object. This process can continue throughout the social network. The synchronization server compiles a list of users on the network who possess copies of the synchronization object. Once a list of synchronized users is created, whenever one of the users makes changes to the object; it will trigger the preset rules of behavior for the synchronization server for that particular change. For example, User B adds a file to Folder A in User B's local shared directory. A message is sent to the synchronization server notifying it there a new synchronization object has been added. The synchronization server then sends a message to all members that have that object and notifies them of the new addition. As a result, User A, C and B1 can download the latest addition from User B. Users A, C or B1 can also become a source of the new file. Other trusted peers that are within the set degree of social separation can also obtain the object. These trusted peers must search for the object through the network rather than receiving a message notification from the synchronization server. For example, User C1 can search and download the object because User C1 is n=1 degree of separation from User A. Trusted peers of User E1 cannot find object because User E1 is n=2 away from A.

EXAMPLE 1H

Synchronization as Broadcasting

In this example, the initiator of the synchronization object retains the rights to modify the object while all other trusted individuals can duplicate the object but cannot modify it. In this example, the synchronization feature functions in a fashion that is analogous to broadcasting. In this example, User A has the following groups of trusted peers that have various degree of separation from the A (expressed as a value of "n").

| n = 0 | n = 1 | Comment |
| --- | --- | --- |
| B | B1, B2, B3 | Trusted peers of B |
| C | C1, C2, C3 | Trusted peers of C |
| D | D1, D2, D3 | Trusted peers of D |
| E | E1, E2, E3 | Trusted peers of E |

User A creates a synchronization object using the client software. User A also enters a description of the object, the degree of separation required to access the object (in this case, n=1) and defines this object as the "Master synchronization object". The client software sends a message to the synchronization server including this information. All of the trusted peers of User A receive a message from the synchronization server that asks them if they wish to accept the object. If they accept, these users can obtain the object from User A or anyone on User A's list that has the most recent version of object. In this example, User A has trusted peers B, C, D and E. Users B, C, D, and E receive a message from the synchronization server identifying the fact that User A has a synchronization object available. Users B and C accept the object. User B then downloads the object from User A first. Once B has downloaded some portion of the object, User C can download the object from either User B and/or User A. Users D and E do not accept the file and will not be contacted again with regard to this object. Depending on the initial settings of the synchronization object for the degree of separation, each user that has the object can invite their trusted peers to download the object. Their trusted peers can, in turn, also invite their trusted peers if the object. Once the initial dissemination of the synchronization object is complete, the synchronization server compiles a list of trusted peers that have the object. Whenever User A makes changes to the object, it will trigger the rules of behavior for the synchronization server for that particular change. When this occurs, the synchronization server notifies the users on its list that a new version of the synchronization object is available for download. Only changes from User A will trigger updates to other owners of the object. Users wishing to be deleted from the synchronization list can send instructions to the synchronization server.

EXAMPLE 1I

Using Synchronization as Backup

In this example, the initiator of the synchronization object uses the synchronization feature as a means of backing up files on a computer. User A defines a folder ("Backup") on his computer as a sync object. User A wants to back up this folder on the hard drive of his trusted peers, Users B and C. The synchronization server contacts B and C and asks them if they are will accept A's request. When Users B and C accept User A's request, folder ("Backup") is copied to the hard drive of Users B and C respectively. User A can set the properties for the Backup folder so that objects in the folder are updated every time the folder is changed. User A can also specify that the Backup folder is locked and that Users B and C cannot access the contents of the Backup folder on their local disk. This could be accomplished, for example through the use of encryption or password protection. This system is possible without lengthy negotiation because a relationship of trust already exists between Users A, B and C.

EXAMPLE 2

An Electronic Market on a Trusted Social Network

The present invention can also be used to setup an electronic marketplace for digital goods. Such markets are created when the system can assign an explicit value to the transactions between users on their trusted social network. Markets differ in the information being tracked when an item is transferred between two users. For markets based on transactions, the system automatically assigns value based on the interaction between two socially related users. For market based on transfer of digital right, an additional service, known as a digital rights manager, is required to track the legitimate ownership of a particular piece of content. A natural extension of this concept is in the transfer of non-digital goods. The following systems are not mutually exclusive and can be used in conjunction with each other.

EXAMPLE 2A

Market Based on Transactions

Figure 33:
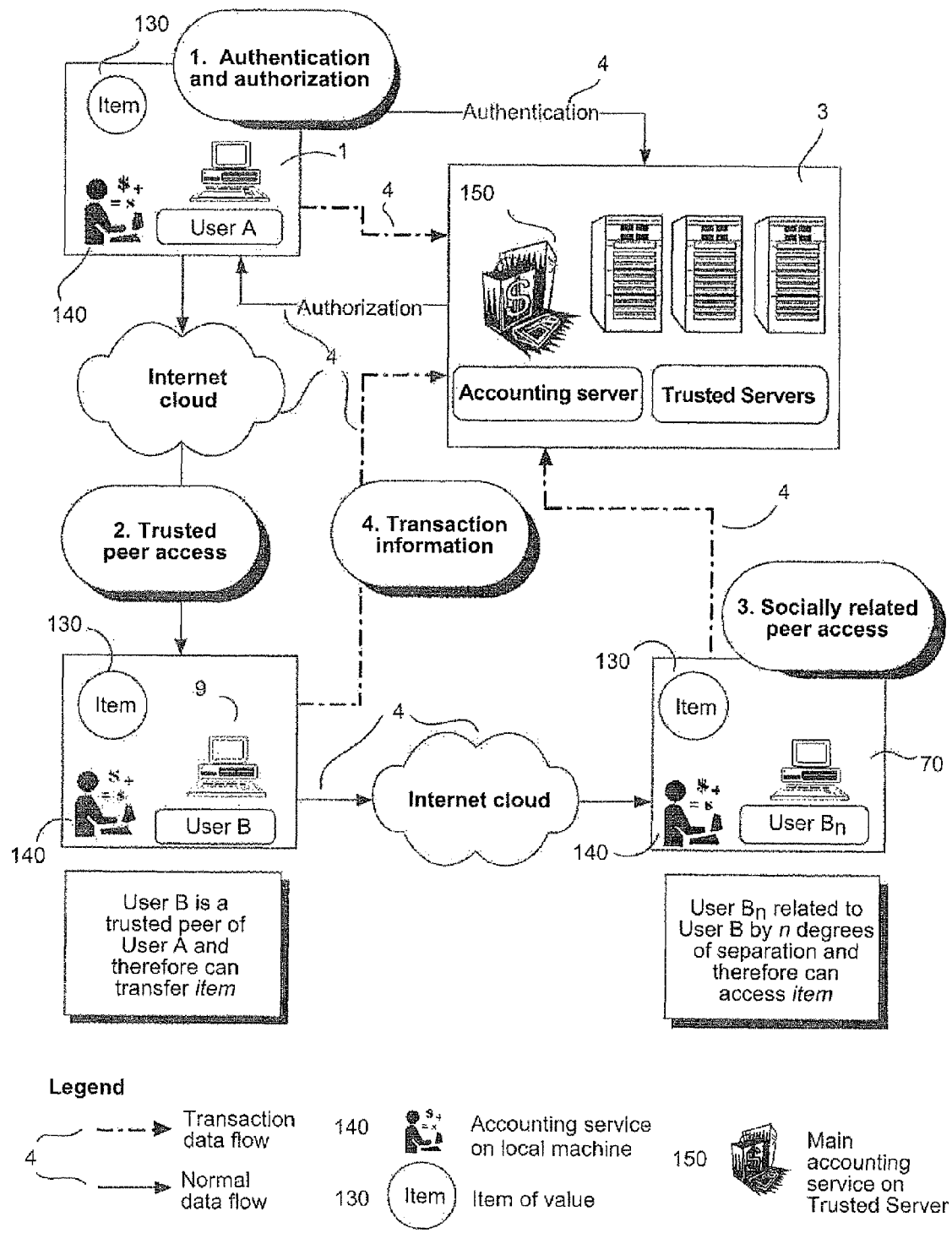
FIG. 33 is a process chart demonstrating a transaction based electronic markets on a trusted social network according to one embodiment of the present invention.

FIG. 33 is an example of an electronic market built on a trusted social network according to one embodiment of the present invention. In this case, the main components of this electronic market involve:
1. Authentication and Authorization User A 1 has an item 130 on a shared folder. User A 1 must first be identified and receive authorization from trusted servers 3 to access the network.
2. Trusted peer of User A request and obtain item A trusted peer, for example User B 9, who is already authorized to be on the system and is defined by User A 1 to be a trusted peer, can now negotiate the purchase of item 130 from User A 1. This transaction is recorded in an accounting service 140 on the local machine for both Users A 1 and B 9.
3. Socially related users access Any connected user that are related to User A 1 or User B 9, in this case, $B_n$ 70 (n representing the degree of separation from User B 9) can also negotiate the purchase of the item 130 depending on the permission first setup by User A 1 and subsequently, all the other related users. This transaction is also recorded in an accounting service 140 on the local computing device of User A 1 and User $B_n$ 70.
4. Transaction information For each user, the local accounting service reports the transaction information to the accounting server 150 on the trusted servers 3. The accounting server 150 can then assign values to each transaction. Examples of transaction information include, but are not limited to file type, file size, speed of transfer, value of transfer, user satisfaction. Examples of assign values for transactions include, but are not limited to, cash or system credits.

An electronic market is thereby created which assign value to an activity over the network.

EXAMPLE 2B

Market Based on Transfer of Digital Rights

Figure 34:
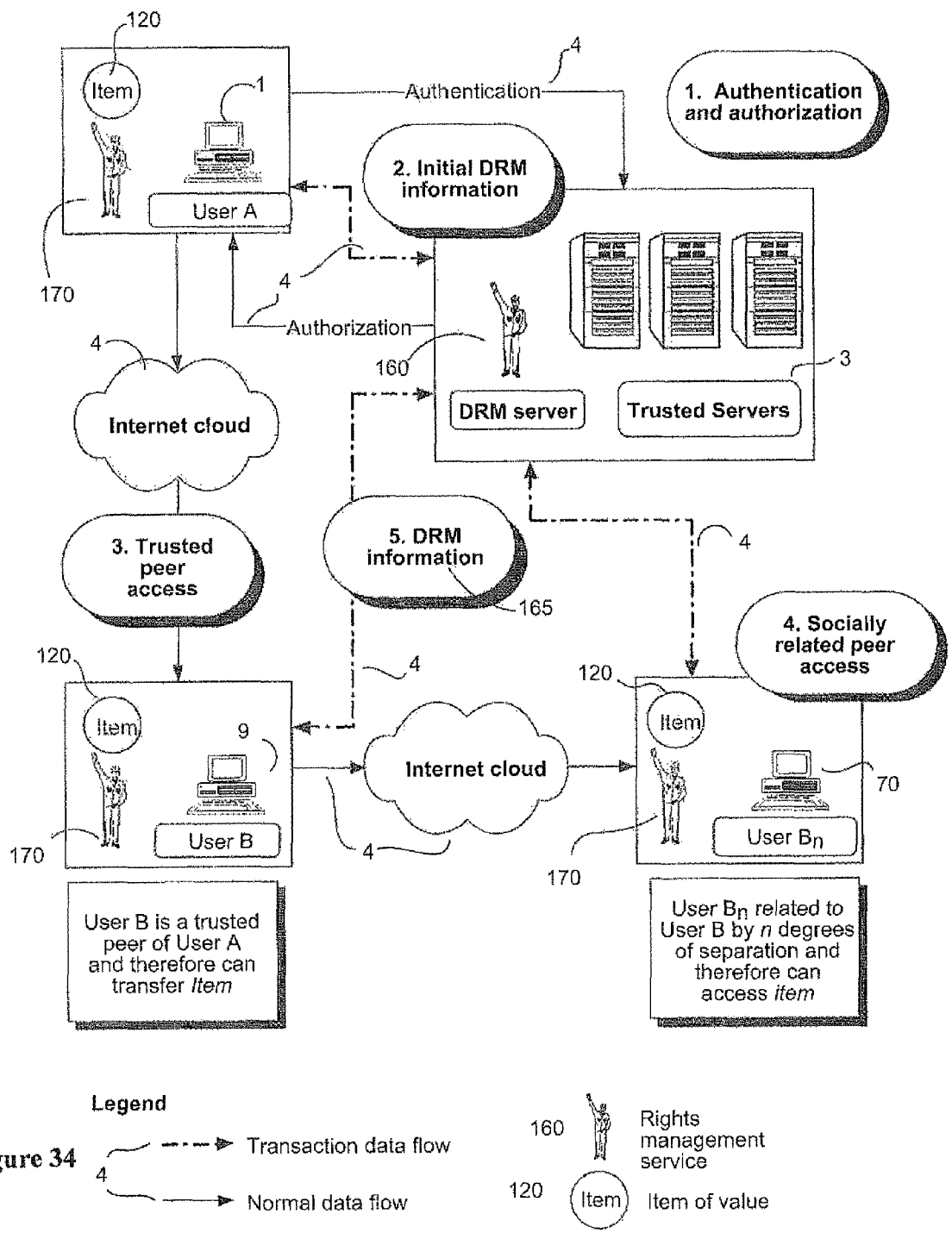
FIG. 34 is a process chart demonstrating an electronic market based on the transfer of digital rights according to one embodiment of the present invention.

FIG. 34 illustrates an electronic market built on a trusted social network based on the transfer of digital rights. In this case, the system requires the addition of a DRM (Digital Rights Management) server, to manage the rules and regulations governing the ownership of the object, for example copyrights, licenses and the like. The main components of this system are:
1. Authentication and Authorization User A 1 is the digital rights holder of an item (such as a digital music file protected by copyright) 120 on a shared folder. User A 1 must first be identified and receive authorization from the trusted servers 3 to access the network.
2. Initial DRM information User A 1, sends the Digital Rights Management (DRM) 165 information to the DRM server 160.
3. Trusted peer of User A can request and obtain item. A trusted peer of User A 1, defined as User B 9, who is already authorized to be on the system can now obtain the item 120 from User A 1 once any necessary negotiations regarding rights have been concluded.
4. Socially related users can access Any connected users that are related to User A 1 or User B 9, in this case, $B_n$ 70 (n representing the degree of separation from User B 9) can also obtain the item 120 depending on the permission first setup by User A 1 and subsequently, all the other related users. The DRM information 165 is sent to the local digital rights manager 160 installed on the local system 170.
5. Digital rights information For each user, the local accounting service 140 reports the digital rights information to the DRM Server 160 on the trusted servers 3. The DRM Server 160 can then assign the appropriate access rules and regulation governing the use of the item as defined by the digital rights owner, namely User A 1.

The addition of a DRM server can therefore effectively enforce copyrights in digital files in a flexible and effective manner throughout the network. The social element of this network provides an additional level of security and enforcement for transactions involving digital rights.

EXAMPLE 2C

Extension of Electronic Market to Identifiable Non-Digital Goods

Figure 35:
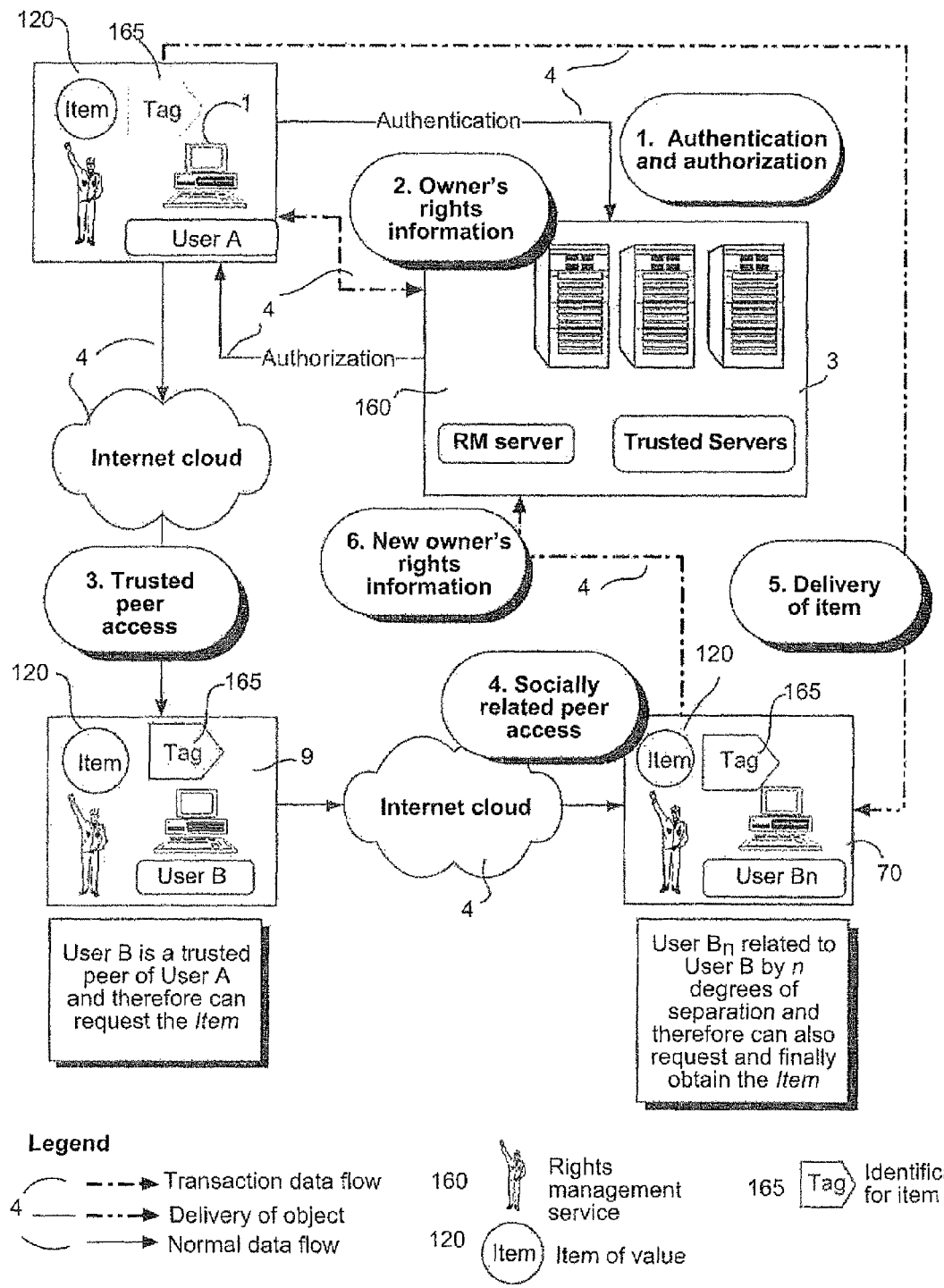
FIG. 35 is a process chart demonstrating an example of extending the electronic market to include identifiable non-digital goods according to one embodiment of the present invention.

An electronic market built on a trusted social network as described herein can also be used for the trading of non-digital goods. This embodiment describes the use of the electronic market to exchange non-digital goods. Additional requirements to implement this example are the availability of a unique identifier for the object of interest and a Rights Management (RM) server. Examples of unique identifiers include but are not limited to the following: manufacturer's serial numbers, Radio Frequency Identification (RFID) tags and/or Universal Product Code (UPC). The RM server will manage the rules and regulations governing the ownership of the object including copyright, licenses, assignments and the like. FIG. 35 illustrates an electronic market built on a trusted social network based on the availability of unique identifiers for an object. The main components of this system are:

1. Authentication and Authorization User A 1 is the owner of an item 120 that can be identified uniquely by means of an identifier 165. User A 1 must first be identified and receive authorization from the trusted servers 3 to access the network.
2. Owner's rights information User A 1 sends the unique identifier 165 and ownership information 165 to the Rights Management (RM) server 160.
3. Trusted peer of User A can access A trusted peer, defined as User B 9, who is already authorized to be on the system, can now request the item from User A 1.
4. Socially related users can access Any connected users that are related to User A 1 or User B 9, in this case, $B_n$ 70 (n representing the degree of separation from User B 9) can also request the item 120 depending on the permission first setup by User A 1 and subsequently, all the other related users.
5. Delivery of Item In this example, User A 1 accepts the request of User $N_n$ 70 and delivers the item 120 together with its unique identifier 165. The item 120 can be delivered an external process for example: mail, courier service or direct delivery.
6. New owner's rights information Once User $B_n$ 70 receives the item, rights information is sent back to RM server 160 to conclude the transaction.

The addition of a RM server can therefore effectively enforce ownership in a flexible and effective manner throughout the network. The social element of this network provides an additional level of security and enforcement for transactions involving non-digital goods.

EXAMPLE 3C

Banking Services on a Trusted Network

In this example, the following groups of trusted peers have various degrees of separation from User A (expressed as values of "n"):

| User ID | Role | Characteristics | Degree of separation from B (n) |
|---|---|---|---|
| A | Lender | Trusted peer of B | 0 |
| A1 | Lender | Trusted peer of A | 1 |
| A2 | Lender | Trusted peer of A1 | 2 |
| C | Lender | Trusted peer of B | 0 |
| C1 | Lender | Trusted peer of C | 1 |
| C2 | Lender | Trusted peer of C1 | 2 |
| C3 | Lender | Trusted peer of C3 | 3 |
| B | Borrower | Trusted peer of A | |

A user (User A) on a trusted network decides that he or she wants to be a lender. User A sends a message to the banking server containing information such as: the maximum amount of money the user is willing to lend, the desired interest rate for the loan, the repayment period and the degree of separation within which the user is willing to lend money. These preferences could be expressed as ranges to allow for negotiation between lender and borrower.

| User ID | Max Loan ($) | Desired Interest rate (%) | Period (months) | Degree of separation from themselves (n) |
|---|---|---|---|---|
| A | 200 | 5 | 6 | 0 |
| A1 | 200 | 8 | 6 | 1 |
| A2 | 400 | 7 | 12 | 2 |
| C | 200 | 10 | 12 | 1 |
| C1 | 400 | 5 | 6 | 0 |
| C2 | 200 | 5 | 6 | 1 |
| C3 | 500 | 5 | 6 | 2 |

Lender summary table

User B decides that he wants to borrow money. The user sends a request to the banking server with information such as the amount of money that he requires, the interest rate that he is willing to pay, the loan period and the degree of separation within which he is willing to borrow money (Bn). Again, these preferences could be expressed in terms of ranges to allow for negotiation.

| User ID | Loan request ($) | Desired Interest rate (%) | Period (months) | Degree of separation from B (n) |
|---|---|---|---|---|
| B | 500 | 8 | 6 | 2 |

Borrower summary table

The banking server receives the request from User B and consults its database of lenders. In this example, the primary determinant is the degree of separation; followed by the desired interest rate.

All members that are n=2 or less away from B and is willing to lend money to B.

| User ID | Degree of separation from B (n) | Degree of separation from themselves (n) | Match |
|---|---|---|---|
| A | 0 | 0 | Yes |
| A1 | 1 | 1 | Yes |
| A2 | 2 | 2 | Yes |
| C | 0 | 1 | Yes |
| C1 | 1 | 0 | No |
| C2 | 2 | 1 | No |
| C3 | 3 | 2 | No |

Applying the second criteria, that lenders must be willing to accept a lending rate less than or equal to the desired interest rate of User B.

| User ID | Desired interest rate (%) | Comment |
|---|---|---|
| A | 5 | Yes |
| A1 | 8 | Yes |
| A2 | 7 | Yes |
| C | 10 | No |

The resulting list of lending candidates that satisfy the preferences are sent back to the borrower. For example:

| Lender | Max Loan ($) | Desired Interest rate (%) | Period (months) |
| --- | --- | --- | --- |
| A | 200 | 5 | 6 |
| A1 | 200 | 8 | 6 |
| A2 | 400 | 7 | 12 |

User B can now decide how to mix and match the loans to meet his desired $500 total. In this example, he chooses:

| Lender | Loan request by B ($) | Desired Interest rate (%) | Period (months) |
| --- | --- | --- | --- |
| A | 100 | 5 | 6 |
| A2 | 400 | 7 | 12 |

This information is sent back to the banking server, which then establishes a dialogue between lenders and borrower. The banking server sends a message to each of the lenders that a user on the network has met their lending criteria and has requested money. The lender can either accept or decline the offer.

For this example, User A receives a message from banking server that a user wishes to borrow $100 at 5% for 6 months. User A2 also receives a message from banking server that a borrower wishes to borrow $400 at 7% for 12 months. Users A and A2 each have the option to accept or decline the request.

If the lender accepts the request, they receive more information on the request for money and are prompted for the terms and conditions of the loan. The lender then authorizes the money transfer to borrower. The borrower receives the money and the Bank Server starts tracking the time and interest payments. Conditions for account delinquency are predefined. Examples of delinquency conditions include: missed payments, frequent late payments or refusal to pay. If delinquency conditions are met, the Bank Server will carry out enforcement which may include temporary or permanent ejection from the network, alteration of reputation status, or other enforcement means as determined by the administrators. The lender also has recourse to all normal means of collection and enforcement under the law. However, given that the lenders and the borrowers are linked by a pre-existing relationship of trust, delinquency is less likely to occur than in financial relationships between strangers, due to the resulting harm to the social relationship. Once all payments are made, the loan is considered to be finished.

EXAMPLE 3A

Normal Auctions on a Trusted Social Network

The trusted social network as outlined herein can also be used as the basis for different types of auctions.

Figure 36:
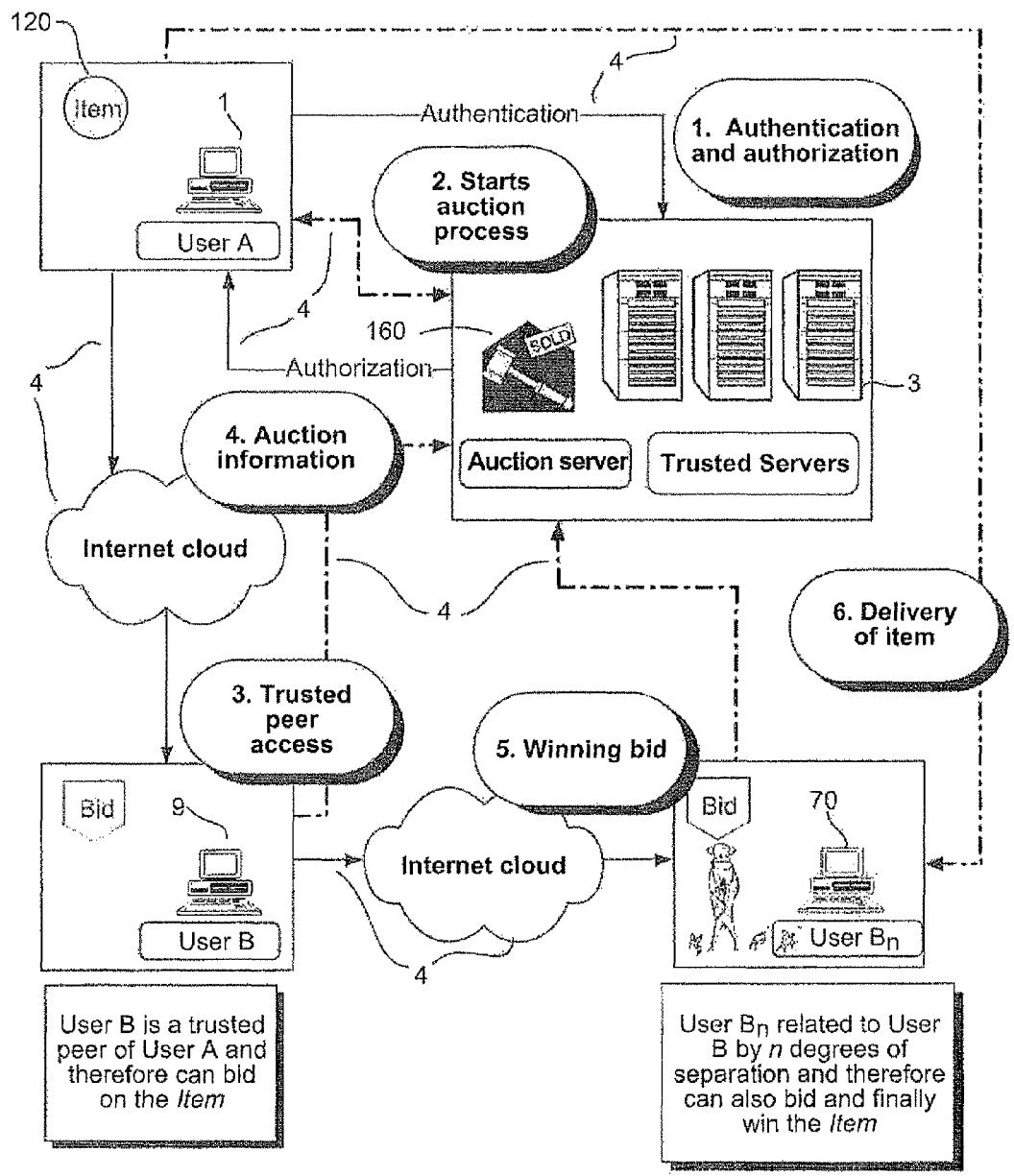
FIG. 36 is a process chart demonstrating an example of auction over a trusted network according to one embodiment of the present invention
Figure 36:
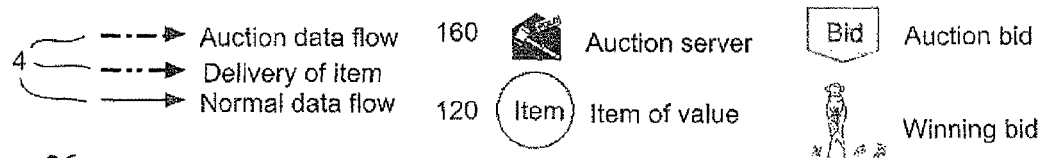

In a normal auction there are a single seller and many potential buyers bidding for the item being sold. On a trusted social network as described herein, the buyers are limited to the extended social network of the seller. FIG. 36 is an example of an electronic auction where a user, defined as A, initiates and carries out an auction though this trusted social network.

1. Authentication and Authorization User A 1 is the owner of an item 120 for auction on the network. User A 1 must first be identified and receive authorization from the trusted servers 3 to access the network.
2. Starts auction process User A 1 initiates the auction process by sending the appropriate information to an Auction server.
3. Trusted peer Bidding A trusted peer, defined as User B 9, who is already authorized to be on the system can now obtain the auction information concerning the item 120 from the auction server 160. Any other users that are related to A 1 or B 9 can also access this information through defined social relations.
4. Auction information sends to auction server Any connected users that are related to User A 1 or User B 9 can bid on the item 120 by contacting the auction server 160. The auction server can enforce such rules as the time limit for auction, the price limit for item, volume discounts, and exclusions (for example, based on location, reputation, etc.)
5. The auction server 160 maintains control of the auction process until the auction is finished.
6. Winning bid The auction server notifies both User A 1 and the winner of the result of the winning bid. In this case, User $B_n$, 70 has the winning bid.
7. Delivery of item Once payment has been authorized, the owner of the item, User A 1, can then deliver the item to the winner, User $B_n$ 70. Verification of payment and delivery can be managed via the trusted servers 3.

EXAMPLE 3B

Reverse Auctions on a Trusted Social Network

Figure 37:
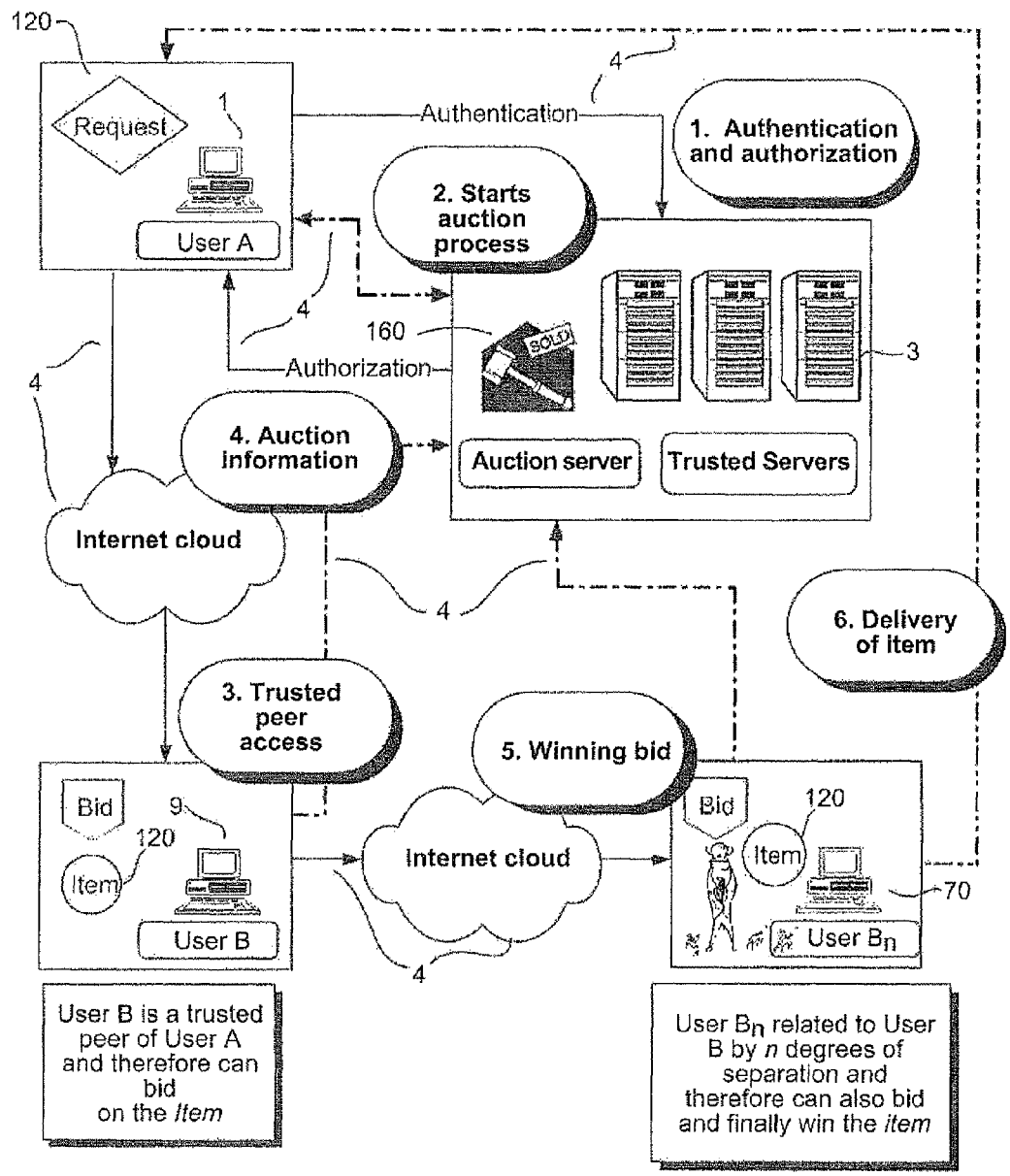
FIG. 37 is a process chart demonstrating a reverse auction on a trusted social network according to one embodiment of the present invention.

The auction system can also support reverse auctions. In a reverse auction there is one buyer and many sellers. The buyer specifies what they want to purchase and offers it to many suppliers. Normally, each buyer must be qualified to ensure that the winner is suitable to the buyer. As a result this type of process will usually produce the lowest possible price when all sellers are of equal quality. Qualification is implicitly defined in a social network since access to the network is by invitation only. Therefore, this type of network is suitable for carrying out reverse auctions. An example of a reverse auction is shown in FIG. 37. A description of the main elements in this process is as follows:

1. Authentication and Authorization User A 1 has a request for an item 120 that might be on the network. User A 1 must first be identified and receive authorization from the trusted servers 3 to access the network.
2. Starts auction process User A 1 initiates the auction process by sending the appropriate information to an auction server 160 requesting the item.
3. Trusted peer Bidding A trusted peer, defined as User B 9, who is already authorized to be on the system can now obtain the auction information concerning the request from the auction server 160. Any other users that are related to Users A 1 or B 9 can also access this information through defined social relations.
4. Auction information sent to auction server Any connected users that are related to
User A 1 or User B 9 can bid to satisfy the demands of User A 1 by contacting the auction server 160. The auction server can enforce such rules as the time limit for auction, the price for item, any volume discounts and conditions for acceptance (for example, based on location, reputation, etc.)
5. The auction server 160 maintains control of the auction process until the auction is finished.

6. Winning bid The auction server notifies both User A 1 and the winner of the result of the winning bid. In this case, User B$_n$ 70 has the winning bid.
7. Delivery of item Once payment has been authorized, the owner of the item, User B$_n$ 70, can then deliver the item 120 to the requesting user, User A 1. Verification of payment and delivery can be managed via the trusted servers 3.

EXAMPLE 4

Other Types of Communications Through a Trusted Social Network

The network according to the present invention represents a platform that can support a myriad of communication services. Example 4 lists various communication services that can be implemented on a trusted social network.

EXAMPLE 4A

Instant Messaging (IM)

Figure 38:
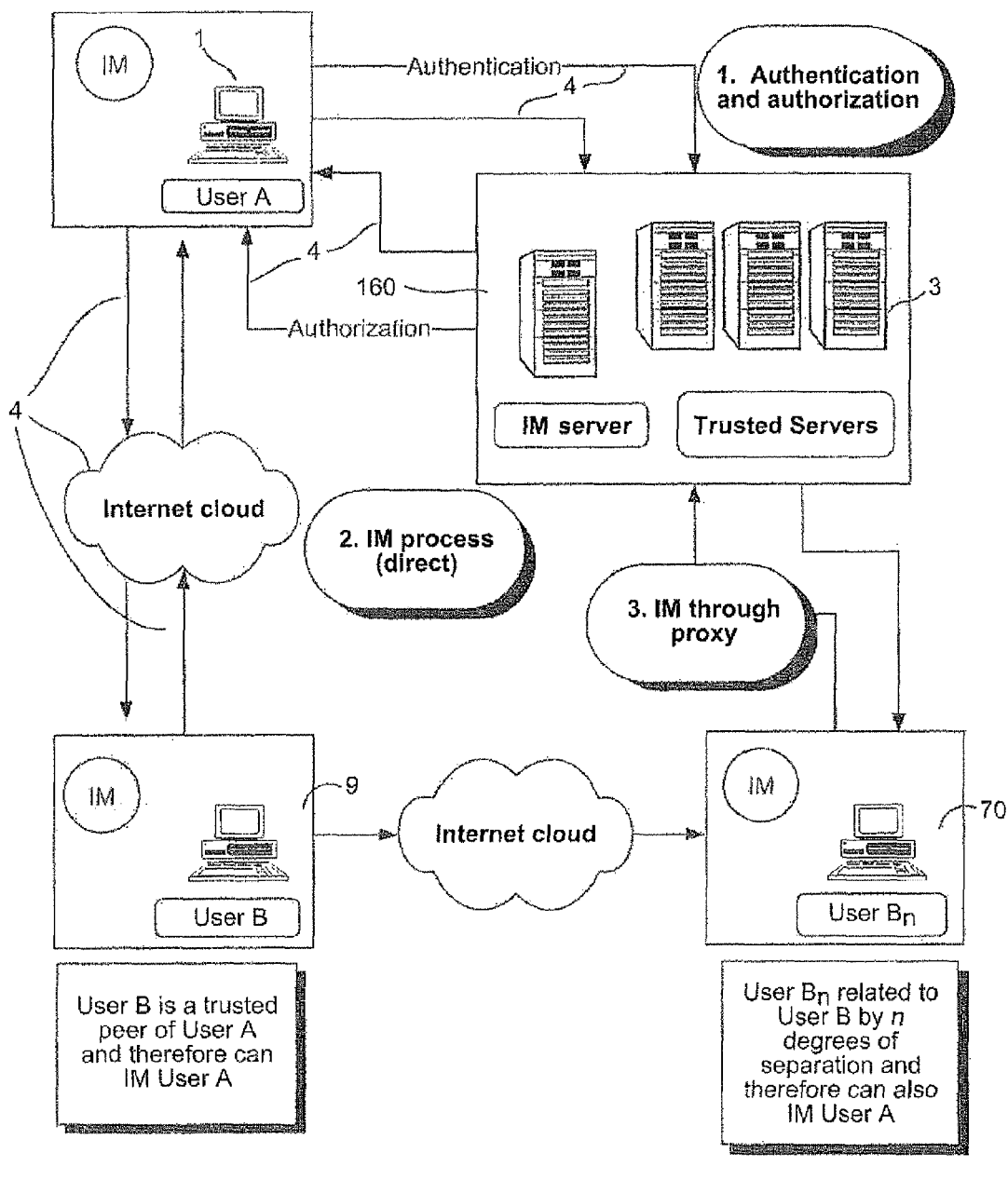
FIG. 38 is a process chart demonstrating an application of instant messaging (IM) services on a trusted social network according to one embodiment of the present invention.

Instant messaging (IM) is a real-time text-based message protocol over the Internet between two or more people who must all be online at the same time. FIG. 38 is an illustration of how an IM service can be implemented according to the present invention. The process includes:
1. Authentication and Authorization. User A 1 wants to communicate with a trusted peer. User A 1 logs in to the system and undergoes a process of authentication and authorization.
2. IM process (direct). Once on the network, User A 1 can communicate with those trusted peers that are also on the network, in this case, User B 9. User A 1 can also contact anyone that is socially related to the User B 9, for example, User B$_n$ 70, depending on their mutual preference settings.
3. IM through proxy. In some cases, Users are behind firewalls or other security devices and cannot be connected directly. In such cases, the IM service is available through the IM server 160 on the trusted servers 3.

EXAMPLE 4B

Voice Over Internet Protocol (VOIP)

Figure 39:
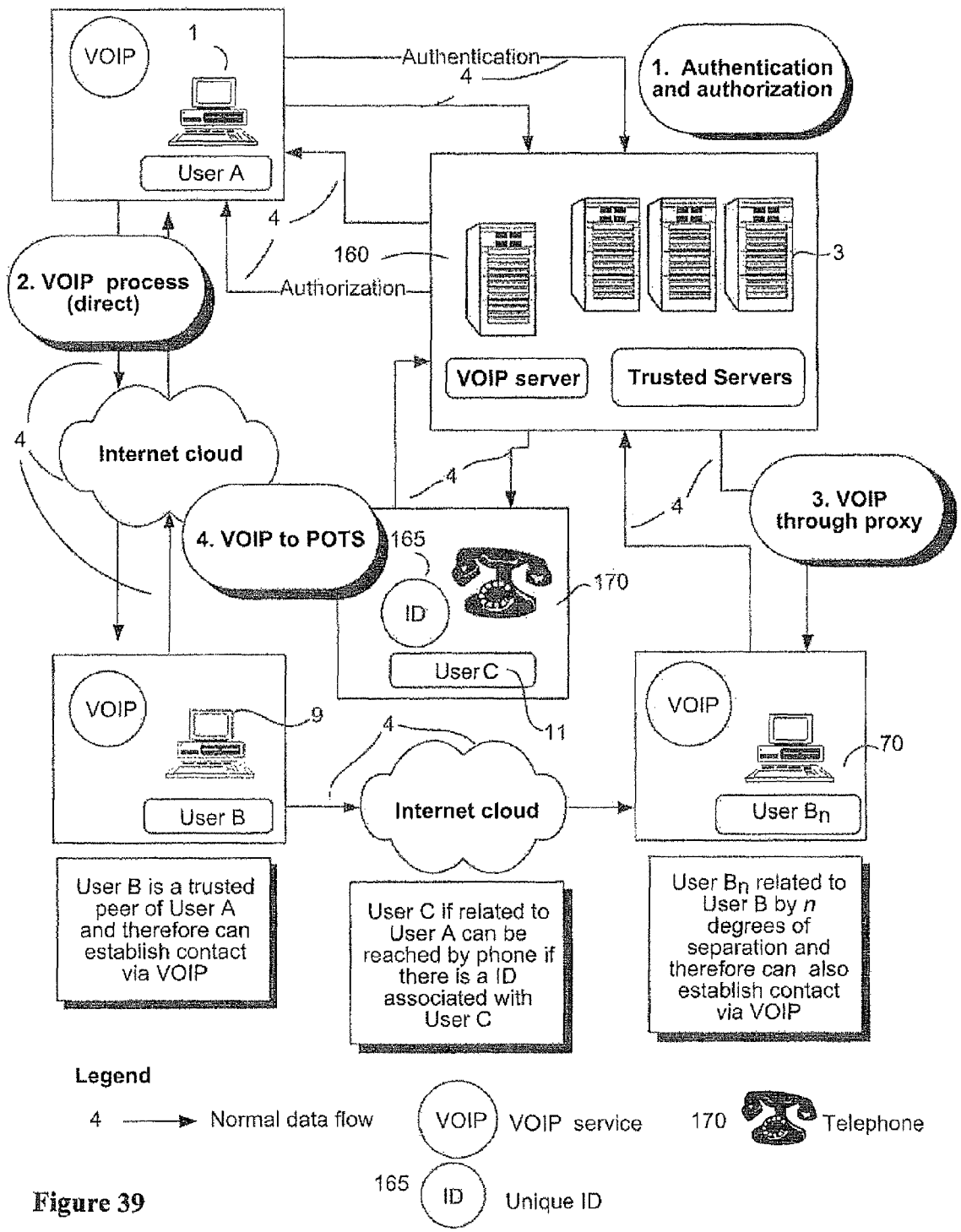
FIG. 39 is a process chart demonstrating Voice Over Internet Protocol (VOIP) services on a trusted social network according to one embodiment of the present invention.

Voice over Internet Protocol is a technology for transmitting telephone calls over the Internet using packet-linked routes. FIG. 39 is an illustration of how a VOIP service can be implemented on the network covered herein. The process includes:
1. Authentication and Authorization. User A 1 wants to communicate with a trusted peer via VOIP. The user logs in to the system and undergoes a process of authentication and authorization.
2. VOIP process (direct). Once on the network, User A 1 can communicate using VOIP, with those trusted peers that are also on the network, in this case, User B 9. User A 1 can also contact anyone that is socially related to the User B 9, for example, User Bn 70, depending on their mutual preference settings.
3. VOIP through proxy. When Users are behind firewalls or other security devices and cannot be connected directly. In such cases, the VOIP service is available through the VOIP server 160 on the trusted servers 3.

4. VOIP to POTS. This service can be extended to include traditional telephony (POTS) systems 170. In this case, User C 11, must have some unique identifier (for example, telephone number, password) 165 that allows the user to access the network and be contacted by trusted peers. VOIP communication from User A 1 to User C 11 is through the VOIP server 160.

EXAMPLE 4C

Interactive or Streaming Video

Figure 40:
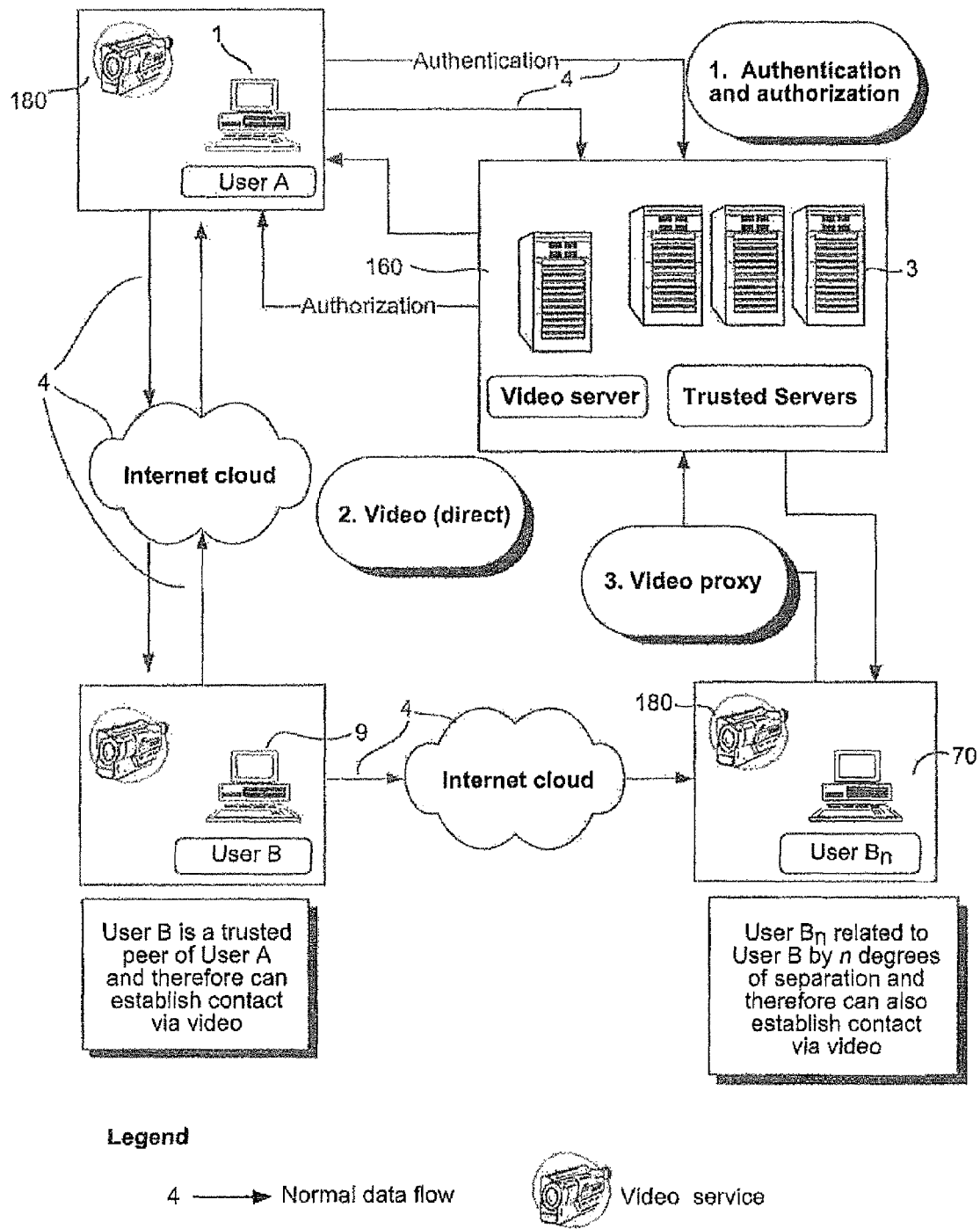
FIG. 40 is a process chart demonstrating Interactive Video services on a trusted social network according to one embodiment of the present invention.

Interactive or streaming video is a technology for video communication using the Internet. FIG. 40 is an illustration of how an interactive video service can be implemented on the network covered herein. The process includes:
a) Authentication and Authorization User A 1 wants to communicate with a trusted peer via video. User A 1 first logs in to the system and undergoes a process of authentication and authorization.
b) Video (direct) Once on the network, User A 1 can communicate using video streams 180, with those trusted peers that are also on the network, in this case, User B 9. User A 1 can also contact anyone that is socially related to the User B 9, for example, User B$_n$ 70, depending on their mutual preference settings.
c) Video through proxy When Users are behind firewalls or other security devices and cannot be connected directly. In such cases, the interactive service is available through the Video server 160 on the trusted servers 3.

EXAMPLE 4D

Push Features

In this example, User A has the following groups of trusted peers that have various degrees of separation from User A (expressed as values of "n").

| Users with n = 0 | Users with n = 1 | Comment |
| --- | --- | --- |
| B | B1, B2, B3 | Trusted peers of B |
| C | C1, C2, C3 | Trusted peers of C |
| D | D1, D2, D3 | Trusted peers of D |
| E | | |
| F | | |
| G | | |

Users have the option of designating a folder that can receive push objects. A push object can be any type of digital file such as a text file, an executable program file, a graphic file, a video file, etc. Users can also set the preferences for this file folder. In this example, the preferences set by the users are the maximum size of files that the user wants to receive, the file type, the maximum degree of separation of the sender from the User in order to accept a push object.

In this example, each user assigns the following properties to their folder.

Temp folder characteristics

| Users | Maximum File size (MB) | File type acceptable | Degree of separation (n) |
|---|---|---|---|
| B | 10 | .txt | 1 |
| C | 100 | .avi | 0 |
| D | 100 | .avi | 1 |
| E | 75 | .avi | 0 |
| F | 50 | .avi | 0 |
| G | 100 | .avi | 0 |
| B1 | 100 | .avi | 1 |
| B2 | 100 | .avi | 0 |
| B3 | 100 | .avi | 1 |
| C1 | 100 | .avi | 1 |
| C2 | 10 | .avi | 1 |
| C3 | 100 | .avi | 0 |
| D1 | 100 | .avi | 1 |
| D2 | 100 | .avi | 0 |
| D3 | 100 | .txt | 1 |

User A has a 75 MB .avi file that she wants to send to some of her trusted peers and people that are one degree of separation away from her (n=1). User A sends a request to the Push server defining the file as a push object to be sent to people that are n=1 away from User A. In this case, User A also specifies the trusted peers to whom she wants to send the file. In this case, User A picks Users B, C, D, E, and F but not User G.

The push server checks the permissions for the temp folder and asks each designated user whether they want to receive the file. If the answer is no, these users will not be contacted regarding this object again. If the answer is yes, the users may obtain the file from User A or anyone of A's trusted peers that also have the file.

In this case,

| Users | Push Server Check Results | Action from push server |
|---|---|---|
| B | File type not correct | No message |
| C | All acceptable | Message sent |
| D | All acceptable | Message sent |
| E | All acceptable | Message sent |
| F | File size too large | No message |
| G | Not selected to receive | No message |

Users C and D accept the push object but User E rejects the file. Users C and D can receive the push object from User A. As soon as Users C and D receive portions of the push object, they can then be a source for the push object. The push object can be distributed to other members of the social network until the degree of separation as defined by the creator of the object is met.

Because User A has set the push object properties as n=1, Users C and D have the option of sending the push object to their trusted peers. In this case, User C does not authorize a message from the push server to be sent to User C's trusted peers. As a result, Users C1, C2 and C3 will not receive the push object.

User D chooses trusted peers D1 and D2 as recipients for the push object. The push server checks the access permissions for D1 and D2 before contacting them about the push object. In this case, User D1 gets a message but not User D2 because User D2 set its folder to only accept files that originate from User D2's trusted peer (n=0) and not User D2's trusted peer's trusted peer.

It is possible for Users D1 or D2 to send the file to their trusted peers but only if Users D1 and D2 re-initiate the push object as their own push object. In this example, after the push process initiated by User A, the following users will have the push object.

| Users | Receive Object? | Reason |
|---|---|---|
| B | No | Wrong file type |
| C | Yes | |
| D | Yes | |
| E | Yes | |
| F | No | Exceeds file limit |
| G | No | Not chosen initially |
| B1 | No | File not received by B |
| B2 | No | File not received by B |
| B3 | No | File not received by B |
| C1 | No | Transfer not authorized by C |
| C2 | No | Transfer not authorized by C |
| C3 | No | Transfer not authorized by C |
| D1 | Yes | Chosen by D |
| D2 | No | Degree of separation set by D2 did not allow it. |
| D3 | No | Not chosen by D |

EXAMPLE 4E

Content Syndication and RSS

Content syndication describes the process of making portions of web content available for use by other services. The syndicated content, or feed, can consist of both the content itself and information about the content (metadata). RSS is a XML content syndication standard that provides an XML-formatted feed consisting of an abstract of content and a link to a document containing the full content. As an application, it is part of the Resource Description Framework (RDF), which are specifications that provide a lightweight ontology system to support the exchange of knowledge on the web. In general, these technologies are found in the context of a web environment and have not been applied in P2P networks. The push functionality described above allows for content feeds to be distributed through a P2P network.

EXAMPLE 5

Resource Sharing Through a Trusted Social Network

The application of the present invention is not limited to the communication or the transfer of electronic files but can also extend to the sharing or grouping of resources both electronic and non-electronic. The common element in the resource sharing through a social network is the addition of a trusted source that manages the resources. The following are representative examples of resource sharing on this type of network.

EXAMPLE 5A

Electronic Resource Sharing on a Trusted Social Network

Figure 41:
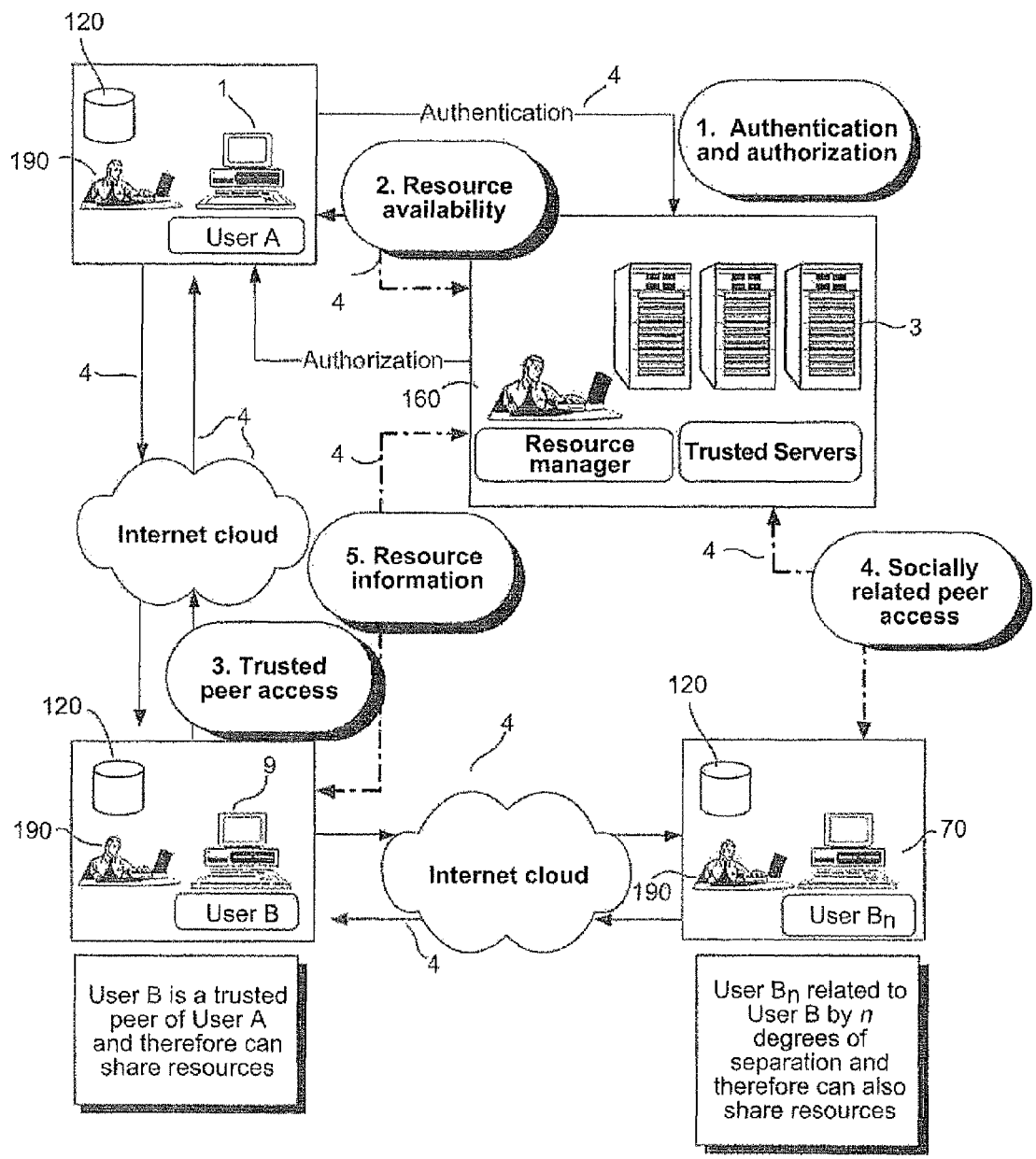
FIG. 41 is a process chart demonstrating an application of electronic resource sharing on a trusted social network according to one embodiment of the present invention.

This example applies to the sharing of electronic resources available on the local computing device that can include but not limited to: bandwidth, storage capacity and CPU processing capability. FIG. 41 illustrates an application of resource sharing according to one embodiment of the present invention. Major steps in this process are:
a) Authentication and Authorization. User A 1 has resources 120 to share, in this case, local hard drive space. User A 1 must first be identified and receive authorization from the trusted servers 3 to access the network.
b) User A 1 sends information on resource availability. Once authenticated User A 1 sends resource information to the resource manager 160 residing with the trusted servers 3.
c) Trusted peer can access. A trusted peer, for example User B 9, who is already authorized to be on the system and is defined by User A 1 to be a trusted peer, obtains information from the resource manager 160. User A 1 and User B 9 can now share their resources 120 accordingly.
d) Socially related users can access. Any connected user that is related to User A 1 or User B 9, in this case, $B_n$ 70 (n representing the degree of separation from User B 9) can also share their resources 120. The resource manager 160 carries out the organization and management of those resources.
e) Resource information. For each user, the local resource service 190 reports the available resource information to the resource manager 160 on the trusted servers. The resource manager 160 can then allocate resources to each user of the trusted network accordingly.

As a result, resources can be grouped and shared on a trusted network according to the preference of each individual user.

EXAMPLE 5B

Figure 42:
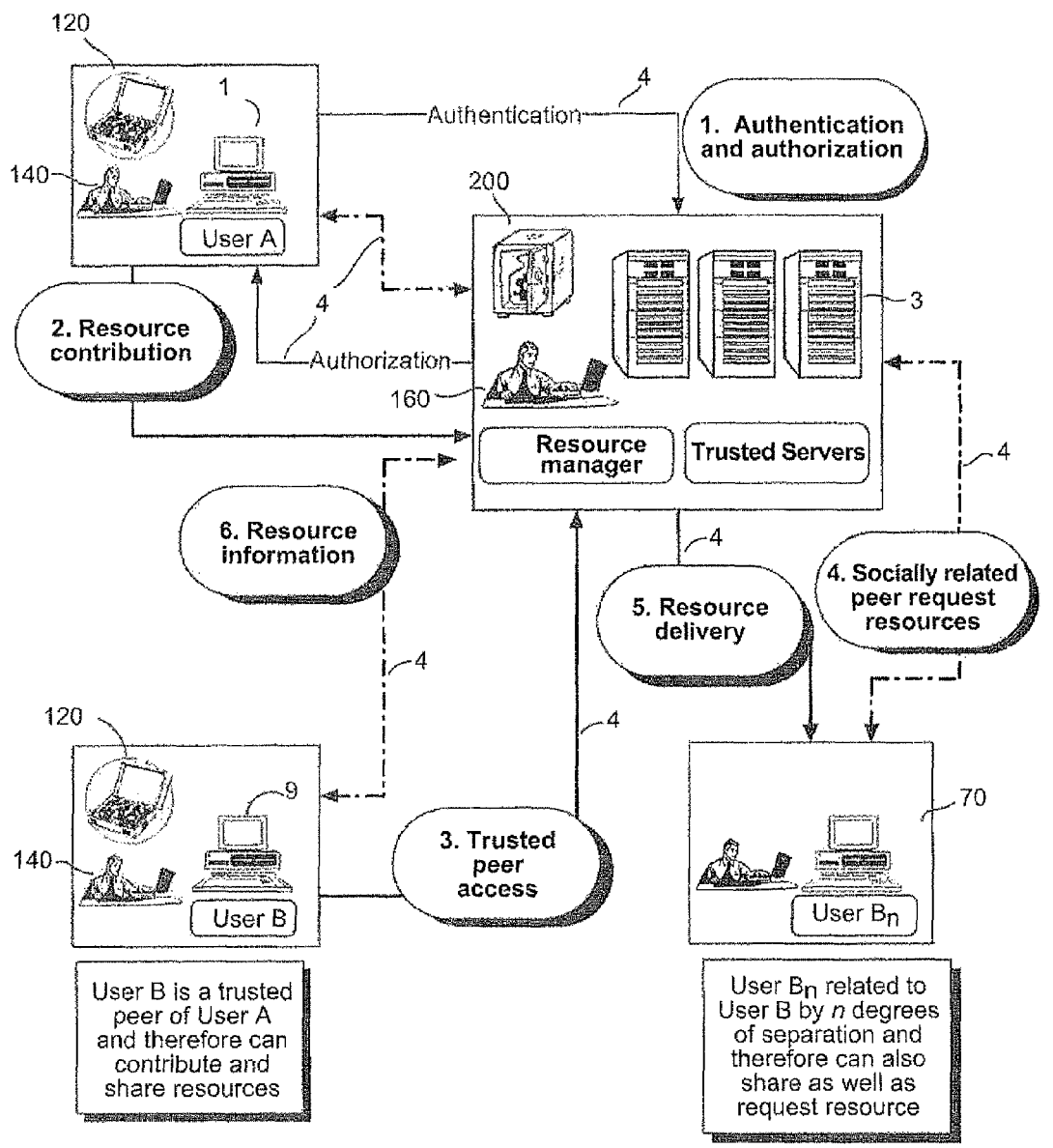
FIG. 42 is a process chart demonstrating a process for non-electronic resource sharing on a trusted social network according to one embodiment of the present invention.

Non-Electronic Resource Sharing on a Trusted Social Network with Delivery Through a Trusted Service The application of the present invention is not limited to sharing or grouping of electronic resources but also includes identifiable non-electronic resources. Examples of non-electronic resources include: money, credit and/or information. FIG. 42 illustrates an application of resource sharing according to one embodiment of the present invention for the case of resource delivery by a trusted authority. Major steps in this process are:
a) Authentication and Authorization User A 1 has a resource 120 to share, in this case, money. User A 1 must first be identified and receive authorization from trusted servers 3 to access the network.
b) User A 1 contributes resource to a central authority Once authenticated User A 1 sends the resource (money) 120 to the trusted authority 200 and the information related the resource to the resource manager 160.
c) Trusted peer resource contribution A trusted peer, for example User B 9, who is already authorized to be on the system and is defined by User A 1 to be a trusted peer, can contribute to or use the resource 120 on the trusted authority 200. With each contribution, the corresponding resource information is also sent to the resource manager 160. User A 1 and User B 9 can now share their resources 120 accordingly.
d) Socially related users access request resources Any connected user that are related to User A 1 or User B 9, in this case, $B_n$ 70 (n representing the degree of separation from User B 9) can also share and request the resources 120. In this case, the User $B_n$ 70 requests the resource 120 and the resource manager 160 carries out the organization and management of those resources and arranges for the delivery of the resource 120.
e) Resource delivery The resource manager 160 arranges for the delivery of the resource 120 to User $B_n$ 70 from a trusted authority 200.
f) Resource information For each user, the local resource service 140 reports and tracks the contribution of each socially related user. The resource server 160 can then allocate resources 120 or provide access privileges to each user of the trusted network accordingly.

As a result, resources can be grouped and shared on a trusted network according to the preference settings for each individual user.

EXAMPLE 5C

Figure 43:
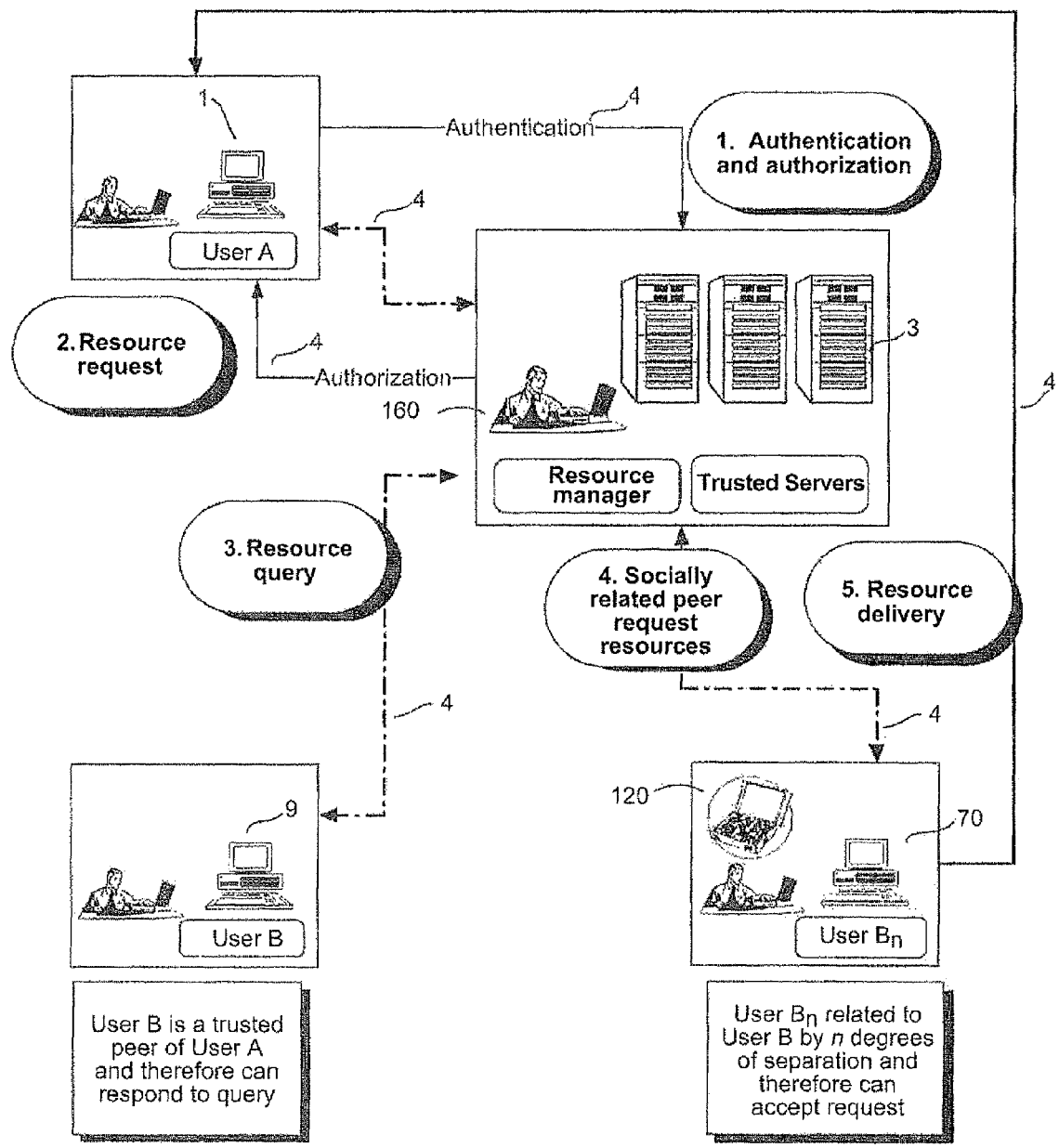
FIG. 43 is a process chart demonstrating a process for non-electronic resource sharing on a trusted social network where delivery of the resource is managed physically by a trusted peer according to one embodiment of the present invention.

Non-Electronic Resource Sharing on a Trusted Social Network-Delivery by a Trusted Peer In this example of sharing of non-electronic resources, a trusted peer carries out the delivery of the resource. FIG. 43 is an illustration of this example. Major steps in this process are
a) Authentication and Authorization User A 1 has a request for a resource 120, in this case, money. User A 1 must first be identified and receive authorization from the trusted servers 3 to access the network.
b) User A submits a resource request Once authenticated, User A 1 submits a resource (in this case money) request to the to the resource manager 160, a trusted authority.
c) Resource query Resource manager 160 then queries each of the trusted peers of User A 1 to find the resource. In this case, User B 9 is query and the system finds that User B 9 does not have the required resources 120.
d) Request accepted Any connected peer that is related to User A 1 or User B 9, in this case, $B_n$ 70 (n representing the degree of separation from User B 9) can also reply to the request for resources. In this case, the User $B_n$ 70 has the resource 120 and the resource manager 160 carries out the organization and management of those resources and arranges for the delivery of the resource 120.
e) Resource delivery The resource manager 160 closes the request after the delivery of the resource 120 from User $B_n$ 70 to User A 1.

As a result, resources can be grouped and shared on a trusted network according to the preference of each individual user and the delivery of the resources does not have to occur via a trusted intermediate.

EXAMPLE 5D

Information Collaboration and Management on a Trusted Social Network

Figure 44:
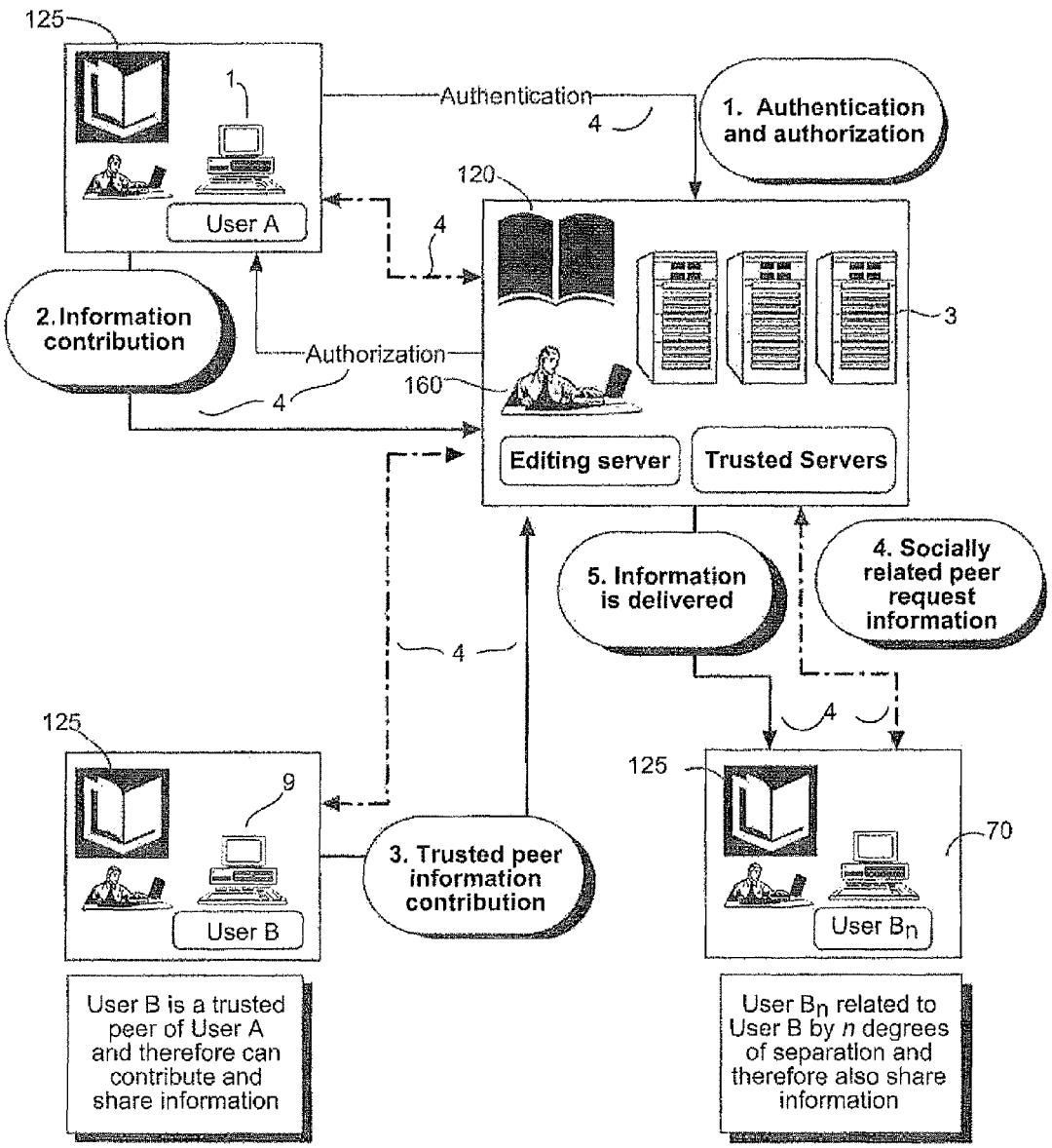
FIG. 44 is a process chart demonstrating information collaboration and management on a trusted social network according to one embodiment of the present invention.

Information is one particular type of resource that is ideally suited to be accessible and available on a trusted social network. In order for information to be useful and relevant, it must be written and organized for an intended audience. FIG. 44 is an example of information between managed on a trusted social network according to one embodiment of the present invention. Major steps in this process are:
a) Authentication and Authorization. User A 1 requires updating information 120 that is being stored in a central trusted authority, an editing server 160. User A 1 must first be identified and receive authorization from the trusted servers 3 to access the network.
b) Information contribution. Once authenticated User A 1 submits the new information 125 to the editing server 160.

c) Trusted peer information contribution A trusted peer, User B 9, who is on the network can query the editing server 160 or contribute additional information 125.
d) Socially related user request information Any connected user that is related to User A 1 or User B 9, and who falls within the designated degree of separation, in this case, B$_n$ 70 (n representing the degree of separation from User B 9) can also edit or view the information 120. In this case, the User B$_n$ 70 submits a query to the editing server 160.
e) Information is delivered The editing server 160 response to the query based on the rules and regulation governing the information 120.
f) Resource information The editing server 160 is connected to each user of the trusted social network to ensure each user has the appropriate access to the information 120.

As a result, information can be edited, manipulated, grouped and shared on a trusted network according to the preference of each individual user. The uniqueness of this type of collaboration is that social relationships dictate function rather than requiring a central authority to manage user access to resources.

EXAMPLE 6

Electronic Games on a Trusted Social Network

Figure 45:
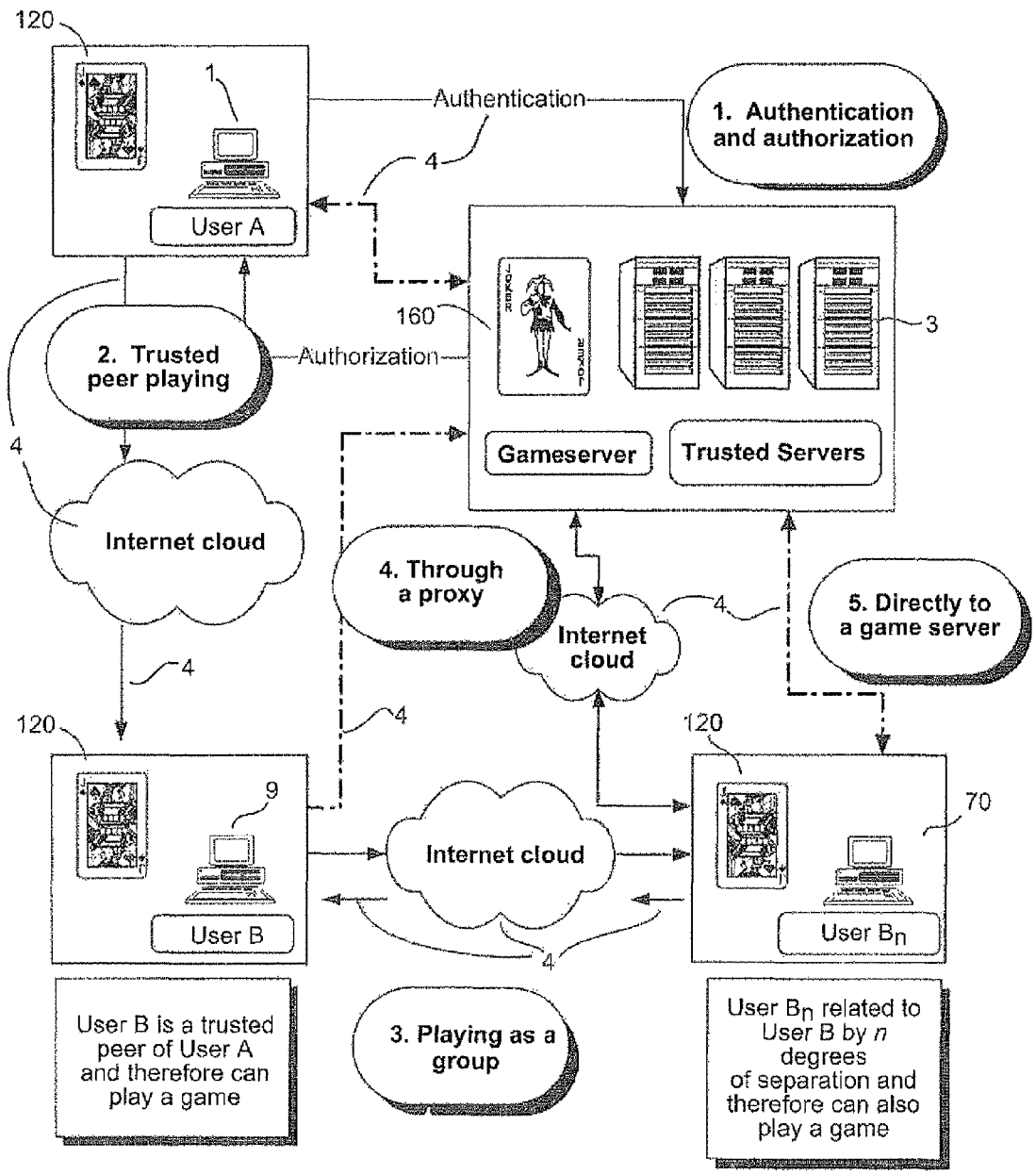
FIG. 45 is a process chart demonstrating playing games on a trusted social network according to one embodiment of the present invention.

An application of the present invention can be used to allow users of a trusted Peer-to-Peer network to play electronic games via the network. Since most games are played between friends, the trusted social network becomes a natural electronic extension of the real world. Many on-line games allow players to organize into "clans" or "guilds" for cooperative or team play. The trusted Peer-to-Peer network can be applied to facilitate such organization. Examples of games include, but are not limited to, the following: poker, chess, scrabble, real time strategy games, first person shooter games, multi-player role playing games and the like. FIG. 45 illustrates an application of gaming on a trusted Peer-to-Peer network according to one embodiment of the present invention. Major components in this process are:
a) Authentication and Authorization User A 1 wants to play a game 120 with one or more users or groups of users. User A 1 must first be identified and receive authorization from trusted servers 3 to access the network.
b) Trusted peer access A trusted peer, for example User B 9, who is already authorized to be on the system and is defined by User A 1 to be a trusted peer, can then play with User A 1.
c) Playing as a group Any connected users that are related to User A 1 or User B 9, in this case, B$_n$ 70 (n representing the degree of separation from User B 9) can also play the game 120 as an individual or as a group. A game server 160 can be a central organizer for some types of games.
d) Through a proxy In cases where there is a firewall or other forms of security, trusted peers, the game server 160 can function as a proxy to establish connection between users.
e) Directly to a game server For complex games such as those found in on-line multi-player games, authenticated users can connect directly to the game server 160. In this case, the social network relationships are still maintained as each user plays the game.

EXAMPLE 7

Advertising Through a Trusted Social Network

Figure 46:
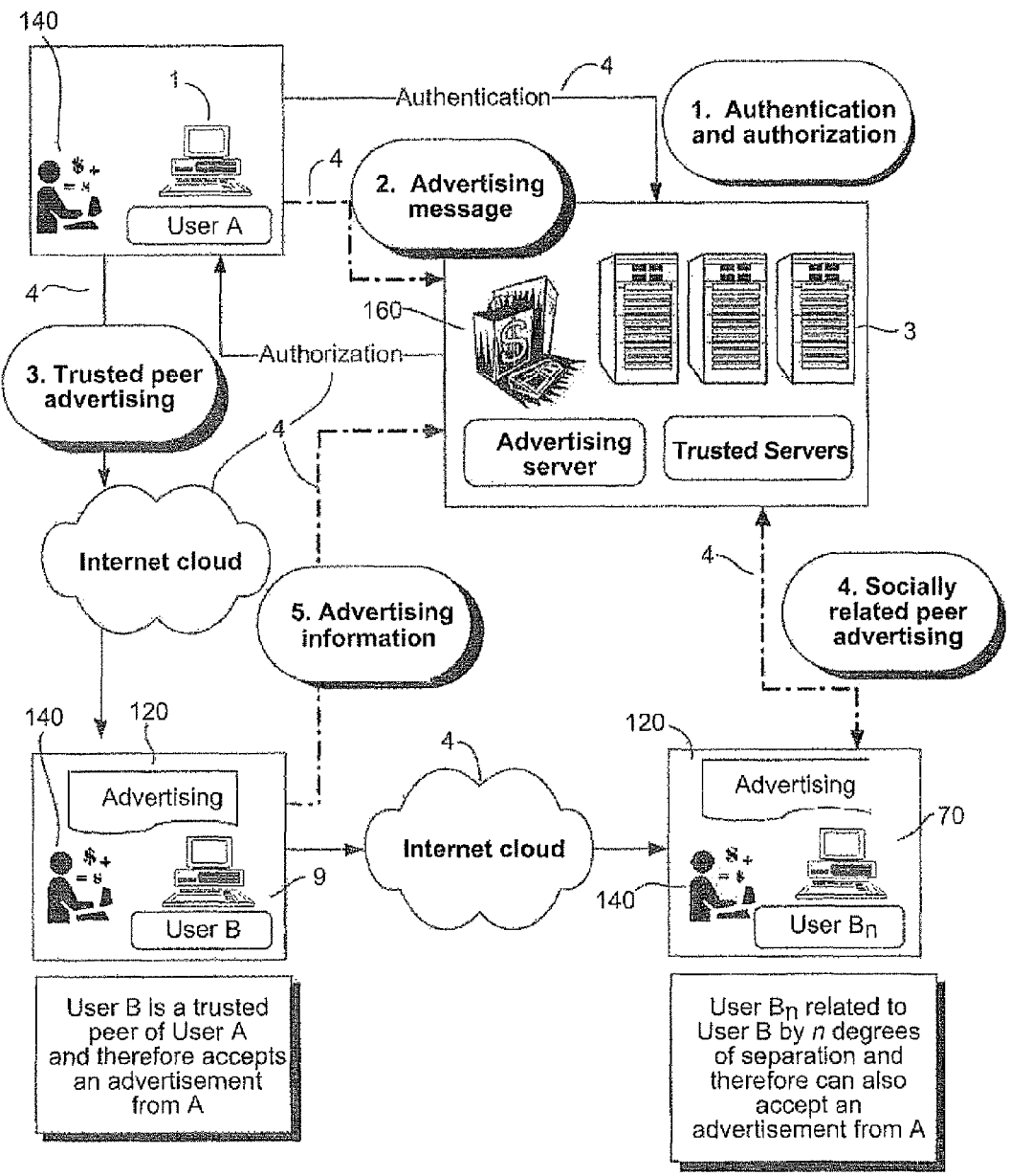
FIG. 46 is a process chart demonstrating advertising to users through a trusted social network according to one embodiment of the present invention.

The present invention can be applied to advertising directed towards individual users of the network. FIG. 46 illustrates how the system allows a user to broadcast a message to users that are related socially. The main components are:
a) Authentication and Authorization User A 1 wants to broadcast a message 120. Examples of the message 120 include but are not limited to: a text message, a URL, a graphic or a multimedia file. User A 1 must first be identified and receive authorization from trusted servers 3 to access the network.
b) Advertising message User A 1 sends a request to advertise through the social network to the advertising server 160.
c) Trusted peer advertisement Once authorized by the advertising server 160, User A 1 can send a message to a trusted peer who is on the network, in this case, User B 9.
d) Socially related user advertisement Message 120 can also be sent to any user that is socially related to A 1 or B 9, in this case, User B$_n$ 70.
e) Advertising information Advertising controls, for example, length of display or type of message is sent to each user. Advertising information, such as duration of the ad, click-through, etc. is sent back to the advertising server.

This example illustrates the ability to create a direct marketing campaign to users of a social group using the present invention.

EXAMPLE 8

Example of Business Applications

According to one embodiment of the present invention, a social Peer-to-Peer network can also be applied in a business environment. The essential nature of the network does not change but the terminology describing the elements of the network might be modified depending on context. For example, in a business setting, the social network is related to a collection of roles within an organization with the trusted relationship between users being defined as a result of those roles. The following examples illustrate applications of the present invention in a corporate setting.

EXAMPLE 8A

Multilevel Marketing (MLM)

Figure 47:
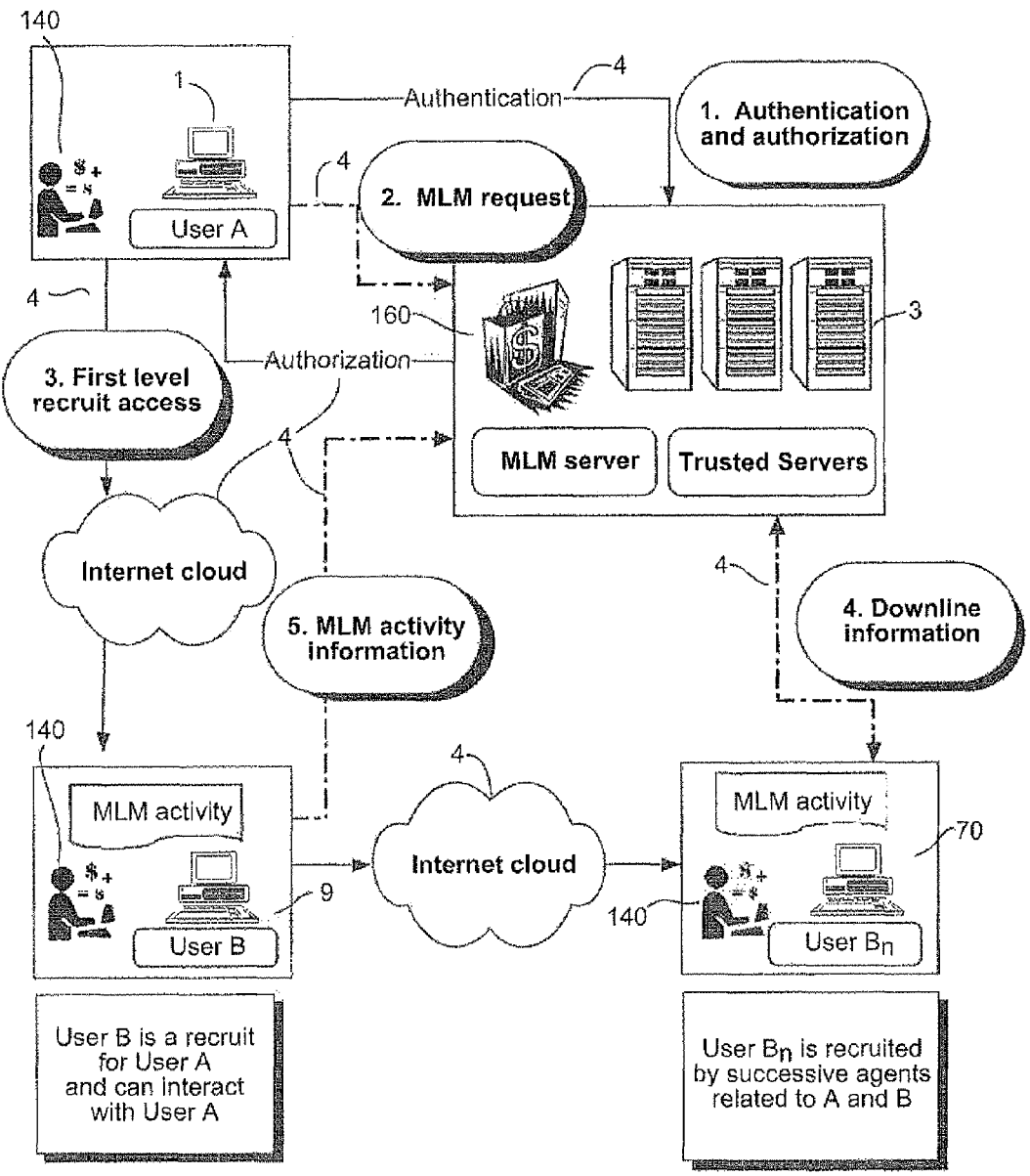
FIG. 47 is a process chart demonstrating the use of a trusted social network in the multi-level marketing industry according to one embodiment of the present invention.

Multi-level marketing (MLM), also known as network marketing (NM), affiliate marketing, or home based business franchising, is a business model that combines the characteristics of direct marketing and franchising. Typically, individuals enter into an independent contractor relationship with a business entity and act as sellers and agents to recruit others to work for the company. New recruits are, in turn, encouraged to recruit others to work for the company. Sellers are compensated based on their sales of a product or service, as well as the sales of those they bring into the business. FIG. 47 is an example of MLM operation on a network according to one embodiment of the present invention. In this example, the network is configured to be the same as the advertising network as described in Example 7 but the roles and responsibilities of each component reflects the needs of a MLM business. The main components are:
a) Authentication and Authorization User A 1, represents an agent for a MLM business and wants access to the trusted network. User A 1 must first be identified and receive authorization from trusted servers 3 to access the network.
b) MLM request Once authenticated, User A 1 can then send a request to the MLM server 160. The MLM server 160 is a trusted entity that controls the rules and regulations specific to this business.

c) First levels recruit access User A 1 can now interact with a trusted peer who is on the network, in this case, User B 9. In this context, User B 9 is known as a first level recruit because this user is directly related User A 1.

d) Downline information User Bn 70, is lower in the hierarchy relative to User A 1 and B 9 because User Bn 70 was recruited by agents related to User A 1 and B 9 in some way. Because of this relationship, User A 1 has rights to the MLM activities of User Bn 70.

e) MLM activity information MLM activities 120, for example, sales information, support are provided via a connection to the MLM server 160. Local MLM software 140 on each User's computing device processes this information. The MLM server 160 can also implement specific business rules based on such factors as the percentage of sales of users, sales volume discounts and limiting the number of users.

EXAMPLE 8B

Film Production

Figure 48:
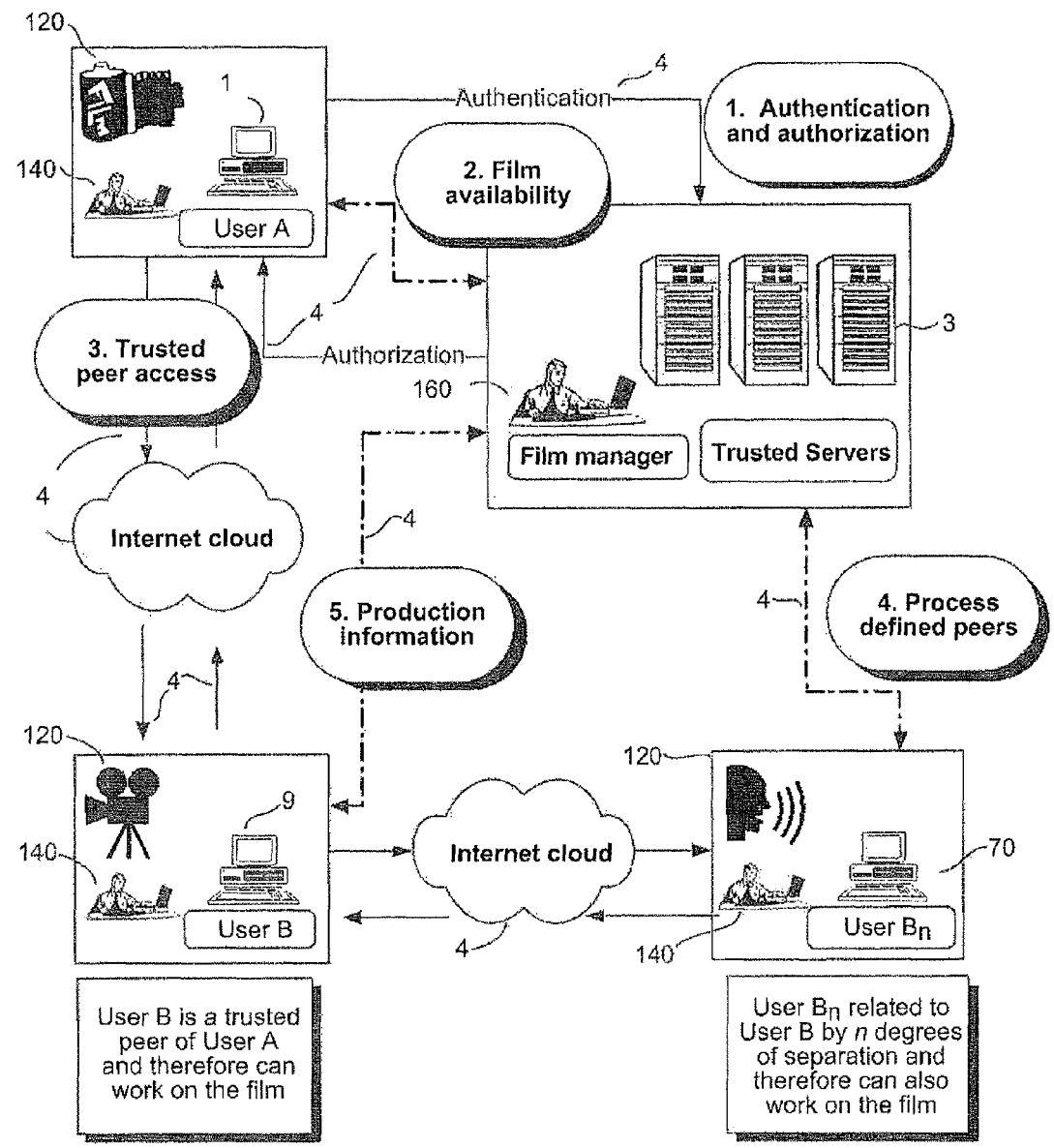
FIG. 48 is a process chart demonstrating the use of a trusted social network in the process of film production according to one embodiment of the present invention.

Film production is a complex process that requires the efforts of groups of individuals including: editors, sound engineers, cinematographers, etc. The process of movie production can be carried out on a social Peer-to-Peer network according to one embodiment of the present invention. FIG. 48 is a summary of a network created to support the production of a film.

a) Authentication and Authorization User A 1 has a movie in production. In this case, an electronic copy of the film 120 exists on his local machine. In order to use the network, User A 1 must first be identified and receive authorization from trusted servers 3 to gain access.

b) Film availability Once authenticated User A 1 sends film information 120 to the film manager 160 residing within the trusted servers 3.

c) Trusted peer access A trusted peer, for example User B 9, who is already authorized to be on the system and is defined by User A 1 to be a trusted peer, obtains information from the resource manager 160. User A 1 and User B 9 can now both work on the film 120 accordingly. User B 9 can then delegate responsibilities and access to the film 120 independent from User A 1. This is because the network is built based on the principle that there is trust between User A 1 and User B 9.

d) Process defined users Any connected user that is related to User A 1 or User B 9, in this case, $B_n$ 70 (n representing the degree of separation from User B 9) can also access the film 120. The film manager 160 carries out the organization and management of this resource.

e) Resource information For each user, the local resource service 140 reports the available resource information to the resource manager 160 on the main trusted servers 3. For example, the film manager 160 can implement version control, so only one copy of a film 120 is in production. The film manager 160 can then allocate resources to each user of the trusted network accordingly.

As a result, resources can be grouped and shared on a trusted network according to the preference of each individual user.

EXAMPLE 8C

Film Festivals

Figure 49:
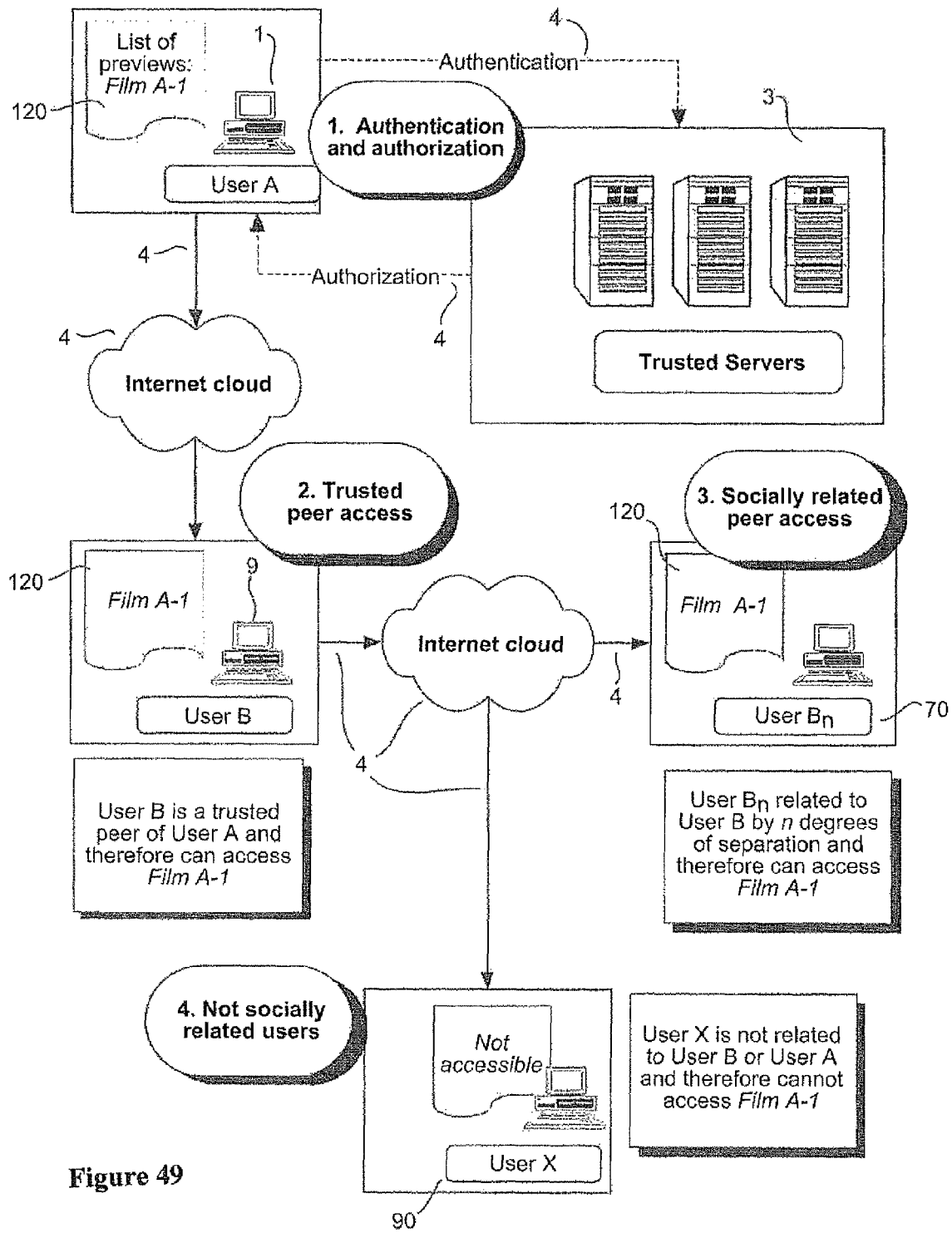
FIG. 49 is a process chart demonstrating the use of a trusted social network in film festivals according to one embodiment of the present invention.

A film festival is a periodic gathering of individuals with a common objective of showcasing films according to some common theme. FIG. 49 illustrates the use of the present invention for a film festival in the case of sharing previews for the film festival. The network configuration is based on Example 1, file sharing on the network. In FIG. 49, the main components are:

a) Authentication and Authorization User A 1 has a video file (film A-1) 120 on a shared folder. User A 1 must first be identified and receive authorization from the trusted servers 3. User A 1 could be a user of the film festival or an audience member.

b) Trusted peer access A trusted peer of A 1, in this case User B 9, who is already authorized to be on the system can now access film A-1 120.

c) Socially related users access Any connected user that are related to User A 1 or User B 9, in this case, $B_n$ 70 (n representing the degree of separation from User B 9) can also access film A-1 120 depending on the permission first setup by User A 1.

d) Not socially related users Users on the network that do not have a social connection to A 1, for example, User X 90, cannot have access to film A-1 120.

When a film festival uses this network, they can distribute content over the available bandwidth of each trusted peer while taking advantage of the growth opportunities of a social network.

EXAMPLE 8D

Medical Industry

Figure 50:
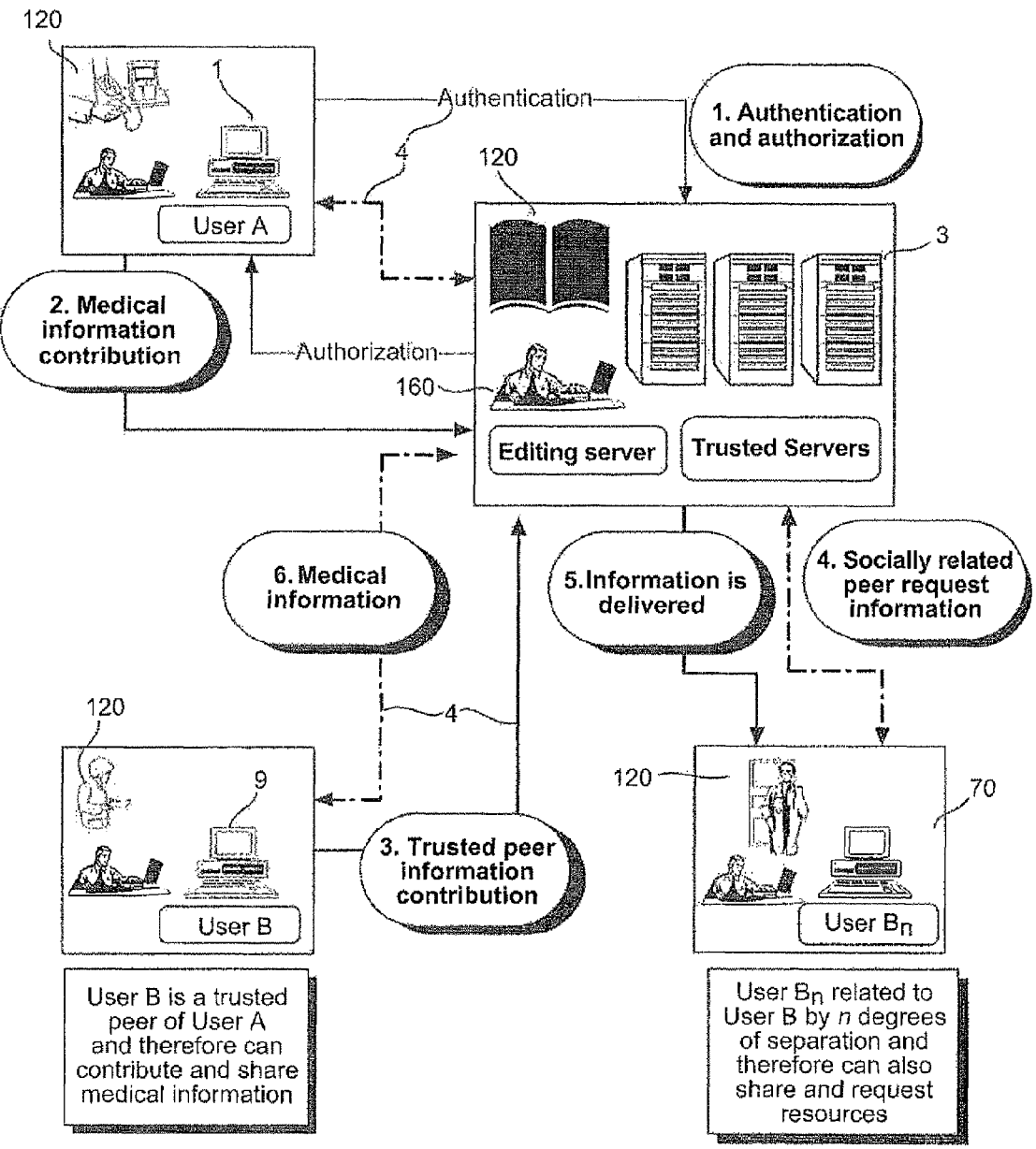
FIG. 50 is a process chart demonstrating the use of a trusted social network in the medical industry according to one embodiment of the present invention.
Figure 51:
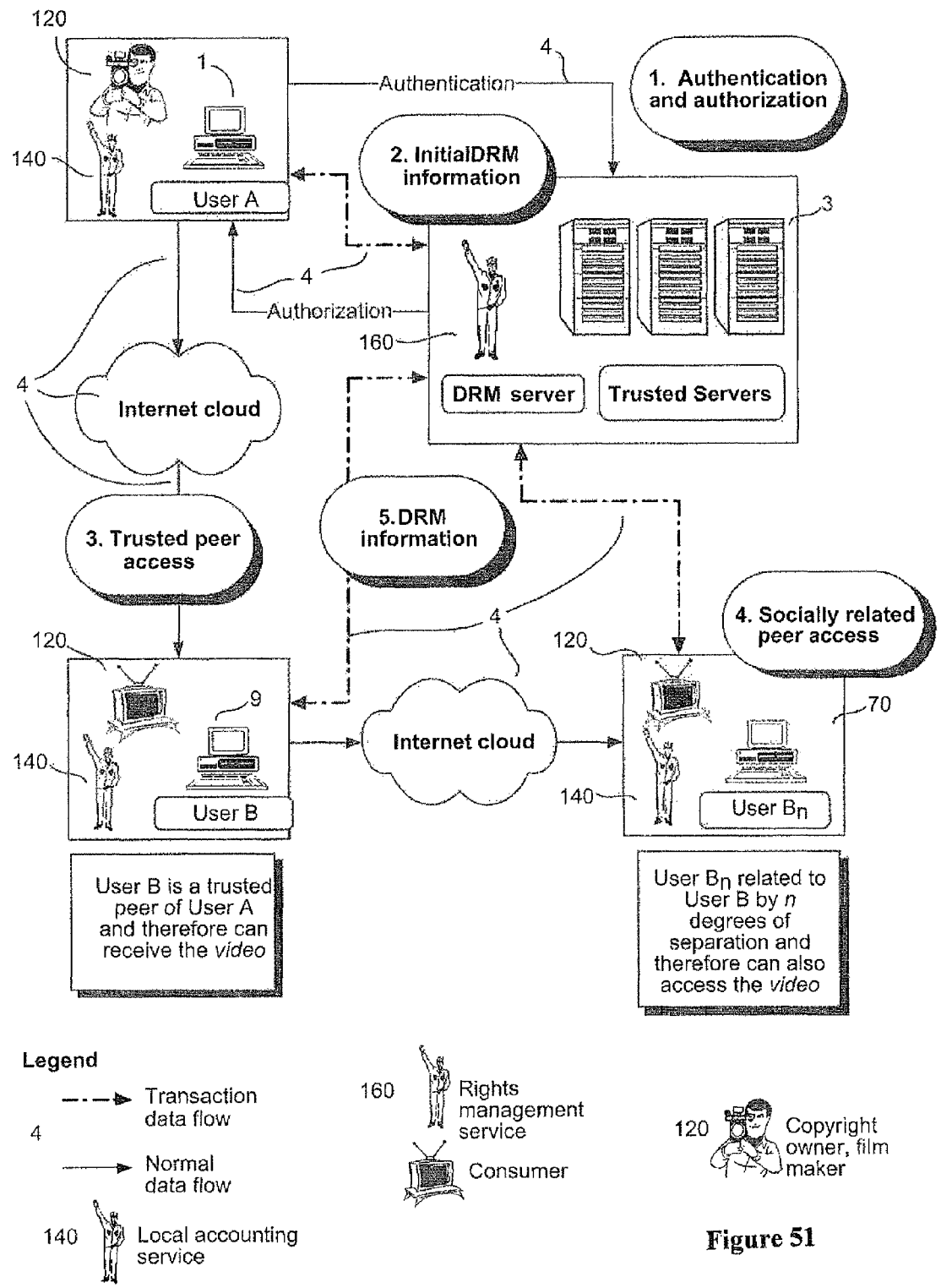
FIG. 51 is a process chart demonstrating the use of a trusted social network in the retail music/movie industry according to one embodiment of the present invention.

The present invention can also be used in the medical industry for diagnostic and collaboration. An example such an application is provided in FIG. 50. This application is similar to the process described in Example 5D. In this case, medical information, for example, test results or medical history are being shared on the network. Each user can represent a stakeholder in the medical industry, for example, specialists, the patient or the medical technologist. Major steps in this process are:

a) Authentication and Authorization User A 1 requires updating information 120 that is being stored in a central trusted authority. User A 1 must first be identified and receive authorization from the trusted servers 3 to access the network.

b) Medical Information contribution Once authenticated User A 1 submits the new information the trusted authority, a manager server 120.

c) Trusted peer information contribution A trusted peer, User B 9, who is on the network can query the manager server 160 or contribute additional information 120.

d) Related user request information Any connected user that is related to User A 1 or User B 9, in this case, $B_n$ 70 (n representing the degree of separation from User B 9) can also edit or view the information 120. In this case, the User $B_n$ 70 submits a query to the manager server 160.

e) Information is delivered The manager server 160 responds to the query is based on the rules and regulation governing the use of the information 120.

f) Medical information The manager server 160 is connected to each user of the trusted social network to ensure each user has the appropriate access to the information.

As a result, information can be edited, manipulated, grouped and shared on a trusted network according to the preference of each individual user without the need to explicitly request permission from a central authority such as the trusted servers. The role of the trusted server is simply to initially verify the identity of the user.

EXAMPLE 8F

Online Movie and/or Music Store

Movies and music are increasingly available in digital format. A new type of delivery mechanism and store can be created according to one embodiment of the present invention. Using Example 2B (an electronic market built on a trusted social network based on the transfer of digital rights) as a model, a film company can deliver a movie over a trusted network. In this case, the DRM (Digital Rights Management) server not only manages the rules and regulations governing the ownership of the object but also can enforce payment. The main components of this system are:

a) Authentication and Authorization User A 1 is the digital rights holder of a movie 120 located in a shared folder. User A 1 must first be identified and receive authorization from the trusted servers 3 to access the network.
b) Initial DRM information User A 1 sends the Digital Rights Management (DRM) information 165 to the DRM server 160.
c) Trusted peer of User A requests and obtains item A trusted peer of User A 1, defined as User B 9, who is already authorized to be on the system can now obtain the movie from User A 1. User A 1 must meet the requirements of the DRM server 160. For example, obtaining a valid license to view the movie 120.
d) Socially related users with a license can access Any connected users that are related to User A 1 or User B 9, in this case, B$_n$ 70 (n representing the degree of separation from User B 9) can also obtain the movie 120 depending on the permissions first set up by User A 1 and subsequently, all the other related users. The digital rights information 165 is sent to the DRM manager 160 to ensure compliance with the rights and regulations governing the use of the movie 120.
e) Digital rights information For each user, the local accounting service 140 reports the digital rights information 165 to the DRM manager 160. The DRM manager 160 will assign the appropriate access rules and regulation governing the use of the item as defined by the digital rights owner.

A new type of retail store is created based on a social Peer-to-Peer network according to one embodiment of the present invention. Each individual user can act as both consumer and distributor enjoying the benefits of network and efficient distribution.

We claim:

1. A system for a first user to share a monetary resource with a plurality of other users in a secure social network comprising:
   a plurality of software clients configured to interface said first user and said plurality of other users with one or more trusted servers, one or more banking servers, and one or more other computing devices in a network;
   one or more trusted servers;
   one or more communication means allowing communication between said one or more trusted servers, one or more banking servers, and said one or more software clients and/or between two or more software clients, wherein said trusted servers are configured to provide authentication, identification and verification of said first user and each user in said plurality of other users and to comprise a network interface;
   a processing engine in communication with the network interface, said engine operable to associate each of said other users with a degree of separation between said first user and one or more said other users; and
   a database configured to contain information relating to each of said other users, and wherein the degree of separation is representative of the number of pre-existing relationships of trust, as defined by said users, which link the first user and the one or more other users and wherein the system is configured such that access to a monetary resource of the first user by one or more other users is restricted to one or more users with a degree of separation from the first user that is specified by the first user, and wherein the system is also configured to grant a request to access the monetary resource by a subsequent user to the one or more other users if the subsequent user falls within the degree of separation from the first user that is specified by the first user, and wherein the banking server coordinates and manages the monetary resource interactions between the users according to pre-set rules.

2. A system as claimed in claim 1, wherein the system comprises one or more banking servers.

3. A system as claimed in claim 2, wherein the one or more banking server(s) of the system coordinate a borrower/lender relationship between one or more other users.

4. A system as claimed in claim 2, wherein the pre-set rules are input into at least one said banking server of the system by the one or more users with respect to their lending or borrowing preferences.

5. A system as claimed in claim 2, wherein at least one said banking server of the system verifies that monetary resources are correctly transferred into respective user accounts.

6. A system as claimed in claim 2, wherein at least one said banking server of the system maintains a profile history for one or more lenders and one or more borrowers with respect to attributes.

7. A system as claimed in claim 6, wherein the attributes are transactions, late payments, or loan delinquency.

8. A system as claimed in claim 2, wherein at least one said banking server of the system is configured to apply and/or enforce penalties upon loan delinquency.

9. A system as claimed in claim 1, wherein the coordination of monetary resource interactions includes the one or more banking server(s) coordinating a borrower/lender relationship between one or more other users.

10. A system as claimed in claim 1, wherein the pre-set rules are input into at least one said banking server by the one or more users with respect to their lending or borrowing preferences.

11. A system as claimed in claim 1, wherein the coordination and management of monetary resource interactions includes the at least one said banking server verifying that monetary resources are correctly transferred into respective user accounts.

12. A system as claimed in claim 1, wherein the coordination and management of monetary resource interactions includes the at least one said banking server maintaining a profile history for one or more lenders and one or more borrowers with respect to attributes.

13. A system as claimed in claim 12, wherein the attributes are transactions, late payments, or loan delinquency.

14. A system as claimed in claim 1, wherein for the coordination and management of monetary resource interactions the at least one said banking server is configured to apply and/or enforce penalties upon loan delinquency.

* * * * *